US012478078B2

(12) United States Patent
Cloud et al.

(10) Patent No.: US 12,478,078 B2
(45) Date of Patent: Nov. 25, 2025

(54) SEALED, SELF-CLEANING, FOOD DISPENSING SYSTEM

(71) Applicant: FBD PARTNERSHIP, L.P., San Antonio, TX (US)

(72) Inventors: Craig Cloud, New Braunfels, TX (US); Marshall G. Carter, San Antonio, TX (US); Cameron C. Crandall, San Antonio, TX (US); Stephen K. Versteeg, San Antonio, TX (US)

(73) Assignee: FBS Partnership, LP, San Antonio, TX (US)

( * ) Notice: Subject to any disclaimer, the term of this patent is extended or adjusted under 35 U.S.C. 154(b) by 314 days.

(21) Appl. No.: 18/179,909

(22) Filed: Mar. 7, 2023

(65) Prior Publication Data
US 2023/0380443 A1 Nov. 30, 2023

Related U.S. Application Data

(60) Provisional application No. 63/363,153, filed on Apr. 18, 2022.

(51) Int. Cl.
| | |
|---|---|
| *A23G 9/30* | (2006.01) |
| *A23G 9/22* | (2006.01) |
| *A23G 9/28* | (2006.01) |
| *B08B 3/04* | (2006.01) |
| *B08B 5/02* | (2006.01) |
| *F25B 41/20* | (2021.01) |

(52) U.S. Cl.
CPC .............. *A23G 9/30* (2013.01); *A23G 9/222* (2013.01); *A23G 9/228* (2013.01); *A23G 9/281* (2013.01); *B08B 3/04* (2013.01); *B08B 5/02* (2013.01); *F25B 41/20* (2021.01)

(58) Field of Classification Search
CPC .......... A23G 9/222; A23G 9/228; A23G 9/28; A23G 9/281; A23G 9/30; B08B 3/04; B08B 5/02
See application file for complete search history.

(56) References Cited

U.S. PATENT DOCUMENTS

| | | |
|---|---|---|
| 2,276,811 A | 3/1942 | Ward |
| 2,562,638 A | 7/1951 | Philipp |
| (Continued) | | |

FOREIGN PATENT DOCUMENTS

| | | |
|---|---|---|
| JP | 2006523459 A | 10/2006 |
| KR | 20120071029 A | 7/2012 |

OTHER PUBLICATIONS

Google Patents English Translation of JP2006523459A.
Gogle Patents English Translaton of KR20120071029A.

*Primary Examiner* — Henry T Crenshaw
(74) *Attorney, Agent, or Firm* — McAughan Deaver PLLC

(57) ABSTRACT

A sealed pressurized food dispensing system with self-cleaning features that can include a freezing barrel, a faceplate defining a dispense bore and a cleaning bypass passage passing through the faceplate and having an open end, where the dispenser can also include a valve stem that may be moved between a dispensing position and a non-dispensing position where the cleaning bypass passage is positioned such that, when the valve stem is in its non-dispensing position, no fluid path exists between the interior of the freezing barrel and the open end of the cleaning bypass passage within the faceplate.

20 Claims, 43 Drawing Sheets

(56) References Cited

U.S. PATENT DOCUMENTS

| | | |
|---|---|---|
| 2,610,478 A | 9/1952 | Lofstedt |
| 3,280,459 A | 10/1966 | Walker |
| 3,677,272 A | 7/1972 | Shrank |
| 4,213,795 A | 7/1980 | Ernstsson |
| 4,590,970 A | 5/1986 | Mott |
| 4,736,600 A | 4/1988 | Brown |
| 4,758,097 A | 7/1988 | Iles |
| 4,784,697 A | 11/1988 | Bordini |
| 5,270,013 A | 12/1993 | Decker |
| 5,632,411 A | 5/1997 | Harty |
| 5,740,844 A | 4/1998 | Miller |
| 5,899,077 A | 5/1999 | Wright |
| 5,974,824 A | 11/1999 | Galockin |
| 6,161,558 A | 12/2000 | Franks |
| 6,189,745 B1 | 2/2001 | Frank |
| 6,490,872 B1 * | 12/2002 | Beck ................ A23G 9/228 62/342 |
| 6,625,992 B2 | 9/2003 | Maguire |
| 7,562,793 B2 | 7/2009 | Ufheil |
| 7,681,761 B2 | 3/2010 | Harra |
| 7,988,019 B2 | 8/2011 | Groh |
| 8,079,230 B2 | 12/2011 | Frank |
| 8,231,033 B2 | 7/2012 | Webb |
| 9,173,521 B2 | 11/2015 | Gates |
| 9,437,398 B2 | 9/2016 | Tomany |
| 9,457,386 B2 | 10/2016 | Gates |
| 9,516,889 B2 | 12/2016 | Tuchrelo |
| 10,034,488 B2 | 7/2018 | Graczyk |
| 10,321,699 B2 | 6/2019 | Gates |
| 10,327,455 B2 | 6/2019 | Gates |
| 10,788,246 B2 | 9/2020 | Frank et al. |
| 2002/0043071 A1 | 4/2002 | Frank |
| 2004/0182092 A1 * | 9/2004 | Bush ................ A23G 9/20 62/66 |
| 2006/0186137 A1 | 8/2006 | Till |
| 2007/0017234 A1 | 1/2007 | Moulder |
| 2007/0062212 A1 | 3/2007 | Frank |
| 2008/0203113 A1 | 8/2008 | Groh |
| 2008/0254180 A1 | 10/2008 | Windhab |
| 2008/0289357 A1 | 11/2008 | Skobel |
| 2008/0302824 A1 | 12/2008 | Blomme |
| 2010/0044395 A1 | 2/2010 | Webb |
| 2010/0122539 A1 * | 5/2010 | Cocchi ................ A23G 9/12 222/145.6 |
| 2010/0293965 A1 | 11/2010 | Frank |
| 2011/0042414 A1 | 2/2011 | Tachibana |
| 2011/0049190 A1 | 3/2011 | Sevcik |
| 2011/0192423 A1 | 8/2011 | Boussemart |
| 2014/0209635 A1 | 7/2014 | Gates |
| 2016/0229675 A1 | 8/2016 | Popov |
| 2016/0245564 A1 | 8/2016 | Frank |
| 2016/0245573 A1 | 8/2016 | Frank |
| 2017/0027185 A1 | 2/2017 | Acosta |
| 2017/0027188 A1 | 2/2017 | Raybin |
| 2017/0030467 A1 | 2/2017 | Versteeg |
| 2018/0103656 A1 | 4/2018 | Acosta |
| 2018/0106515 A1 | 4/2018 | Cobabe |
| 2019/0070643 A1 | 3/2019 | Wong et al. |
| 2020/0375214 A1 * | 12/2020 | Koehl ................ B08B 9/032 |
| 2022/0104513 A1 | 4/2022 | Tuchrelo et al. |

\* cited by examiner

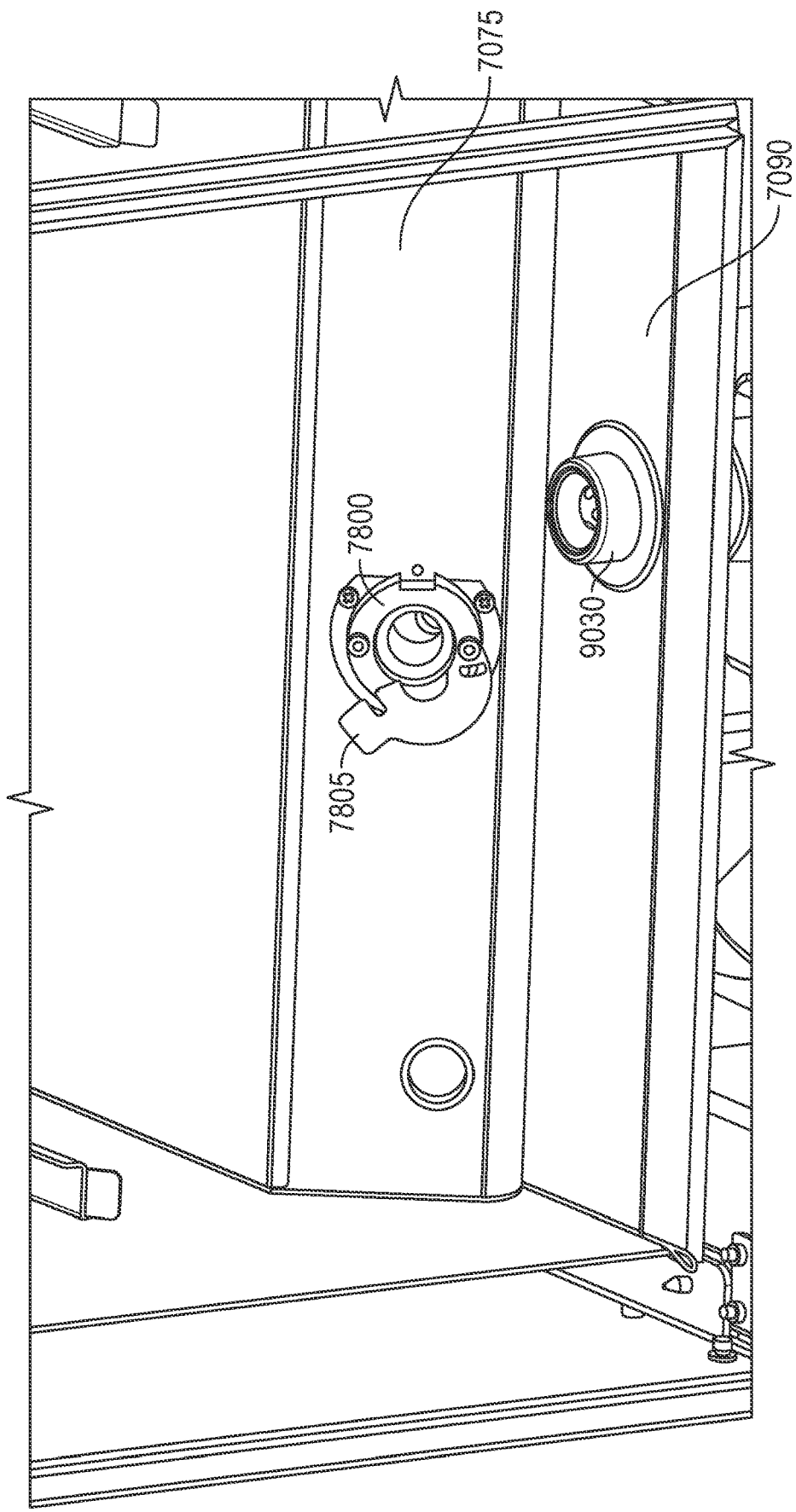

SEALED, SELF-CLEANING, FOOD DISPENSING SYSTEM

CROSS-REFERENCE TO RELATED APPLICATIONS

This application claims priority to U.S. Provisional Patent Application No. 63/363,153 filed on Apr. 18, 2022.

BACKGROUND OF THE INVENTION

The present inventions relate to food dispensing systems and, more particular to sealed and/or pressurized food dispensing systems. Previously such systems have required extensive manual cleaning operations and/or the use of complicated and cumbersome additional attachable equipment for the required cleaning operations. The present disclosure sets forth methods and apparatus that overcome these and other shortcomings that exist with respect to conventional cleaning methods and systems.

BRIEF SUMMARY OF THE INVENTION

A brief non-limiting summary of one of the many possible embodiments of the present is invention is a sealed and/or pressurized food dispensing system with self-cleaning features. Such a self-cleaning food dispenser can include a freezing barrel and a faceplate coupled to the freezing barrel, where the faceplate defines a vertical dispense bore, a cleaning bypass passage, a vent relief bore having an opening extending into the interior of the freezing barrel, a vent activation bore, a vent flush bore a vent relief valve positioned within the vent relief bore, wherein the vent relief valve includes a first surface in fluid connection with the vent activation bore, and wherein at least a part of the vent relief valve is within the vent flush bore. The faceplate of the self-cleaning dispenser can also include portions for coupling to a blocking member such that, when the blocking member is coupled to the faceplate, dispensing of product from the freezing barrel is blocked and a fluid path may be created from the interior of the freezing barrel, through the dispense bore, and into first open end of the cleaning bypass passage.

Additionally, or alternately, the system can include a refrigerated food processing and dispensing system that includes a freezing barrel having an open end; a faceplate coupled to the open end of the freezing barrel, where the faceplate defines a dispense bore passing generally vertically through the faceplate; and a bypass passage having a first end opening external to the faceplate; and a valve stem and a valve stem actuator where the valve stem positioned at least partially within the dispense bore and includes a sealing surface for creating a seal with the dispense bore; and where the valve stem actuator moves the valve stem from a first position, where dispensing of a food product from within the freezing barrel is permitted, to a second position where the seal between the valve stem and the dispense bore precludes dispensing of the food product and where the bypass passage is positioned such that, when the valve stem is in its first position, no fluid path exists between the interior of the freezing barrel and the first end of the bypass passage.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE DRAWINGS

The following figures form part of the present specification and are included to demonstrate further certain aspects of the present invention. The invention may be better understood by reference to one or more of these figures in combination with the detailed description of certain embodiments presented herein.

FIGS. 13C-13E-2 illustrate details concerning embodiments of an exemplary rear seal assembly that may be used in the disclosed system.

Figure 1A:
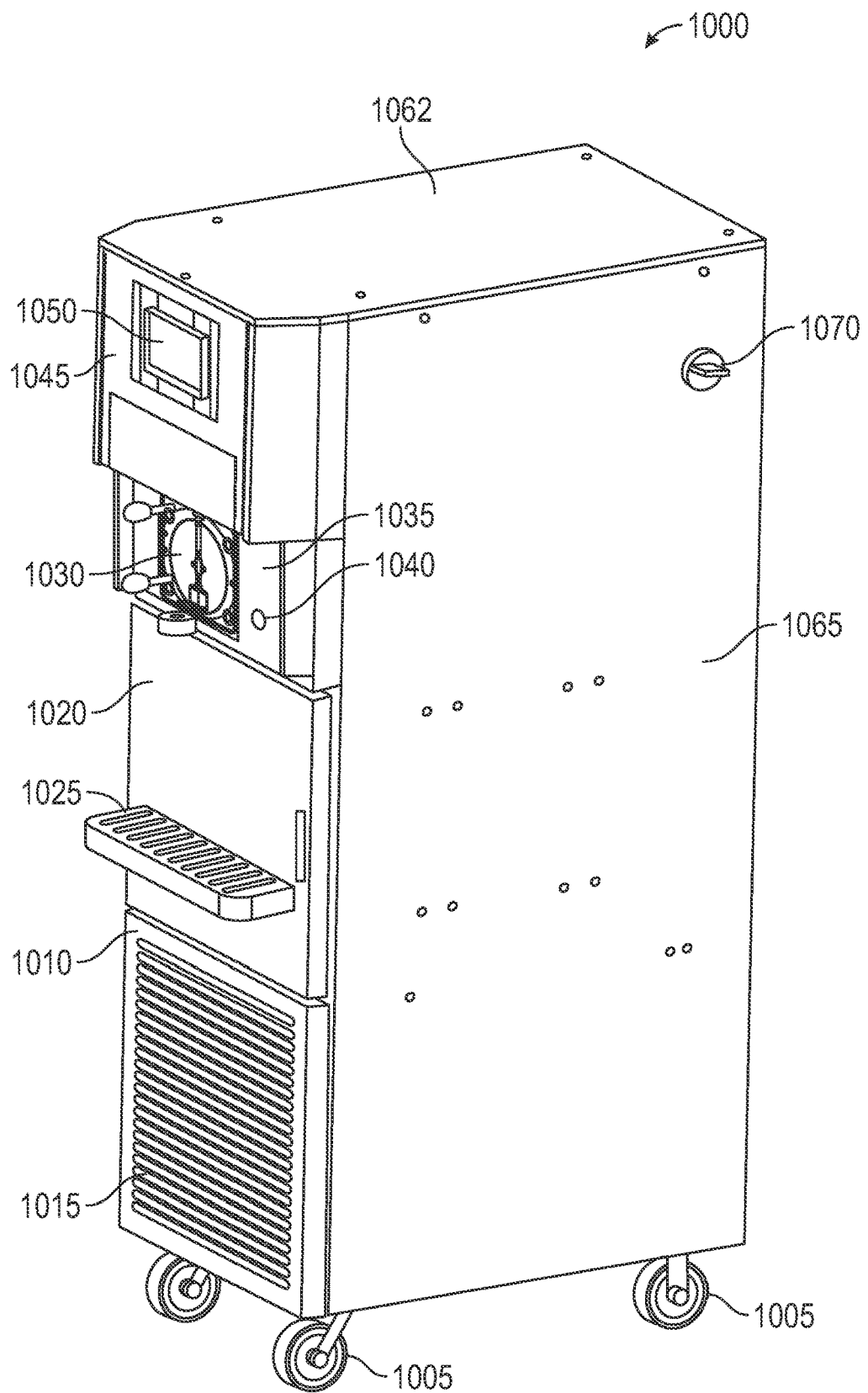
FIGS. 1A-1C illustrate the exterior of the exemplary dispensing system disclosed and taught herein.

While the inventions disclosed herein are susceptible to various modifications and alternative forms, only a few specific embodiments have been shown by way of example in the drawings and are described in more detail below. The figures and detailed descriptions of these embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts illustrated and taught by the specific embodiments.

DETAILED DESCRIPTION

The Figures described above, and the written description of specific structures and functions below, are not presented to limit the scope of what has been invented or the scope of the appended claims. Rather, the Figures and written description are provided to teach any person skilled in this art to make and use the inventions for which patent protection is sought.

A person of skill in this art having benefit of this disclosure will understand that the inventions are disclosed and taught herein by reference to specific embodiments, and that these specific embodiments are susceptible to numerous and various modifications and alternative forms without departing from the inventions we possess. For example, and not limitation, a person of skill in this art having benefit of this disclosure will understand that Figures and/or embodiments that use one or more common structures or elements, such as a structure or an element identified by a common reference number, are linked together for all purposes of supporting and enabling our inventions, and that such individual Figures or embodiments are not disparate disclosures. A person of skill in this art having benefit of this disclosure immediately will recognize and understand the various other embodiments of our inventions having one or more of the structures or elements illustrated and/or described in the various linked embodiments. In other words, not all possible embodiments of our inventions are described or illustrated in this application, and one or more of the claims to our inventions may not be directed to a specific, disclosed example. Nonetheless, a person of skill in this art having benefit of this disclosure will understand that the claims are fully supported by the entirety of this disclosure.

Those persons skilled in this art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

Further, the use of a singular term, such as, but not limited to, "a," is not intended as limiting of the number of items.

Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the scope of what is claimed.

Reference throughout this disclosure to "one embodiment," "an embodiment," "an example" or similar language means that a particular feature, structure, or characteristic described in connection with the embodiment is included in at least one of the many possible embodiments of the present inventions. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of one embodiment may be combined in any suitable manner in one or more other embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. Those of skill in the art having the benefit of this disclosure will understand that the inventions may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood by those of skill in the art that each block of the schematic flowchart diagrams and/or schematic block diagrams, and combinations of blocks in the schematic flowchart diagrams and/or schematic block diagrams, may be implemented by computer program instructions. Such computer program instructions may be provided to a processor of a general-purpose computer, special purpose computer, or other programmable data processing apparatus to create a machine or device, such that the instructions, which execute via the processor of the computer or other programmable data processing apparatus, structurally configured to implement the functions/acts specified in the schematic flowchart diagrams and/or schematic block diagrams block or blocks. These computer program instructions also may be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions also may be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and/or operation of possible apparatuses, systems, methods, and computer program products according to various embodiments of the present inventions. In this regard, each block in the schematic flowchart diagrams and/or schematic block diagrams may represent a module, segment, or portion of code, which comprises one or more executable instructions for implementing the specified logical function(s).

It also should be noted that, in some possible embodiments, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they do not limit the scope of the corresponding embodiments. Indeed, some arrows or other connectors may be used to indicate only the logical flow of the depicted embodiment. For example, but not limitation, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and computer instructions.

The description of elements in each Figure may refer to elements of proceeding Figures. Like numbers refer to like elements in all figures, including alternate embodiments of like elements. In some possible embodiments, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

The embodiments of the exemplary system disclosed and discussed herein takes the form of a system that includes a temperature controlled cylinder (e.g., in the form of a freezing barrel) for dispensing heated, chilled, near-frozen, ambient temperature, and/or frozen food items. It should be understood, however, that the reference to such a food item is exemplary only and that the disclosed system may be used for dispensing food items of varying temperatures and/or consistencies. In one of many examples, the exemplary component described herein as a freezing cylinder could be operated as, or replaced with, a heating container such that the described dispenser may be used to dispense a heated food item (such as a hot beverage or soup). Alternatively, that described component could, in suitable circumstances, be used to dispense food items at ambient temperatures. As such all specific references herein to a "freezing" cylinder (or freezing barrel) are exemplary only and it will be understood that, in alternate embodiments, the "freezing" cylinder could be replaced with any temperature-controlled cylinder and, in still further embodiments, in some instances, with a cylinder in which the temperature is not directly controlled but is allowed to tend towards ambient temperature levels.

It should also be understood that the following example focuses on a dispensing system that includes a single freezing cylinder. This is exemplary only and the concepts, ideas, and teachings of this disclosure can readily be expanded to systems that include multiple cylinders and/or where the container from which the food item is dispensed takes the form of something other than a cylinder, such as a storage container having a cross section other than circular.

Figure 1B:
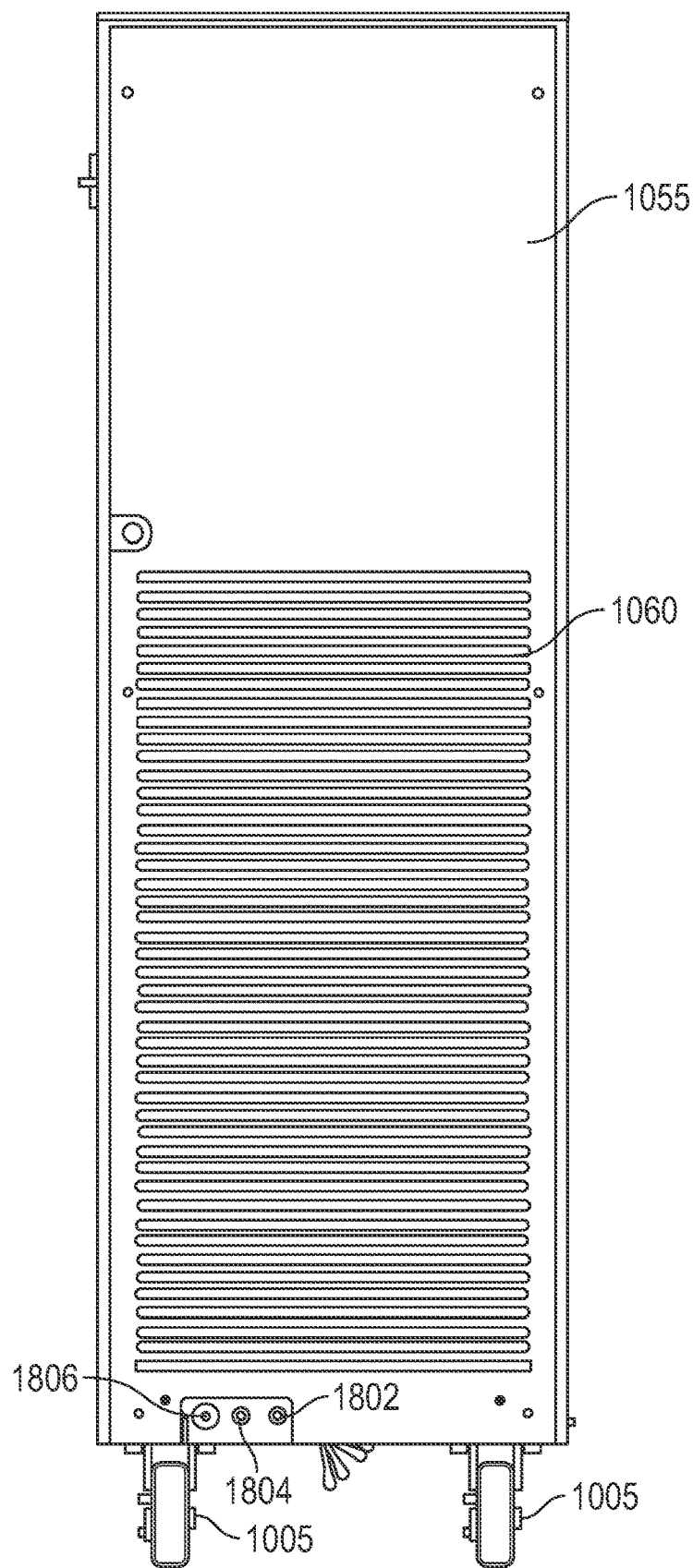
Figure 1C:
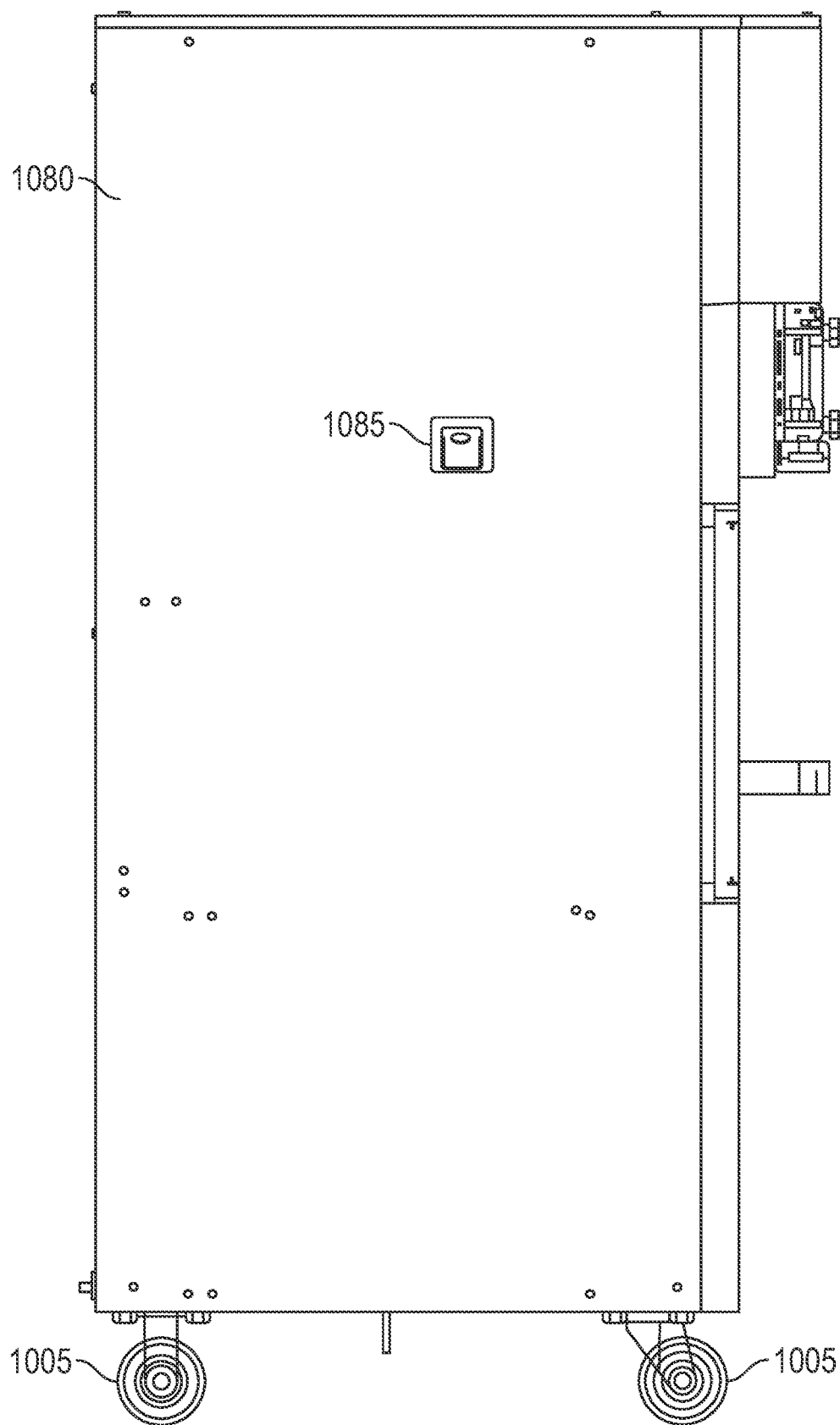

Turning to the drawings and, in particular, to FIGS. 1A-1C, an illustrative exemplary embodiment of a compact, highly controllable, variable-product, sealed, self-cleaning pressurized food dispensing system 1000 is depicted.

In the illustrated example, the overall food dispensing system 1000 comprises various sub-systems, with each comprising one or more components that are contained within and/or attached to a frame structure formed from a plurality of base frame elements and a plurality of structural panels coupled to the frame elements. In the example of FIGS. 1A-1C, the overall system is coupled to four caster assemblies

1005 (two of which are lockable) to facilitate movement and positioning of the illustrated dispensing system. Alternate embodiments are envisioned where legs or other support structures may be used in place of casters and where the system structure rests directly on a floor, a work surface, a tabletop, or other stable base structure.

As reflected in the figures, the front portion of the dispensing system 1000 includes a lower front kick plate 1010 that defines a plurality of openings in the form of substantially horizontal vents 1015, each of which extends across the majority of the surface of the kick plate 1010. The purpose of the vents in the kick plate is to permit air to pass from the exterior of the system to the interior of the system, or in some circumstances in the opposite direction. The front portion of the dispensing system also includes a refrigerator door 1020 that, as discussed in more detail below, may be opened to access a refrigerated product storage compartment positioned within the interior of the system. In the example of FIGS. 1A-1C, the refrigerator door 1020 is formed of an insulated door that is adapted to be connected to hinges, such that the door may be opened and closed to access the refrigerated storage compartment within the system.

As reflected in FIGS. 1A-1B, the refrigerator door 1020 may be located above the kick plate 1010 and below a dispenser system 1030 (discussed below). In the illustrated example of FIGS. 1A-1C, a drip tray 1025 may be connected to the refrigerator door 1020 and moves with the refrigerator door 1020 when it is open and/or closed. It will be appreciated that the specific location of the drip tray 1025 in FIGS. 1A-1C is exemplary only and that the drip tray can be positioned at alternate locations without departing from the teachings of this disclosure. For example, alternate embodiments are envisioned wherein the drip tray is positioned and connected above the kick plate and below the door, such that the drip tray remains static while the refrigeration door opens and closes. As best shown in FIG. 1A, the exemplary dispenser system 1000 includes a dispensing faceplate (unlabeled in FIG. 1A-1C) and a cold pack cover panel 1035, both of which may be located above the refrigerator door 1020. In the illustrated example, a user interface in the form of a push-button dispensing switch 1040 is positioned within the cold pack cover panel 1035 which (as discussed in more detail below) may be used to dispense product from the system.

It will be appreciated that the use of a push-button dispensing switch to control the dispensing of product from the system is exemplary only and that other apparatus and systems known to those skilled in the art may be used to control the dispense operation. For example, alternative embodiments are discussed below in which a lever is manipulated to dispense product from the system 1000.

Referring back to FIG. 1A, a top front cover panel 1045 may be located above the cold pack cover panel 1035 and an electronic display 1050 may be positioned within top front cover panel 1045. The electronic display may be used to configure and control aspects of the system 1000, to provide diagnostic and operating information about the system, and/or to display images and communications of interest during the normal operation of the system (e.g., information about the product to be dispensed by the system or promotional information about items offered at the location in which the system 1000 is located).

The rear of the illustrative system is generally shown in FIG. 1B. As reflected in the figure, the rear of the illustrated system comprises a rear panel 1055 that defines a number of substantially horizontal vents 1060 that extend across approximately the lower ⅔ the rear panel and a substantially unvented portion of the panel that extends across approximately the upper ⅓ of the rear panel. The purpose of the vents in the rear panel is to permit air to pass from the interior of the system to the exterior of the system, or in some circumstances in the opposite direction. It will be appreciated that the depiction of horizontal vents is exemplary only and that vents having alternate forms and orientations be used without departing from the teaching of the present disclosure. For example, the vents need not take the form of slits and could, alternately, take the form of circular or other-shaped openings. Further, the vents need not be arranged horizontally and could, in alternative embodiments, be arranged vertically, on a slant, or in any other orientation. In the illustrate embodiment of FIG. 1B connection points are provided at the lower rear of the unit for connecting the disclosed system to a drain through drain connection 1806, to a source of water through water supply connector 1802, and (optionally) to an external source of pressurized gas or air through optional gas connector 1804. It will be appreciated that the illustrated location and arraignment of the described connectors in exemplary only and that they location and arrangement of such connectors can be changed without departing from the teachings of this disclosure.

As reflected in FIG. 1A, this embodiment of the exemplary system 1000 has a top of the system that comprises a solid top panel 1062 that does not include a hopper cover or any removable structure for the addition of products or ingredients to the system. In envisioned embodiments, this top surface may be load-bearing so that a display may be mounted or attached.

As also reflected in FIG. 1A, the exemplary illustrated system may include a first side panel 1065 that is substantially solid except for openings for connecting components (e.g., screws, rivets or bolts) and an opening within which may be positioned a power and/or motor disconnect switch 1070. In the specific example of FIG. 1A, the motor disconnect switch 1070 takes the form of an all pole disconnect switch that can be used to switch all power off to the system. It will be appreciated, however that the use of an all pole disconnect switch is exemplary only and that, in certain applications, alternate switches and disconnects could be used, (such as, for example, a disconnect switch that switches power off to one, or a subset of components within the system, such as a motor). The specific form of any disconnect switch may vary depending on user preference, intended application, and/or applicable product safety standards.

As reflected in FIG. 1C, the exemplary system includes a second side panel 1080 that, like the first side panel, is substantially solid except for openings for connecting components (e.g., screws, rivets or bolts) and an opening 1085 in a portion of the upper ⅓ of the second side panel. As described in more detail below, the opening 1085 is associated with a rear seal drip tray and may be useful for providing a visual indication of aspects of the interior of the system 1000 during operation of the system. It could be appreciated that the location of the drip tray shown in FIG. 1C is exemplary only and that the drip tray could be positioned in a different location without departing from the scope of the present disclosure. For example, in alternate embodiments, the drip tray could be located such that it opens into panels other than panel 1080.

Of note, in the illustrated example, there are no air vents located in either the first side panel or the second side panel and the majority of the first and second side panels are solid. This construction is permitted by the fact that in the illustrated example, the primary airflow paths through the system are from the back of the system, through the rear panel 1055, through the interior of the system, and out of the front of the system—through the vents in the kick plate 1010. This back-to-front airflow may be advantageous because it permits the illustrated system to be positioned closely adjacent, in a side-by-side manner, with other dispensing systems of a similar design and/or other systems or structures without materially impacting the operation of the system.

While the exemplary system 1000 is described herein with the airflow from the back-to-front, the disclosures and teachings herein may be used by those sufficiently skilled in the art to envision a system with the airflow from the front to the back, from one side to the other, from top-to-bottom (or vice versa) or in other directions, without departing from the inventions disclosed herein.

Given the desirability of arranging a number of frozen product dispensers side-by-side (e.g., in a location where different dispensers dispense different flavors of soft-serve ice cream) this ability to arrange a plurality of systems in close proximity with each other, on a side-by-side basis may be of significant commercial vale.

As will be appreciated from FIGS. 1A-1C, a further significant advantage of the illustrated system is that all components of the system may be configured and arranged to fit within a very compact footprint. In the illustrated embodiment, for example, the components of the illustrated system have been selected and arranged so that the overall system can fit within a space no larger than 33.5 inches in depth, 65.5 inches in height and 20 inches in width. This compact footprint is of significant commercial value in that it enables the use of a single dispensing system in a tightly confined space and/or the use of a plurality of dispensing systems within a given space than would be permitted if conventionally sized frozen food dispensers were utilized.

In general, the exemplary system 1000 described above may be operated in at least three different operating states: (a) a product formation and dispense state; (b) a self-cleaning state; and (c) a lock-out state.

In a first operating state, in which food product may be formed and dispensed, the system 1000 processes one or more provided food ingredients to produce a product having certain target characteristics (e.g., a soft-serve ice cream product, a shake or a smoothie product having a desired consistency, etc.). When operating in this state, the system 1000 may be provided with one or more food ingredients. In one embodiment, the food ingredient may be in the form of a liquid ingredient contained in a sterile or substantially sterile bag container that includes a connecting port. These ingredient containers may be positioned within a product compartment within the system where they may be maintained at a temperature intended to maintain the freshness of the product and to avoid undesirable bacteriological growth. One exemplary embodiment of such a compartment may be a refrigeration compartment, but as disclosed elsewhere within this disclosure, it may be a heating compartment or a compartment to maintain any other temperature or environmental condition such, but not limited to pressure and humidity. In alternate embodiments, the food ingredient (or ingredients) may be provided in a sanitary (but not sterile) container. In still a further embodiment, the system can be adaptable to accept one or more food ingredients in either a sterile or a sanitary form. In such embodiments, the system can further be configured to automatically detect, e.g., through the use of a scanner or a sensor that will detect an indicia associated with the food ingredient supply container, the nature of the provided ingredient. In alternate embodiments, the system can include a scanner that can be used by a user to scan an indicial that provides information about each provided food ingredient. In still other embodiments, the user can manually enter information about each provided food ingredient and/or use an automatic detection device and/or a scanner to provide the system with such information. In such embodiments, the system can use the provided information to determine recommended and/or mandatory cleaning intervals for the system and/or product expiration. In embodiments where multiple food ingredients are used in the system, the shortest recommended/mandatory cleaning intervals and the shortest product expiration intervals can be selected by the system. In such embodiments, the system can use the electronic display, sounds, a notice light and/or other communications (such as a text message, an e-mail message, etc.) to notify a user that a recommended or mandatory cleaning interval has arrived or is approaching) and/or that a recommended or mandatory product expiration interval has occurred or is approaching. In still further embodiments, the system can be configured to lock out all dispense or product creation operations upon the expiration of a cleaning or product expiration interval without the detection of a cleaning operation or a product replacement.

Within the refrigeration compartment, the bag containers may be coupled through the connecting port to a product conveyance system that, among potentially many other things, pumps the liquid food ingredient from the bag container to a mixing reservoir. The conveyance system may optionally mix the liquid food product in the mixing reservoir with one or more pressurized gases. Similarly, the conveyance system may optionally mix the liquid food product (with or without the added gas or gases) with water or another liquid. With or without any additions, the conveyance system may pump the liquid food product into a product formation chamber which, in the illustrated example, may take the form of a freezing cylinder.

The system may then control the temperature within the freezing cylinder chamber and the operating characteristics of a scraper, an auger and/or a scraper/auger assembly to convert the liquid food product pumped from the bag container into a food product having a desired consistency. For example, if the food ingredient in the bag is intended to be used to prepare a product that can be dispensed as soft-serve ice cream, the system may control the components of the freezing/cooling chamber to produce a product having the desired characteristics for soft-serve ice cream. Alternatively, if the desired dispensed product is a shake or a smoothie, the disclosed system may control the operation of the freezing/cooling system to produce a product having the desired consistency for such products. Still further, the system may adjust the temperature within the freezing cylinder in such a manner that any frozen product within the cylinder is melted (or liquified) and then refrozen and/or reconstituted. The ability of the present system to liquify and reconstitute the product in the cylinder permits control and maintenance of key product characteristics, such as consistency, feel in the mouth, texture, etc. Given the high degree of controllability permitted by the present system, the consistency and nature of the dispensed products are not limited to soft-serve, shakes and smoothies and may span a range from a highly viscous dispensed product, to a product having a consistency of thick-packed soft-serve, to a product having a water-like consistency and/or most any consistency in between.

During a second operating state, the disclosed system may provide a self-cleaning feature where the components within the system 1000 that come into contact with the ingredients used to form the dispensed product and/or any dispensed or intermediate forms of the food product are cleaned and sanitized without any significant operator involvement (other than to potentially add cleaning solutions and/or initiate the cleaning process). In addition, in the illustrated embodiment, the disclosed system cleans and sanitizes components within the self-cleaning circuit, in addition to providing an ability to self-clean the system components that come into contact with ingredients and/or products (sometimes referred to as the product circuit). This ability to self-clean, and to self-clean both components within the product circuit and the self-cleaning circuit, is one of many important aspects of certain embodiments of the present system.

During a third operating state, the system may be placed in a lock-out state where no product can be dispensed until certain other actions are performed and/or certain system checks are made. As discussed below, this lock-out state may be useful in ensuring efficient and proper operation of the system.

The disclosed exemplary system varies from other systems for food preparation and dispensing systems in many ways. Those ordinarily skilled in the art and in possession of the disclosures and teachings contained herein may see at least the following exemplary differences: the system may be capable of processing a wide-variety of products; may be capable of processing each of the various products to reach one or more desired product states (where each product state is associated with an aggregate of product characteristics, such as consistency, density, overrun, etc.); may be capable of automatically promoting safe and efficient operation of the system; and may be capable of providing self-cleaning (or clean-in-place) functionality. The general structure of the exemplary disclosed system and its various modes of operation may be better understood through consideration of FIGS. 2A-2C which schematically provide a piping and instrumentation diagram of the pneumatic and fluid systems within the overall exemplary dispensing system.

Figure 2A:
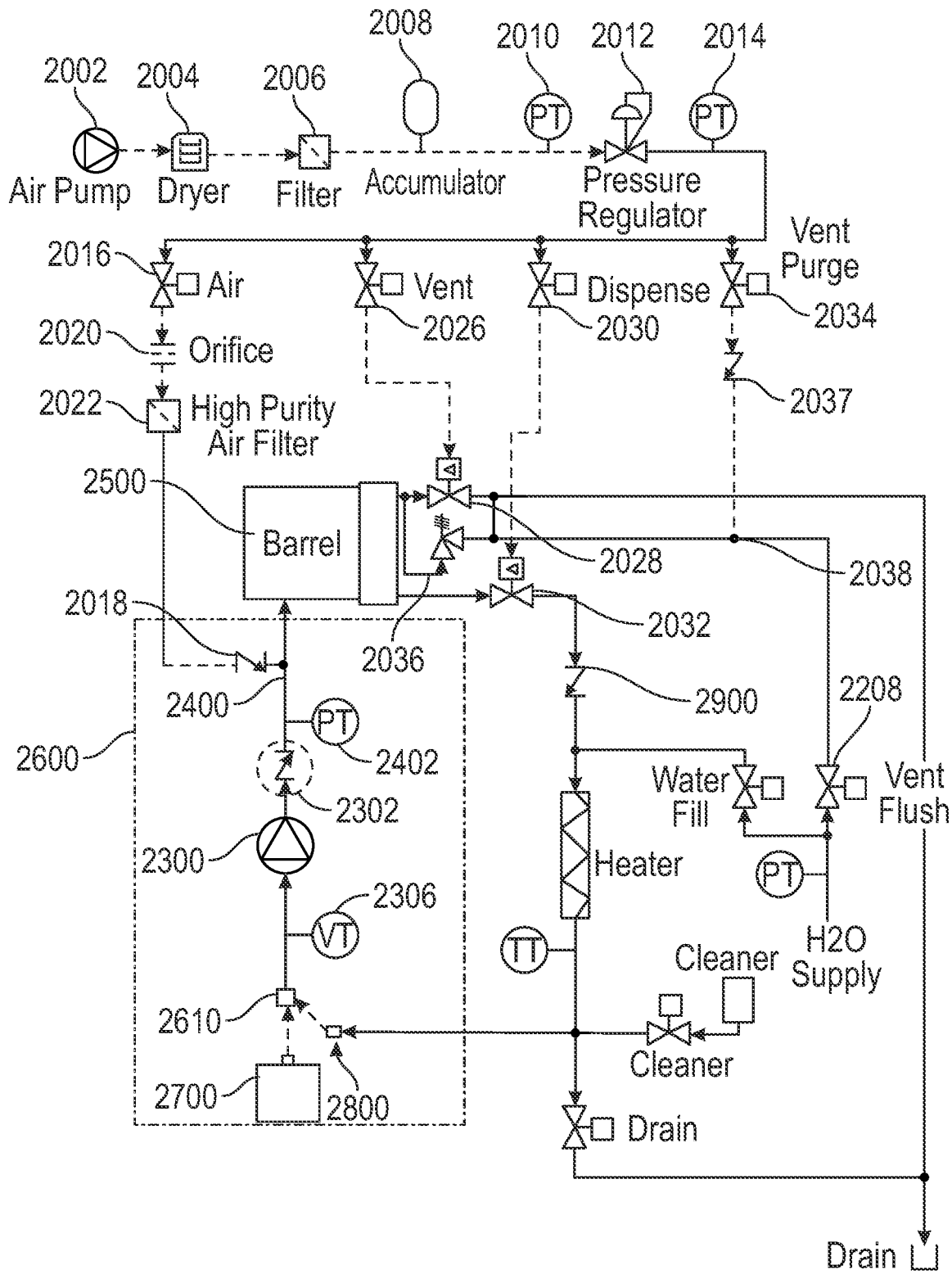
FIGS. 2A-2D schematically illustrate various components of the exemplary dispensing system and the connections between those components.

It should be understood that FIG. 2A illustrates various components that, in an implemented system, may be dynamically controlled by a system controller. While FIG. 2A does not specifically illustrate the connections between the various controlled devices and the system control system, it should be understood that such connections, and those envisioned by those ordinarily skilled in the art, may exist in any implemented system. In the same sense, FIG. 2A illustrates various sensing devices that provide output signals that reflect various operating conditions of the system. It may be understood that, while the connections between such sensing devices and the system control system are not shown, such connections may exist in any exemplary implemented system. Furthermore, while a specific system control system is not illustrated in FIG. 2A, it may be understood that such a control system may take the form of any suitable control system and, in one of many exemplary embodiments, could take the form of a dedicated programmable logic controller (without any interfaces necessary to provide the appropriate control signals or receive any appropriated sense signals), a custom control board, or a distributed control system in which the control logic is implemented in control modules positioned throughout the system.

At a high level, the connections and components depicted in FIG. 2A may be divided into three general groups: a first group of connections and components associated with the treatment, storage and distribution of one or more gases (e.g., compressed atmospheric air); a second group of connections and components associated with the preparation and dispensing of a food product; and a third group of piping and components associated with self-cleaning and self-sanitizing features. Each of these groups will be separately discussed.

Referring to FIG. 2A, certain piping and components associated with an exemplary system involving the treatment, storage and distribution of one or more pressurized gases is illustrated. In general, the exemplary system may use one or more pressurized gases to both: (a) operate various pneumatic components of the system and (b) inject gas into the product freezing chamber. In the exemplary embodiment of FIG. 2A, the pneumatic system uses a single pressurized gas in the form of compressed atmospheric air generated within the system through the use of an on-board compressor for both purposes. In other embodiments, atmospheric or other gases may be used from an external source such as a gas cylinder.

As reflected in FIG. 2A, an air pump/compressor 2002, which is preferably in the form of an oil-free pump, may be provided that is capable of pumping air from outside the illustrated pneumatic system into the system. In the illustrated system, the air pumped by air pump 2002 is passed through a dryer 2004 and a filter 2006 (through one or more check valves, illustrated) into an air accumulator 2008 which may take the form of an air tank. In the illustrated embodiment, the air accumulator 2008 may take the form of a polypropylene tank having a capacity of approximately 35 cubic inches, with a nonreactive material, such as but not limited to polypropylene, being selected to avoid the formation of rust or corrosion.

A first pressure transducer 2010 may be provided to monitor the pressure at the output of the accumulator 2010 and the output of the first pressure transducer 2010 can be provided to an overall system controller or a dedicated controller to control the operation of the air pump 2002 so that the air pressure within the accumulator 2008 is maintained within a desired range. In the exemplary embodiment, the pump 2002 and the first pressure transducer 2010 operate to maintain the pressure within the accumulator 2008 within a given desired range. In one embodiment, the pump 2002 and first pressure transducer 2010 may be used to maintain the pressure within the accumulator 2008 such that it is always equal to or above approximately 60 PSI and equal to or below approximately 90 PSI.

As shown in FIG. 2A, the output of the accumulator 2008 is also applied to the input of a pressure regulation device 2012. The pressure regulation device 2012 is used to provide at its output a source of pressurized air that is maintained at a relatively stable air pressure. In one exemplary embodiment, the output pressure from the regulation device 2012 is set such that it is approximately 60 PSI. A second pressure transducer 2014 may be used to monitor the output of the pressure regulator 2012 to ensure that the pressure regulator and the pneumatic system is operating properly.

In the illustrated exemplary system, the pressurized air available at the output of the pressure regulator 2012 is provided to a number of electrically controlled solenoid valves that can be actuated to provide pressurized air to other components of the system. In the exemplary example, the pressurized air may be provided to four electrically controlled valves, each of which is separately discussed below.

As shown in FIG. 2A the regulated pressurized gas available at the output of the pressure regulator 2012 is provided to a first electronically controlled three-way solenoid valve 2016 that, when actuated, will pass the regulated pressurized gas through the valve 2016 and eventually through a check-valve 2018 into a junction point where (as described below) the provided gas can mix with fluids pumped through a pump 2300 at a mixing junction point or passage 2400. As shown in FIG. 2A, a pressure transducer 2402 may be used to provide a signal indicative of the pressure at the mixing junction point or passage 2400.

As reflected in FIG. 2A, the gas flowing through the first valve 2016 can optionally flow through a flow control orifice device 2020 and a high purity air filter 2022 before flowing into and through the air check valve 2018. As described in more detail below, the pressurized gas flowing through the check valve 2018 can be used by the system, among other things, to inject a gas into the ingredients provided to the freezing cylinder 2500 to affect the characteristics of the product to be dispensed from the system and/or introduce gas into fluids circulating through the system for cleaning and/or sterilization purposes. For example, in certain cleaning operations, the check valve 2018 (or an additional check valve fed from a different gas supply line) may be used to provide ozone gas, or any other suitable sanitizing fluid, for use in sanitizing the components of the illustrated dispensing system.

As discussed above in connection with FIGS. 1A-1B, the exemplary embodiment under discussion, includes a refrigerated ingredient storage compartment in which ingredients used to form the dispensed food product may be stored. In the FIG. 2A, the dashed box 2600 is intended to reflect the physical boundaries of the ingredient refrigeration compartment, discussed in more detail blow. Thus, as shown in FIG. 2A in the illustrated embodiment, the pressurized gas line from the air valve 2016 penetrates the refrigeration compartment such that the mixing junction at which the provided pressurized gas mixes with the ingredient line to the freezing cylinder 2500 is located within the refrigeration compartment.

As further reflected in FIG. 2A the pressurized gas from the regulator 2012 is also provided to second electrically controlled solenoid valve 2026 that is used to control the application of pressurized gas to a pneumatic line that, in turn, is used to control a freeze cylinder vent-relief valve or valve assembly 2028. Valve 2026 may take the form of a three-way valve, such that the pressure in the pneumatic line is vented to ambient pressure when the control solenoid is off. As discussed in more detail below, the freeze cylinder vent element 2028 is an element that can be activated (through activation of the second electrically controlled solenoid valve 2026) to provide a path through which gases (and, potentially fluids) can be discharged from the freezing cylinder 2500 to reduce the pressure within the freezing cylinder.

As further reflected in FIG. 2A in the exemplary embodiment, the pressurized gas from the regulator 2012 may also be provided to a third electrically controlled solenoid valve 2030, that may take the form of a three-way valve. As discussed in more detail below, valve 2030 may be used to control the application of pressurized gas to a dispense assembly 2032 (discussed in more detail below) that can be activated to dispense food product from the freezing cylinder 2500. Note that when the valve 2030 is a three-way valve, the pressure in the pneumatic line coupled to the dispense assembly 2032 may be vented to ambient pressure when the control solenoid is off.

As still further reflected in FIG. 2A in the illustrated embodiment, the pressurized gas from the regulator 2012 is also applied to fourth electrically controlled solenoid valve 2034 that controls the application of pressurized gas to an air check valve 2037 and to a junction point 2038 where the provided gas mixes with the output from a vent flush valve 2208 (discussed in more detail below).

As discussed in more detail below, the valve 2034 can be operated to perform a variety of different functions. Among them, the valve 2034 may be activated to supply pressurized gas to a cylinder vent relief assembly flush passage 2036 (and vent relief valve 2028) within the dispensing unit face plate (discussed below) so that it can be entrained into a fluid supply line used during a self-clean operation to clean the cylinder vent relief assembly flush passage 2036 (and vent relief assembly 2028). In addition, the valve 2034 may be activated simultaneous with one or more of the other valves 2016, 2026, and/or 2030 to adjust the instantaneous pressure in the pneumatic line coupled to the input lines for valves 2016, 2026, and/or 2030 so as to control the amount of gas passed through the other valves during the periods of simultaneous activation. Thus, for example, simultaneous activation of the valve 2034 with the valve 2016, may be used to adjust and control the amount of pressurized gas provided to the mixing junction 2400 (discussed above). Note further that the valve 2034 may be activated prior to or after activation of valve 2016, that the valves 2034 and 2016 may be activated alternatively, or in alternating intervals of simultaneous activation and singular activation, to control the same.

In the example described above, each of the three-way solenoid valves 2016, 2026, 2030 and 2034 is an electrically actuated normally closed valve that may be activated by the provision of a 24V signal to the control line for each valve. As noted above, these solenoids may be directly controlled by the outputs of a controller or by outputs from an intermediate signal board that converts signals from a controller into signals capable of controlling the state of the solenoid valves.

As will be appreciated by those skilled in the art and in possession of the disclosures and teachings of this disclosure, in the example of FIG. 2A, the compressed atmospheric air available in the accumulator 2008 provides the sole source of pressurized gas. This pressurized gas may be used for a variety of purposes including, but not limited to: (a) providing a source of gas to be combined with an ingredient feed line prior to the ingredient being fed into the freeze cylinder; (b) actuating various pneumatically actuated components in the system (e.g., vent relief assembly 2028 and the dispense assembly 2032); and (c) purging various lines or providing a source of gas for aeration. Alternate embodiments are envisioned, however, in which the system utilizes alternative sources of gas. For example, alternative embodiments are envisioned where there is no on-board air compression system and pressurized gas is supplied from an external source to the regulator 2012. Still further alternative embodiments are envisioned where a source of regulated gas is provided at a point corresponding to the output of regulator 2012 and there is no regulator within the system.

Still further alternative embodiments are envisioned wherein the gas used to combine with the product feed line into the freeze cylinder is different from the gas used in other portions of the pneumatic system. Such alternate embodiments are of potential benefit in systems where specialized gases are desired to be used for product formation and/or where compressed atmospheric air may be unsuitable.

For example, alternative embodiments are envisioned where the gas input line coupled to the solenoid valve 2016 is provided at the output of a gas manifold that, in turn, is coupled to two or more different gas sources. The three different gas sources may comprise three containers of the same compressed gas (e.g., an oxygen mix) or three containers of different gases (e.g., a sanitizing and/or cleaning gas composition, nitrogen, and/or carbon dioxide). Control elements in the manifold could be used to direct different gases to the solenoid valve 2016 and, this in turn, into the line feeding the cylinder and, thus, into and through various components in the system.

Thus, for example, if the product to be dispensed is intended to be a frozen coffee product, the manifold may be operated to provide nitrogen into the product feed line. Similarly, nitrogen may be used in applications where the dispensed product will be a nutraceutical product or a food product used to feed hospital patients or individuals with various compromised immune systems since the growth rate of microbes in a sterile, nitrogen rich environment will typically be less than the growth rate of microbes in an atmospheric environment.

Alternatively, if the product to be dispensed is intended to be a frozen carbonated product, then the manifold may be operated to provide carbon dioxide to the feedline.

Still further, if the provided gas is a sanitizing and/or cleaning gas, the gas may be introduced into the system as part of a self-cleaning operation to assist in the sanitization and/or cleaning of the overall dispending system.

As described above, the exemplary dispensing system may be operated in various modes including a product formation and dispensing mode and a self-cleaning mode. In the exemplary system, the configuration of the system—and in particular some of the piping connections—may vary between some or all of the different modes. This piping configuration may be adjusted in several ways including, for example, through user interaction with the system.

In the described example, the illustrated system includes a fluid input connector 2610 (designated generally in FIG. 2A) that may be coupled to either: (a) an outlet port from an ingredient supply source (designated generally as 2700 in FIG. 2A) when the system is intended to be in the product formation and dispense mode or (b) a self-cleaning receiver port 2800 (discussed in more detail below) when the system is intended to be operated in the self-cleaning mode.

In addition, the illustrated system includes a system bypass passage 2900 that is either: (a) disabled (such that it is NOT within the flow path of material dispensed from the freezing cylinder 2500) when the system is to be operated in the product formation and dispense mode; or (b) enabled (such that material dispensed from the freezing cylinder will flow into the bypass passage 2900 when the system is to be operated in a self-cleaning mode).

Figure 2B:
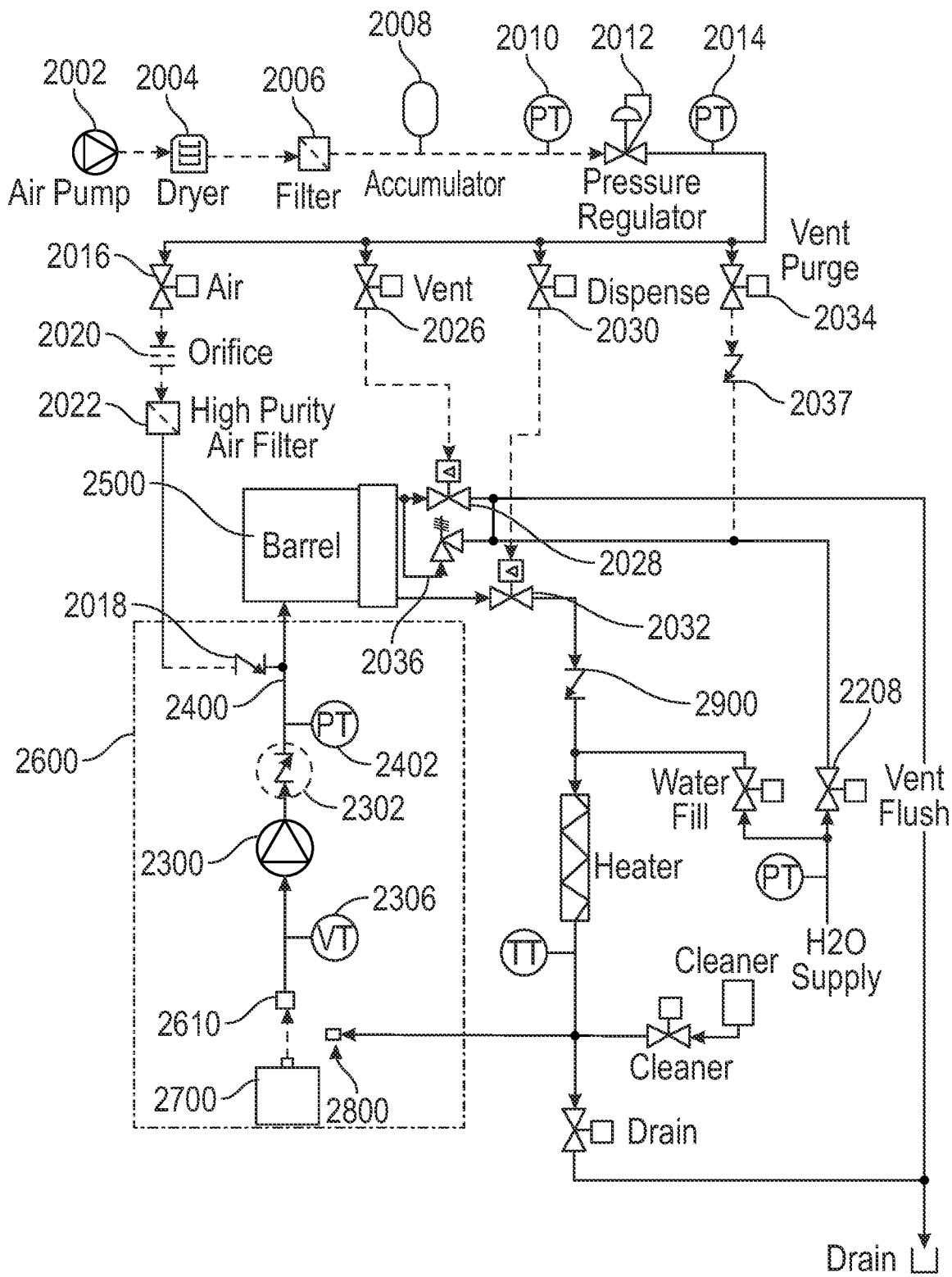

FIG. 2B illustrates the configuration of the illustrated system when the system is intended to operate in the product formation and dispense mode. As noted above, in this configuration, the system fluid input connector 2610 is coupled to an ingredient supply element 2700 and the system bypass passage 2900 is NOT within the flow of the system (e.g., it is not enabled).

Referring to FIG. 2B, it will be seen that in the illustrated configuration the output from the ingredient supply element 2700 is coupled to the input of a fluid pump 2300. As such, operation of the pump 2300 will cause ingredient to be pulled from the ingredient supply element 2700 into the line connecting the pump 2300 with the freezing cylinder 2500.

The pump 2300 may take the form of a suitable pump and it may be actuated electrically or pneumatically. In the example under discussion, the pump 2300 may take the form of a positive displacement pump, or for example a peristaltic pump. In some embodiments, a check valve 2302 may be provided in the line between the pump 2300 and the freezing cylinder 2500 to prevent any backflow of material into the pump. It will be appreciated that when the pump 2300 takes the form of a peristaltic pump, a check valve 2302 may not be required to prevent backflow, but could be optionally included.

As shown FIG. 2A, sensors may be placed at the input of and the output of the pump 2300 to provide information to the control system concerning the operation of the pump and/or the extent of ingredients being supplied to the freezing cylinder 2500. In the example, of FIG. 2B the sensor 2402 takes the form of a pressure transducer. In the example of FIG. 2B the sensor 2306 may also be a pressure transducer, although it will be understood that other forms of sensors, such as a flow sensor that would detect flow through the line between the system input port 2610 and the pump 2300, or a volume sensor that would detect the volume of such flow, could be used instead of or in addition to a pressure sensor.

In general, during the mode of operation reflected in FIG. 2B, operation of the pump 2300 will pull ingredients from the ingredient supply source 2700 through the pump 2300 (and the optional check valve 2302) to the junction point or passage 2400. At that point, through operation of the air valve 2016, pressurized gas (or air) can be injected into the system at the junction point or passage 2400 to inject air into the ingredient supply line feeding the freezing cylinder 2500.

The unique arrangement of the components in the illustrated system allows for the dynamic control of the overrun of the ingredient material provided to the freezing cylinder which, in turn, allows the illustrated dispensing system to dynamically control one or more characteristics of the dispensed food item. It also allows, for example, an arrangement that permits purging of the system of product. Such purging can be useful, for example, during a draining process.

One characteristic of the dispensed food item that may be dynamically controlled through use of the present system is overrun.

In general, with respect to a dispensed food product—and in particular a dispensed frozen food product such as soft-serve ice cream—overrun refers to the extent of the dispensed product that comprises air (or another gas) incorporated into the dispensed product. In some instances, overrun is defined as a percentage number where the percentage refers to the percentage of expansion of the product resulting from the incorporation of air (or another gas) into the product. Thus, for example, if 1 gallon of liquid ingredient is combined with air (or another gas) to produce 1.3 gallons of dispensed product, the overrun in such an example would be 30%.

In the illustrated embodiment, the extent of overrun for the dispensed product may be controlled by controlling the operation of the solenoid valve 2016, which controls the amount of air fed to the ingredient output line from the ingredient pump 2300. For example, in one embodiment the solenoid valve 2016 could be controlled to operate in accordance with a pulse width modulation control strategy where pulses of air are applied at a determined period (e.g., approximately 300 milliseconds) and the width of the pulses is controlled from a minimum pulse width of 0% of the available pulse period to 100% of the available pulse period. In alternate embodiments, a pulse frequency modulation approach could be used where constant width pulses are applied at differing frequencies to control the amount of air (or other gas) provided to the output of the ingredient pump.

Still further embodiments are envisioned wherein the valve 2016 is a dynamically adjustable valve that can—for example—be controlled to open an area of a passage within the valve such that operation of the valve 2016 can control the extent of the air (or other gas) provided to the junction point or passage 2400. Still further embodiments are envisioned where a form of metering pump may be used to control the amount of air (or other gas) provided for incorporation into the dispensed product.

As will be appreciated through the use of the dynamic overrun control components discussed above, the overrun of the dispensed product may be controlled and tailored to produce a desired output product for a given ingredient set and/or to adjust the extent of the overrun to accommodate different products. For example, embodiments are envisioned where indicia on a product ingredient bag will contain an indication of the optimum overrun for that ingredient. In such embodiments, a user or operator of the described system can—upon the coupling of a given ingredient supply unit to the system—compare the system overrun settings with the pertinent optimum overrun setting and adjust the overrun setting to the optimum setting. Such an adjustment can, for example, be accomplished through the use of a touch screen interface (or any other interface known to those skilled in the art, which may include a wirelessly connected interface). In one envisioned embodiment, the system may be provided with an interactive display screen (e.g., a touch screen display and the overrun adjustment can be accomplished through the user or operator interfacing with the display, for example by adjusting a slider bar that sets the overrun amount.

Still further embodiments are envisioned wherein each ingredient supply unit includes a machine-readable code (e.g., a QR code) that is scanned—either by a reader within the dispensing system or a reader that is in communication with the system—and the scanned code will be used to set the overrun, or other parameters obtainable from a bag label, for the system.

In addition to being able to dynamically control the overrun for purposes of creating a desired dispensed product, the overrun control system described herein may be used to dynamically control the amount of air (or other gas) introduced into the feed line to the freezing cylinder 2500 to control and enhance the freezing/refrigeration operation of the system.

For example, the freezing characteristics of a product within the freezing cylinder will typically vary with the amount of air within the freezing cylinder 2500. If the system determines that the freezing operation is not proceeding in a desired manner (e.g., through monitoring of the refrigerant return line from the cylinder) the system could dynamically adjust the amount of air (or other gas) provided at the input of the freezing cylinder to adjust the overall operation of the freezing system. In this example, during an initial freeze operation or a defrost-refreeze operation, adequate air must exist in the cylinder for the desired overrun amount. In such circumstances, it may not be necessary to introduce any additional air into the feed line. In other circumstances, however, monitoring of the refrigeration return may indicate that the overrun has dropped to an undesired level and more significant introduction of air into the cylinder may be warranted.

Referring back to FIG. 2B, during operation of the dispensing system as shown, the ingredient—potentially mixed with provided gas at junction point or passage 2400—will be pumped by the pump 2300 into the freezing cylinder 2500 where it will be frozen. While the freezing cylinder may take many forms, one of which is discussed in more detail below, it can take the form of a refrigerated cylinder structure including a beater bar driven by a motor. Through operation of an associated refrigeration system, the temperature within the freezing cylinder 2500 may be controlled to freeze the ingredients within the freezing cylinder 2500 to a desired product consistency and produce, for example, soft-serve ice cream.

It should be noted that, in the depicted example, both the ingredient supply element 2700 and all components and connections of the system that directly contact the ingredient are located within the ingredient refrigeration compartment 2600. In particular, in the example, the pump 2300, the air check valve 2018, any sensors 2402 and/or 2306, and the connecting lines feeding from the supply element 2700 to the pump and from the pump output and junction 2400 are all entirely or, for the line from the pump to the freezing cylinder 2500 substantially (e.g., more than 65%) within the refrigeration compartment 2600. This arrangement is thus of benefit in that it permits the system to maintain all of the ingredients within the system and any ingredient/gas mix provided to the freezing cylinder within a controlled temperature range. For ingredients including, for example, any previously pasteurized dairy components, this ability to control the temperatures to which they are subjected to is significant.

During operation of the system as show in FIG. 2A, the pressure within the freezing cylinder may be impacted through operation of the venting valve or assembly 2028. For example, under circumstances where it is desirable to avoid the build-up of pressure within the cylinder 2500, the venting relief valve assembly 2028 may be operated such that the vent is open, such that gas or material within the cylinder 2500 will tend to flow through the open vent and maintain the pressure within the cylinder 2500 at a desired level. As described above, the venting assembly 2028 may be opened through actuation of the vent control air valve 2026.

One circumstance in which it may be desired to actuate the vent control element 2028 to open the provided vent is during an initial cylinder fill operation where the cylinder will typically be filed with air (or another gas) at a time when operation of the pump 2300 is initiated to pump ingredient (or another fluid such as a cleaning fluid) into the cylinder 2500. Under such circumstances, selective operation of the vent control assembly 2038 can be performed to allow a passage for the gas within the cylinder 2500 to be vented to atmosphere, thus preventing an undesirable pressure build-up within the cylinder 2500.

As further shown in FIG. 2A, the dispense control valve 2030 may be activated to cause a dispense valve within the system to open. Such activation of the dispense valve (an example of which is discussed in more detail below) will result in a discharge of product from the freezing cylinder 2500.

Considering the above, it may be noted that the described system provides an effective and efficient system for delivering an ingredient from an ingredient supply element (e.g., element 2700), to a product formation chamber (freezing cylinder 2500 in the example) through a pump 2300. It may also be noted that the disclosed system provides an effective system for dynamically controlling the intermixing of a pressurized gas into the product supply line of a sealed and pressurized food preparation and dispensing apparatus.

Figure 2C:
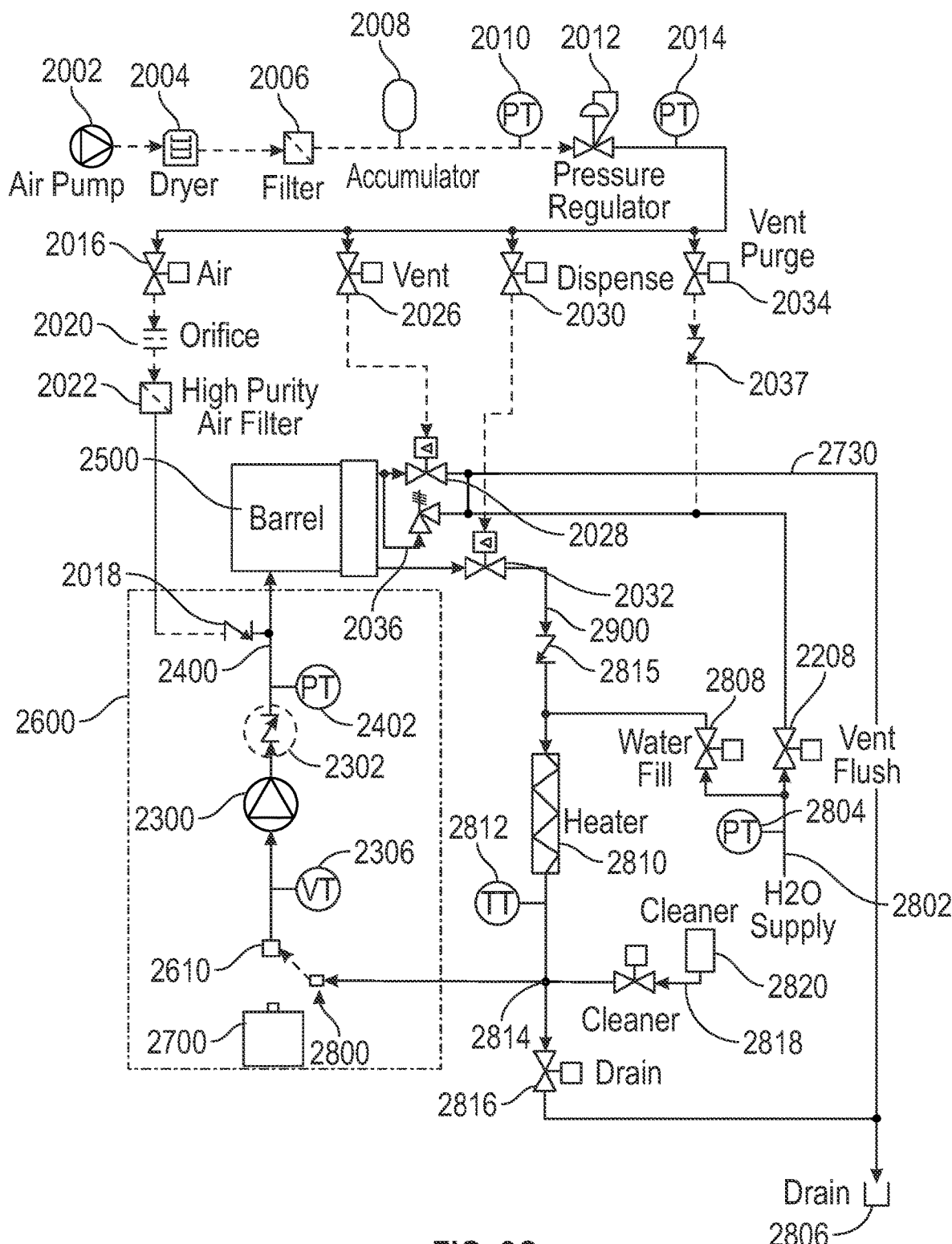

FIG. 2C illustrates the configuration of the system as configured for a self-cleaning operation. As will be apparent from a comparison of FIG. 2B and FIG. 2C, the components and connections within the system are substantially as depicted as in FIG. 2B except that: (a) the system input connector 2610 is not coupled to the system self-cleaning port 2800, but is rather coupled to the output of an ingredient supply source 2700); and (b) the system is configured in a manner wherein the system bypass passage 2900 is enabled such that material dispensed from the freezing cylinder 2500 will flow into the bypass passage. In general, the various components previously discussed will operate as previously described.

Referring to FIG. 2C, the components of the illustrated system associated with the self-cleaning operations of the system that have not been previously discussed will first be described.

As reflected in the exemplary system, the illustrated system includes a water supply line 2802 that (while not illustrated in FIG. 2C) terminates in a coupling suitable for attachment to a suitable source of water, such as a municipal water supply. A pressure transducer 2804 may be used to detect the pressure at the water supply line to detect the presence of a suitable water supply at a suitable pressure level. In one embodiment, the output of the pressure transducer 2804 may be connected to a system controller configured to place the system into a lock-out (or disabled state) whenever the input water pressure is below a desired minimum water pressure (e.g., 45 PSI). As reflected in FIG. 2C, the exemplary system also includes a drain line 2806 that extends outside of the illustrated dispensing system that can terminate in a feature (e.g., a hose-like element) that may be positioned to drain fluids from the dispensing system into a suitable drain receptacle (e.g., a drain leading into a municipal drain system).

In the exemplary embodiment, the input water supply is provided at the input of a first electrically controlled water valve 2808 that can be actuated to control the provision of water to the input of a cleaning circuit that includes heating element 2810. In the exemplary embodiment of FIG. 2C, a temperature detection device 2812 is provided at the output of the heater and may be used to monitor the temperature of the water exiting the heater.

It the example of FIG. 2C, it may be noted that the input to the heating element is coupled, through an optional check valve 2815, to the output of the bypass passage 2900. Thus, it will be appreciated that, during operation of the system in the self-cleaning mode, the heater—depending on the activation state of the valves 2808 and/or 2032—may receive at its input material discharged from the freezing cylinder 2500, fluid from the water supply 2802, or a mix of both.

As is further depicted in FIG. 2C the output from the heater 2810 is provided to a junction point 2814. That junction point is fluidly coupled to the system self-cleaning connection port 2800, the input to an electrically controlled drain valve 2816, and to the output of an electrically controlled cleaner valve 2818. As also shown in the figure, the input to the cleaner supply valve 2818 is coupled to the output of a source of cleaning and/or sanitizing material 2820. Although not illustrated in FIG. 2C, check-valves may be placed within the illustrated lines to prevent backflow from the drain 2806 into the system, to prevent backflow from the system into the source of cleaning and/or sanitizing material 2820, or back into the heater 2810.

During operation of the disclosed embodiment in the self-cleaning configuration, the heating element 2810 may be used for heating fluids that are used during the self-cleaning operation.

In the example of FIG. 2C, the heater 2810 takes the form of an electric cartridge heater. It may be appreciated, however, that the use of such a heater—or indeed the use of a separate heating element—is exemplary only and that alternative approaches may be used to provide the heated water used within the disclosed system. For example, instead of a cartridge heater another form of heating device, such as an induction heating device wherein the tubing holding the water is heated through induction may be used. As a further example, a heat trace could be applied to the exterior portion of the tubing holding the water and activated to heat the water within the tubing. Additionally, or alternatively, instead of having a stand-alone heating element, some or all of the water or other fluids used within the disclosed system could be heated, through operation of the freezing cylinder 2500 in a heating mode (e.g., where hot discharge gas from the condenser is fed back through the cylinder for heating the cylinder contents through, for example, a reversing valve within the refrigeration system). In such alternate embodiments, the water or other fluid to be heated could be pumped into the freezing cylinder 2500 and the freezing cylinder operated to heat the contents.

In general, through the use of the dedicated heater 2810—or an alternate heating system as described—when water or fluids during the self-cleaning operation of the present system may be heated to a level that would be appropriate for the sanitizing of a food-contact surface (e.g., a temperature at least at a minimum effective temperature of approximately 171° F.).

In some embodiments the system may be configured to ensure that an appropriate amount of fluid is flowing through the circuit containing the external heater 2810 before the heater is activated. This is because activation of the heater 2810 in the absence of adequate fluid flow may damage the heater and/or shorten the useful life of the heater. Alternatively, a heater that is not susceptible to dry-fire damage may be used. To ensure that adequate fluid flow exists, the system controller (or a dedicated heater controller) could receive signals indicative of fluid flow through the system and only activate the heater once such signals indicate the presence of suitable flow. Such signals could take the form of pressure measurements at the input and at the output of the pump 2300 (such as those provided by sensors 2306 and 2402), since the pressure differential across the pump 2300 may provide an indication of the extent of fluid flow through the pump. In such exemplary embodiments, the controller may be configured to activate the heater only if a suitable pressure differential is detected. Alternatively, direct flow measuring devices could be used (as an embodiment of sensor 2306 or in the form of an additional sensor coupled to the input or output of the heater 2810) and the heater 2810 may be configured to activate the heater only if adequate fluid flow is detected.

A still further approach for protecting (and/or monitoring) the proper operation of the heater may be to provide temperature sensors at the input and at the output of the heater. The presence of an inadequate temperature change, or an out-of-range temperature measurement, could indicate the presence of inadequate fluid flow and/or heater failure that would warrant de-activation of the heater.

As described above, the output from the heater 2810 may be fluidly connected to a junction point 2814 that may be fluidly coupled to the output of the cleaning supply valve 2818 and to the input of a drain control valve 2816. The described junction point may also be fluidly connected to the self-cleaning receiver port 2800.

As may be appreciated, the components and connections discussed above in connection with FIG. 2C may provide a system that can, among other things:

(a) drain material from the freezing cylinder 2500 (by dispensing material from the cylinder 2500, through the bypass passage 2900, through the heater 2810, and—through the drain control valve 2816—into the drain);

(b) drain fluids and material from the heater 2810 and the lines connected to the heater by activating the drain valve 2816;

(c) inject water—and potentially heated water—into the cylinder 2500 through a path flowing from the water supply source 2802, through the water fill valve 2808, through the heater 2810, through the system connection port 2800, and through the pump 2300 into the cylinder; and (d) inject a cleaning and/or sanitizing material into the fluids circulating through the system through activation of the cleaner control valve 2818.

In addition to the above, it will be appreciated that—during a self-cleaning operation—pressurized gas may be injected into the fluid circulating through the system through operation of the air supply valve 2016 (as discussed above). The injection of gas into the system during a self-cleaning operation may be useful to, for example and without limitation, control or adjust the pressure within the system during a self-cleaning operation and/or provide a degree of fluid agitation to promote cleaning. Further, in embodiments where alternative sources of gases are available for use within the system, a pressurized gas having various cleaning and/or sanitizing properties may be injected into the fluids circulating within the system either in place of, in addition to, or at different times from, the injection of a cleaning and/or sanitizing material into the system through use of the cleaner control valve 2818.

Referring to FIG. 2C, aspects of an exemplary self-cleaning operation will be discussed.

At an appropriate time, a user of the system may place the system in the configuration as reflected in FIG. 2C. (Some exemplary specific examples of how this may be done are provided below). Once the system controller determines that the system is in the appropriate configuration (e.g., through user confirmation, automatic verification through system sensors and/or a combination of the foregoing or other methods) the system may begin the process of evacuating the freezing cylinder 2500 of any product within the cylinder 2500. This evacuation step may be accomplished by activating the dispense valve assembly 2032 to permit the flow of material from the cylinder 2500 through the heater 2810 (which need not be activated during this step) and though the drain valve 2816 into the drain 2806. During all or a portion of this step, the water fill valve 2808 or air inject valve 2016 may be activated to provide water or air to help flush out any product within the cylinder 2500. Alternate embodiments are envisioned wherein, prior to and/or during the evacuation step described above the temperature within the cylinder 2500 is elevated to warm the cylinder contents to either soften or liquify the contents to promote the speed and effectiveness of the evacuation step. Still alternate embodiments are envisioned wherein the system is configured such that the all or part of the evacuation step occurs at a time where product can be dispensed out of the faceplate such that all or some of the product is evacuated through a conventional dispense operation.

The product evacuation step may be terminated once it is presumed, inferred, or detected that all (or substantially all) of the product within the freezing cylinder 2500 has been discharged. Proper evacuation may be presumed by running the system as described above for a predetermined time period with the period selected to ensure product evacuation in most all expected operating conditions. Alternatively, or additionally, proper product evacuation may be inferred by, for example, monitoring the temperature of the fluid provided to and flowing from the freezing cylinder 2500, or just the temperature of the fluid flowing out of the heating element 2810, and inferring that all of the product has been eliminated when the sensed temperature is at a particular level (e.g., the temperature of the expected water supply). Still further, proper product evacuation may be alternatively, or additionally, detected by monitoring some characteristic of a fluid within the system, such as the opacity of the fluid, which can provide an indication of the presence of residual product. Still further, pressure measurements within the system can be used to determine the adequacy of the drain 2806 for purposes of system operation. In embodiments where the adequacy of the drain is determined, the pressures within the system can be monitored and the detection of a pressure at or above a specific level and/or the detection of a change in the pressure signature, can provide an indication that the drain capability 2806 is inadequate for the desired system operation and/or that the characteristics of a previously properly performing drain, are no longer adequate (e.g., because of a clog, or a backup). In embodiments, where drain monitoring is implemented, the detection of an inadequate (or potentially clogged) drain can result in the provision of a notice (visual, audible, or communicative— e.g., text, e-mail) notice to a system user and/or service technician.

Once the system determines that the system has been evacuated of any residual product, it may then proceed to a step where the system is filled with water to a level that is sufficient to support the cleaning operation. This may be done by activating the pump 2300 at a time when the water fill valve 2808 is activated to permit the flow of water into the cylinder 2500. Note that during this step—as well as the product evacuation step—the cylinder vent control valve and vent relief assembly 2026 and 2028 may be activated if necessary to control the pressures within the cylinder 2500. During all (or substantially all) of this step, the drain valve 2816 may be closed such that the fluid within the system will circulate from the freezing cylinder 2500, through the fluid line containing the heater element 2810, and through the pump 2300 and back into the cylinder 2500.

During part of, or after, the fluid fill step described above, the system may activate the heater 2810 to begin heating the fluid flowing through the system. At the same time—or before or after—the heating operation is initiated, the system may activate the cleaner valve 2818 to cause cleaning and/or sanitizing solution to flow from the cleaner and/or sanitizing supply element 2820 into the circulating fluid. The timing of the operation of the cleaner valve 2818 may vary and may be impacted by whether the specific cleaning and/or sanitizing solution provided by the supply 2820 requires a fluid within a specific temperature range for dissolution and/or activation.

The amount of cleaning and/or sanitizing solution provided during this step of the self-cleaning process may be controlled in a variety of ways. In accordance with one embodiment (discussed in more detail below) the user of the system may be required to place a pre-portioned amount of cleaning and/or sanitizing solution into a supply compartment within supply element 2820 before the initiation of the cleaning operation. In such embodiments, there will be no need for the system to dynamically control the provision of the cleaning and/or sanitizing material to the junction 2814.

In accordance with other embodiments, a metering system—such as a pumping system or a flow-detection system—may be used to monitor the amount of cleaning and/or sanitizing material being injected into the circulating fluid during this step and a system controller could be used to control the cleaner valve 2818 and/or a pump to regulate and control the amount and timing of the provision of cleaning and/or sanitizing material to the junction 2814.

After or during the step in which the fluid within the system is heated and the cleaning and/or sanitizing material is provided to, and mixed with, the circulating fluid, the cleaning fluid may be circulated through the system repeatedly. During this step, additional operations may be performed to enhance the effectiveness of the cleaning system. For example, one or more of the following actions may be performed at the same time, or at different times and in different orders, to facilitate cleaning and sanitization of the various components within the system:

(a) activation of the air supply valve 2016 to inject pressurized gas into the circulating fluid;

(b) activation of the dispensing valve assembly 2032 repeatedly to move the dispensing valve elements and potentially better expose them to the circulating cleaning fluid and/or to agitate the circulating cleaning fluid;

(c) activating a beater bar assembly within the freezing cylinder 2500 to potentially better expose their surfaces to the circulating cleaning fluid and/or to agitate the circulating cleaning fluid, such activating including the acts of rotating the beater bar assembly in either direction and/or moving the beater bar assembly back and forth in the absence of a complete rotation; and/or (d) change the operating speed of the pump 2300, or temporarily cease operation of the pump, or reverse the pump, to impact the flow of the cleaning fluid through the system.

Once the above cleaning step has been completed, or during or shortly thereafter, the heating element 2810 can be deactivated and the circulating cleaning fluid may be discharged from the system through the drain 2806 through activation of the drain valve 2816.

In accordance with one embodiment of the present invention, some or all of the heated fluids used during a self-cleaning process may be actively cooled prior to being discharged from the system. Such cooling may be useful in applications where it is desirable to ensure that the temperature of any liquids discharged from the system is below a certain threshold amount, such as an application where the discharge drains could be damaged by liquids at certain high temperature or an application where applicable regulations preclude the discharge of liquids into drains above a certain temperature level. Additional reasons for monitoring the exiting fluids have been described in Applicant's co-pending U.S. patent application Ser. No. 16/124,701, which was filed on Sep. 7, 2018, the contents of which are hereby incorporated by reference. This cooling may be accomplished by operating the freezing cylinder 2500 to cool the fluid within the cylinder until it is presumed, inferred, or detected that the fluid within the system is at an appropriate level. Additionally, or alternatively, this cooling may be accomplished through quenching where the high temperature discharge fluid is mixed with cooler water from the water supply 2802 through operation of the control valve 2808. In still further embodiments, the activation and open extent of the drain valve 2816 can be controlled based—all or at least in part—on the output value from the temperature sensor 2812. In such embodiments, the system can either avoid any flow of discharge into the drain until a desired temperature level of the discharge has been reached and/or is control the rate of drainage flow into the drain based on such output.

The temperature of the liquid being cooled in the cylinder prior to discharge may be detected or inferred in a variety of ways. In accordance with one embodiment, a temperature sensor may be positioned within the cylinder 2500 to provide an indication of the temperature of the contents of the cylinder. In accordance with another embodiment, instead of or in addition to the described sensor, detection of the temperature of the refrigerant within a portion of the refrigeration circuit may be used to infer the temperature of the liquid in the cylinder since the temperature of the departing refrigerant will be approximately equal to the temperature of a water-based liquid in the cylinder. The alternate embodiments that do not involve a temperature sensor within the cylinder 2500 may be beneficial, in certain applications, because they avoid the burdens imposed by a including a separate temperature sensor, for example in, in terms of cost, component count, and cylinder penetrations.

In one exemplary embodiment all liquids discharged from the system as part of a self-cleaning process are cooled as needed to ensure that the discharge temperature of the liquids is no greater than approximately 140° F. In other exemplary embodiments, the discharged liquids are cooled as needed to ensure that all discharged liquids are at or less than 100° F.

In addition to providing a fluid circuit for the self-cleaning and sanitization of all (or substantially all) of the components and structures that come into contact with the food product or the product ingredient supply for the dispensed product, the exemplary system of FIG. 2C also provides a circuit for flushing the cylinder vent relief assembly flush passage 2036 and the cylinder venting assembly 2028. As illustrated, this flushing circuit comprises a vent flush valve 2208 that, when activated, will cause water from the water supply to flow through the valve 2208, into and through portions of the cylinder vent relief assembly flush passage 2036 (one manner of many will be discussed below) and into a discharge line 2730 that is fluidly coupled to the drain 2806. The vent purge valve 2034 and the cylinder vent relief assembly flush passage 2036 that are arranged such that activation of the vent purge valve 2034 will inject pressurized gas into the connection to the cylinder vent relief assembly flush passage 2036. Through activation of the vent flush valve 2208 and/or the vent purge air valve 2034, water, pressurized gas, and/or a mixture of the two may be passed to and through the cylinder vent relief assembly flush passage 2036 and into the drain 2806 to clean, flush and/or purge any materials that may have collected within the cylinder venting is path.

It should be noted that—because the portions of the cylinder venting path cleaned, flushed or purged through the described circuit do not come into contact with any food product to be dispensed or ingredients for food products to be dispensed—it is not critical that they be exposed to any cleaning and/or sanitizing solutions during a self-cleaning operation.

Figure 2D:
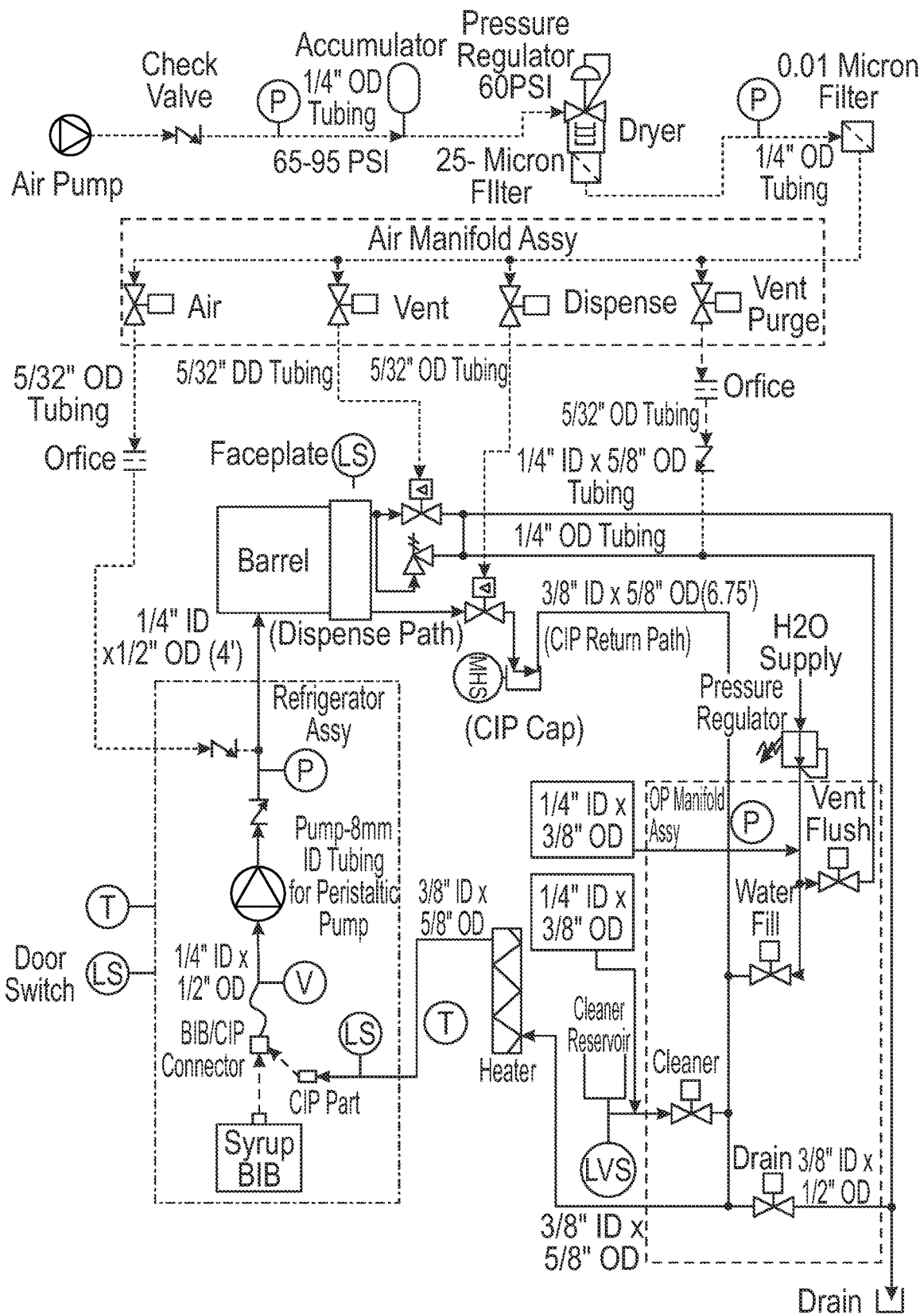

FIG. 2D illustrates an alternate arrangement for the piping and instrumentation of the disclosed system. It will be appreciated that the arrangements shown in FIGS. 2A-2D are exemplary only and that alternate arrangements can be implanted without departing from the teachings herein.

It should also be noted that because the described components for cleaning, flushing and/or purging the cylinder venting assembly 2028 are not fluidly connected to the input line to the freezing cylinder and may operate when the dispensing system is configured to prepare and dispense product, the cylinder vent assembly 2028 may be operated during part of, or separate from, a self-cleaning process as described previously. Thus, the described system for cleaning, flushing and/or purging the cylinder venting assembly 2028 may be activated, for example, on a periodic basis during system operation, each time the system activates the cylinder vent assembly control valve 2026, or at times during which product is being produced and/or dispensed from the system.

As will be appreciated from the above discussion, the product dispensing and self-cleaning functionality of the described example may be partially enabled by certain fluid connections and/or the ability of the system to be configured such that the bypass passage 2900 is excluded or included in the flow of product that is discharged from the freezing cylinder 2500. These aspects of the disclosed system may be provided—in one embodiment—by a specially designed faceplate assembly.

Turning now to FIGS. 3A-3E, in general, the faceplate 3000 is used to enable and support several of the described operations of the disclosed system including a dispensing operation where product within the freezing cylinder is dispensed for use or consumption; a venting operation, where a vent structure is operated to adjust the pressure within the freezing cylinder; and a self-cleaning operation where the system is operated in such a manner that key components of the system are cleaned and/or sanitized. In the exemplary embodiment of FIGS. 3A-3E, the faceplate is formed from an acrylic material, or any other suitable material as would be known to those skilled in the art and in receipt of the teachings and disclosures contained herein.

Figure 3A:
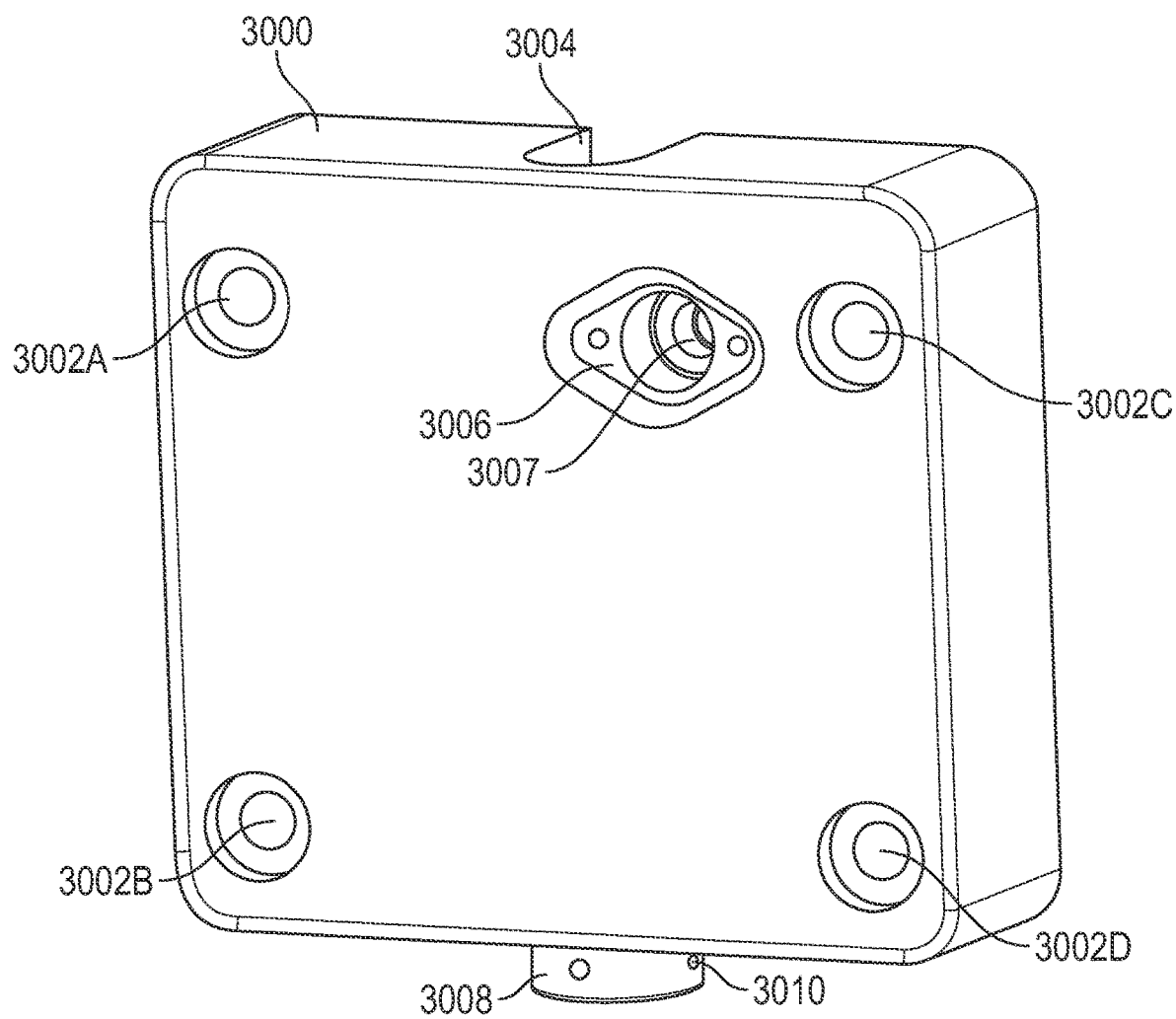
FIGS. 3A-3E illustrate one exemplary faceplate assembly that may be used within the exemplary dispenser discussed herein.
Figure 3B:
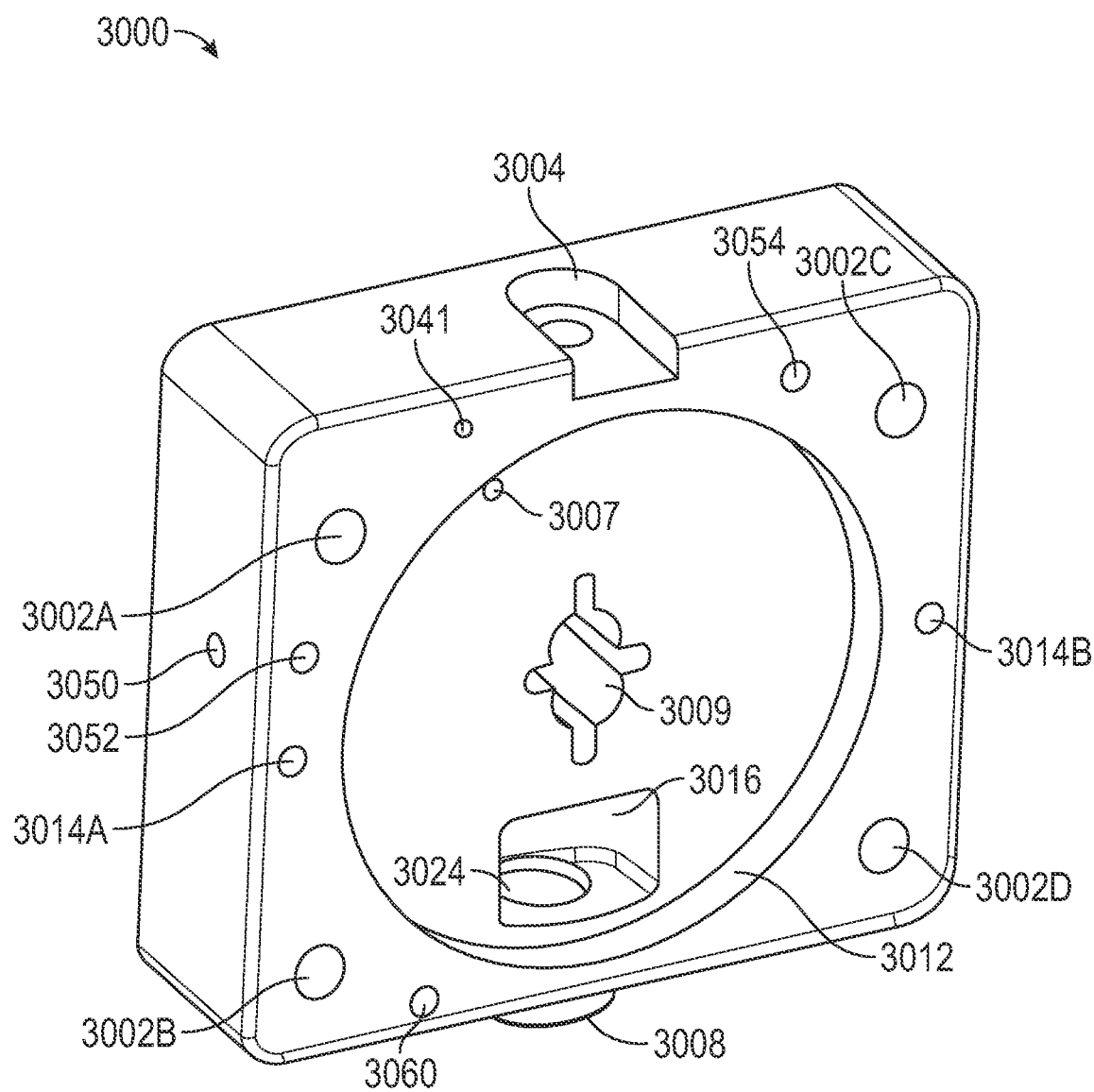

Referring first to FIGS. 3A and 3B, front and rear views of the exemplary faceplate 3000 are provided. As reflected in the figures in the illustrated example, the faceplate is generally rectangular in shape and defines four passages through the faceplate 3002A, 3002B, 3002C, 3002D, at locations generally near the four corners of the rectangle, for receipt of faceplate attachment elements for securing the faceplate to the front of the unit. Each faceplate attachment element may take the form of a threaded bolt with a knob attached at one end, where each threaded bolt is sized to fit through one of the openings 3002A-3002D and to be received within a nut-like opening secured within the front face of the dispensing system. In such an embodiment, attachment of the faceplate to the dispensing system may be readily accomplished by positioning the faceplate 3000 at the proper location with respect to the overall dispensing system, feeding the attachment elements through the openings and then tightening the attachment elements to form a seal between the faceplate 3000 and a front open portion of the freezing cylinder 2500. An exemplary depiction of a faceplate to the overall dispenser system in the manner described above is generally set forth in FIG. 1A.

In the embodiment described above, the faceplate 3000 may be easily removed from the other components of the system by simply unscrewing and removing the described attachment elements from the main housing of the dispenser and then pulling the faceplate 3000 away from the main dispenser body.

In the embodiment described above—as well as any other embodiments associated with a faceplate 3000—structure may be provided to detect the absence or presence of the faceplate. For example, in one embodiment, one or more limit switches could be placed between a feature of the faceplate 3000 and the main dispenser housing where the condition of such limit switches would indicate the presence or absence of the faceplate 3000. In alternate embodiments, a magnetic or other detectable structure may be fixed within the faceplate 3000 and a sensor may be located at an appropriate location of the dispenser main housing, where the detector will detect the magnet or other material when the faceplate 3000 is properly positioned. In such exemplary embodiments, the system controller may use the provided information concerning the faceplate 3000 to adjust the operation of the system. For example, in situations where the faceplate 3000 is is detected to be not present, the controller may put the system in a lock-out condition and prevent the initiation of all or certain system operations until the faceplate 3000 is detected as being properly positioned.

Referring back to FIGS. 3A-3B, it may be seen that the exemplary faceplate further defines an upper recess area 3004 for receipt of the stem of a dispense valve member (discussed in more detail below). In the illustrated example, the front portion of the faceplate further defines a generally diamond-shaped recess 3006 sized to receive elements forming part of a cylinder vent-relief assembly 2028 (discussed above generally and discussed in more detail below with respect to an exemplary embodiment). Although not fully visible in FIG. 3A, the faceplate further defines a passage extending through the faceplate 3007 having a front opening positioned near or at the approximate center of the recess 3006. An additional passage 3041 extends to the cylindrical space in front of area 3007 for air actuation of the vent-relief assembly when actuated in the controlled venting mode.

As further reflected in FIG. 3A, the faceplate defines a downwardly extending dispense spout 3008 in which are optionally formed a plurality of generally cylindrical openings (only one of which—3010—is separately labeled in FIG. 3A). The openings 3010 may be used to receive dowl pins that can be used as connecting features for the optional securement of a dispensing cap and/or a blocking cap to the bottom opening of the dispense spout 3008.

Figure 4A:
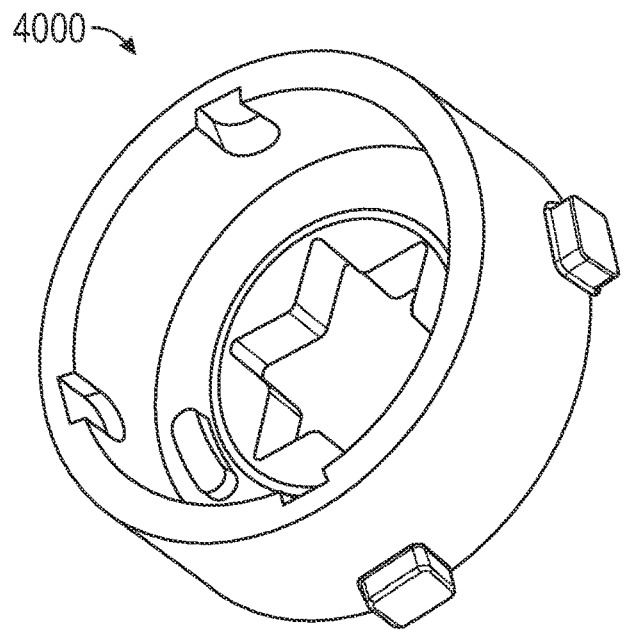
FIG. 4A illustrates an exemplary dispensing cap that may be used in connection with the disclosed system.

The dispensing caps usable with the disclosed exemplary embodiment may take the form of a cap with an open end formed to having a specific cross-sectional shape. In general, the purpose of such a dispensing cap is to control the aesthetic appearance of the dispensed product. One example of a dispensing cap suitable for use with disclosed system is the dispensing cap 4000 reflected in FIG. 4A which has an open cross section in the shape of a star.

Figure 4B:
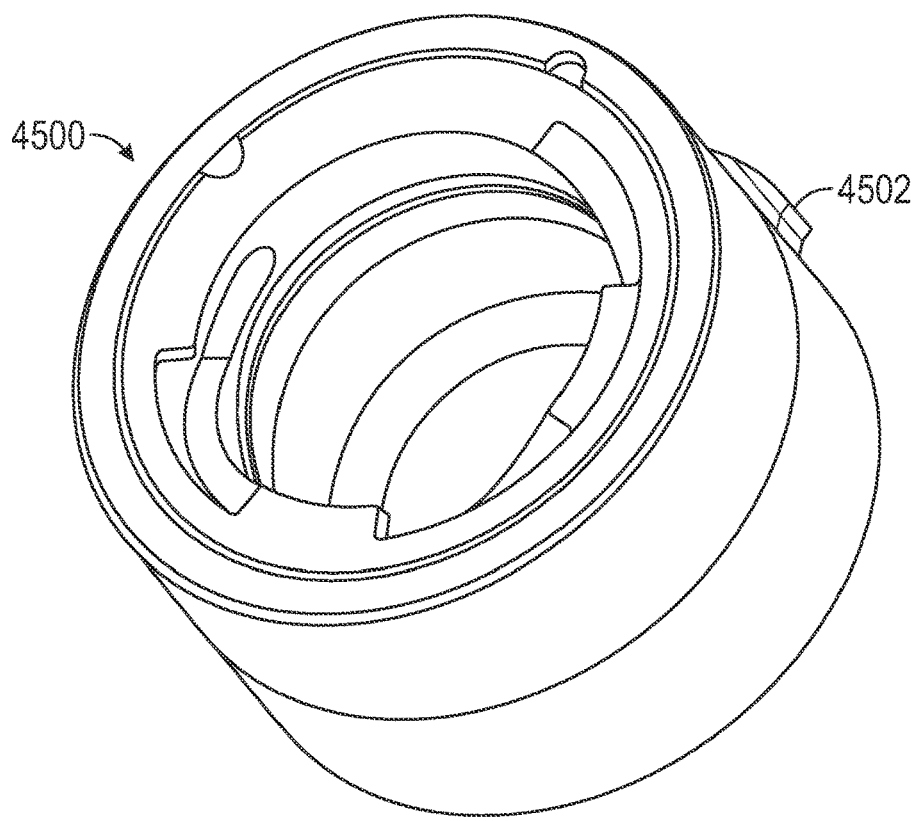
FIG. 4B illustrates an exemplary blocking cap that may be used in connection with the is disclosed system.

FIG. 4B illustrates one exemplary blocking cap 4500 that may be used in connection with the disclosed system. In general, the blocking cap 4500 is a cap that, when secured to the open end of the dispense spout 3008 of the faceplate will prevent the dispensing of any product from the dispense system 1000. The blocking cap may be connected directly to the dispense spout 3008 to block the dispending of product or, optionally, may be secured over a dispensing cap 4000. In either embodiment, attachment of the blocking cap 4500 to the faceplate 3000 will prevent the dispensing of food product out of the opening of the dispense spout 3008. In certain embodiments the blocking cap 4500 may include a magnet or other detectable material and the main dispense system housing may include a sensing device (such as a magnetically activated switch) for detecting the presence of the magnet or other detectable material. In such embodiments, the system controller may use the signal from the sensing device to determine whether a blocking cap 4500 is properly positioned with respect to the faceplate 3000.

Referring back to FIGS. 3A and 3B and, in particular to FIG. 3B the back portion of the exemplary faceplate 3000 is shown.

FIG. 3B illustrates the upper recess 3004 for receiving the dispense valve stem (discussed below) and the backside openings of the passageways 3002A-3002D through the faceplate for receipt of the faceplate attachment elements.

As depicted in FIG. 3B, the exemplary faceplate also defines a large, generally circular-shaped recess 3012. This recess may be sized to receive a suitable O-ring element to ensure a properly sealed fit between the faceplate and an external surface of the freezing cylinder 2500 (or other feature associated with the main dispensing system). The exemplary faceplate may further include additional recesses within the large circular recess 3012—such as the recess 3009 located in the approximate center of the large recess—to permit receipt of other system components (such as a portion of a beater-bar assembly). Alternate embodiments are envisioned wherein the identified O-ring element (and some or all or any other O-rings or surface sealing elements used in the system) are replaced with a suitable sealing material which could be molded or bonded to the faceplate material. Such sealing structures can include, for example and without limitation, over molded features and/or components formed from resilient thermoplastic polyurethane ("tpu") or other suitable elastomeric material which can create a seal.

In the example of FIG. 3B, the backside of the exemplary faceplate 3000 further defines two positioning openings 3014A and 3014B which may be used to interface with positioning elements (e.g., dowel portions) to enable proper positioning of the faceplate 3000 relative to the remainder of the dispensing assembly to ensure proper alignment of the faceplate 3000 with respect to the other system components. Openings 3014A and 3014B may be configured to ensure that the faceplate 3000 is oriented correctly and not installed upside down or at right angles to its proper orientation.

In addition to the features described above, the exemplary faceplate 3000 of FIGS. 3A and 3B further defines the backside opening of the passageway 3007, previously described as extending from the backside of the faceplate to the front of the faceplate. As may be noted, the backside opening of the passageway 3007 opens into a portion of the faceplate 3000 that is within the larger circular recess 3012. As such, when the faceplate 3000 is affixed to the freezing cylinder 2500 or to the main dispensing system, the passageway 3007 will be available to serve as a vent passage to permit the flow of air, gas, or materials from within the freezing cylinder 2500, through the faceplate 3000, to the exterior environment. As will be described shortly, this passageway 3007 forms part of the structure of the cylinder vent relief assembly flush passage 2036 and vent relief assembly 2028.

As further reflected in FIG. 3B, the exemplary faceplate defines a large pre-dispense cavity 3016 that has a front generally curved portion and a generally rectangularly shaped rear opening. A dispense bore 3024 extends from the bottom of the pre-dispense cavity 3016 and down through the output of the dispense spout 3008. As will be described in greater detail below, during a dispense operation, food product from within the freezing cylinder 2500 will flow into the pre-dispense opening 3016 through its rear opening and, if the dispense valve is properly positioned, down through the bore 3024 and through the output opening of the dispense spout 3008.

Figure 3C:
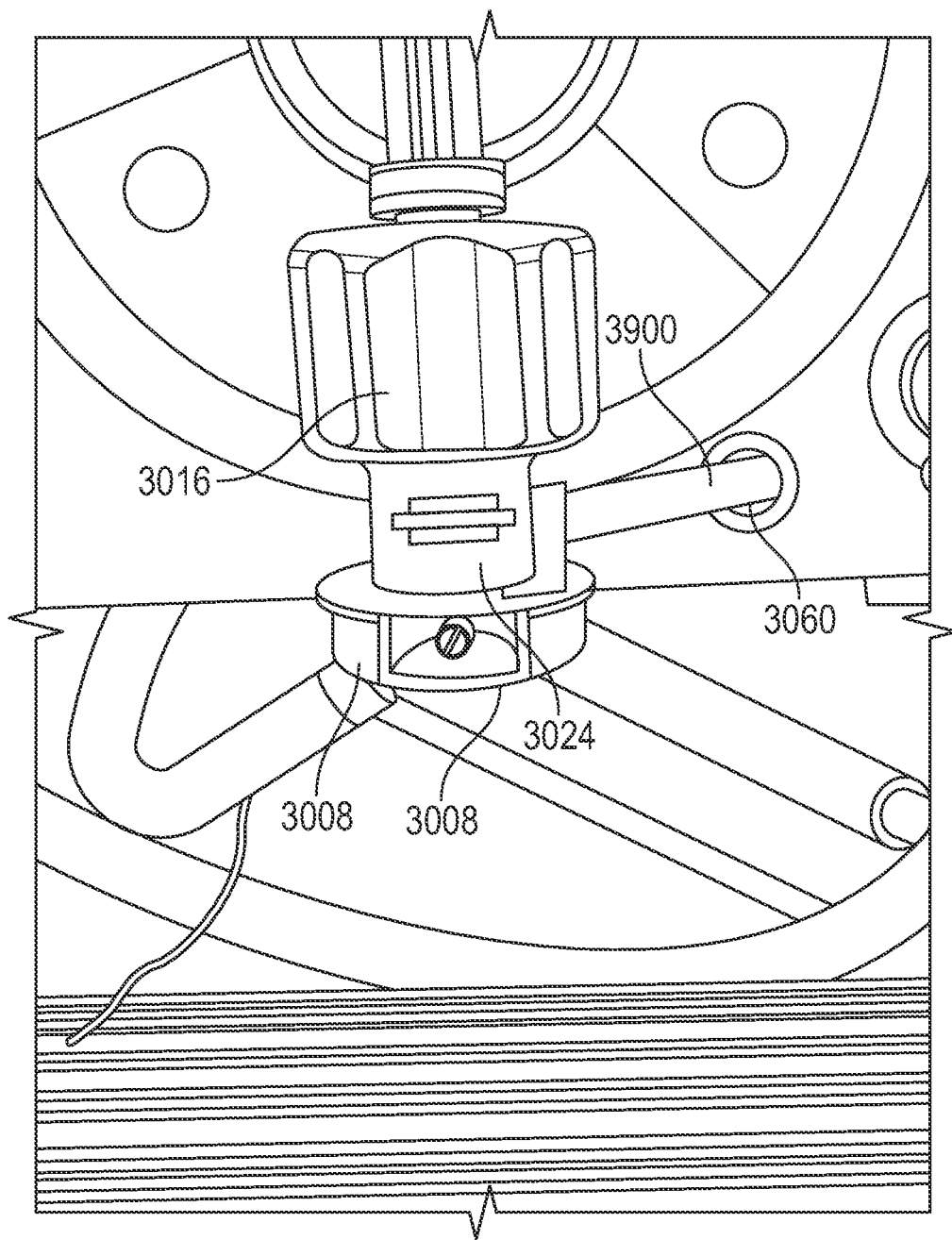

As partially reflected in FIGS. 3B and 3C, the backside of the faceplate 3000 further defines a rear opening 3060 that opens into a cleaning bypass passageway 3900 formed within and through the faceplate. In the exemplary faceplate of FIG. 3B, the bypass passageway 3900 extends from the rear opening 3060 into the interior of the bore 3024. FIG. 3C provides a front view of the faceplate 3000 that shows an exemplary bypass passageway 3900, beginning at a cylindrical end face opening 3061 perpendicular to bore 3024, extending upward from this beginning point, changing direction horizontally and penetrating the rear face of faceplate 3000 at rear opening 3060. It will be appreciated that the described position and orientation of bypass passageway 3900 is exemplary only and that other arrangements and configurations can be used without departing from the teachings of this disclosure.

Figure 3D:
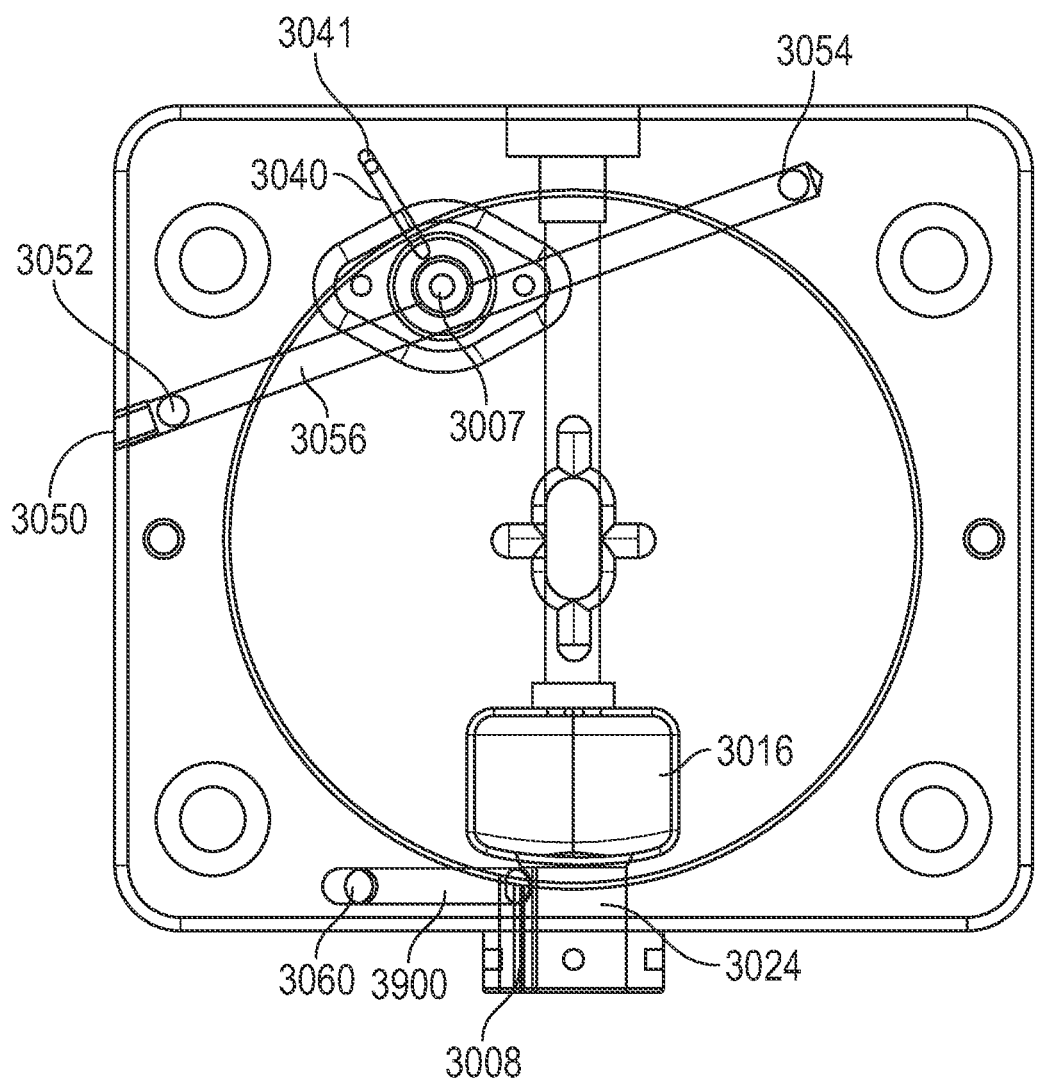

FIG. 3D provides a backside-looking view of the faceplate 3000 that depicts the same structures described above from a different perspective. As will be appreciated, in the example of FIG. 3D, the cleaning bypass passage 3900 includes a first portion, illustrated as extending in a substantially horizontally in FIG. 3D and a second portion that extends downwards from the first portion and opens to the bottom of the faceplate near the label line for the downspout 3008. As will be appreciated from the depiction in FIG. 3D, in this embodiment the downward opening of the cleaning bypass passage 3900 is in the same direction as the dispense opening 3024, but is displaced horizontally from the dispense opening.

This bypass passageway 3900 may operate as the bypass passageway 2900 discussed above in connection with FIGS. 2A-2C. In particular, the bypass passageway 3900 may function as the bypass passageway 2900 described above in that it can be used to provide a passageway from the interior of the freezing cylinder 2500 to the input to the heater 2810 (when used with, e.g., the blocking cap 4500). It should be appreciated that alternate approaches can be used to form or activate the bypass passageway 3900 that do not involve the use of a blocking cap. For example, alternate embodiments are envisioned wherein the dispensing valve is constructed so as to move to a position where discharge of product or fluid from the system is blocked such that the bypass passageway is enabled. Still further embodiments are envisioned wherein a structure that contains a pelletized or powered cleaning agent or sanitizer is used in place of blocking cap 4500 such that attachment of such a structure to the faceplate both provides the (or a) cleaning and/or sanitizing agent and serves to activate the bypass passageway.

In the example of FIGS. 3A-3D, when the blocking cap 4500 is NOT affixed to the faceplate, the bottom opening provided by the dispensing spout (or the opening of a dispensing cap 4000 attached to the faceplate 3000) will be open. As such, there will be a potential fluid path extending from the interior of the freezing cylinder, through the faceplate and through the output of the dispensing spout 3008. Under these conditions, activation of the dispensing assembly within the system (discussed in more detail below) will cause product or fluid to flow from the dispensing cylinder through the faceplate, and out the dispensing spout 3008. Because of the flow path described above, there will be nothing to cause product or fluid to flow from the interior of the bore 3024, through the passageway 3900, and out the opening 3060 and there will be no, or an insignificant flow of product or fluid, through the passageway 3900 under these conditions.

When the blocking cap 4500 is affixed to the faceplate 3000, however, it will block the opening at the bottom of the dispense spout and activation of the dispense assembly under these conditions, will cause product or fluid to flow from the interior of the freezing cylinder 2500 through the faceplate, into the bore 3024 and back through the bypass passageway 3900 and back through the opening 3060 in the rear of the face plate. Such opening 3060 can be fluidly coupled to the bypass line 2900 such that a fluid connection may be made into the components and connections used for the self-cleaning operation described above.

Figure 3E:
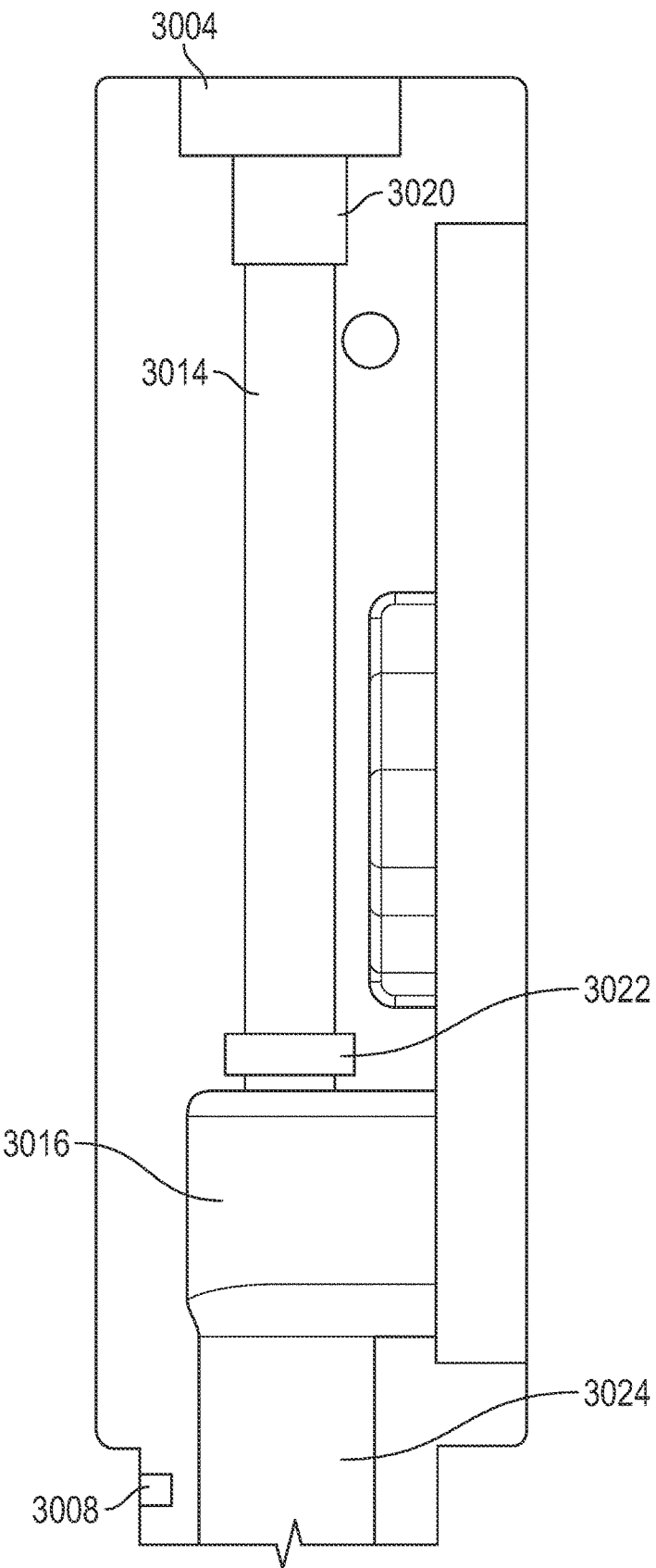

Turning to FIG. 3E, certain features of the faceplate 3000 related to the dispensing assembly will be further discussed.

FIG. 3E provides a side cutaway view of the exemplary faceplate 3000 with a cut taken at substantially the midpoint of the faceplate. As may be understood from inspection of FIG. 3E and the previously discussed figures, the faceplate 3000 defines a shaped bore 3014 that has an upper opening at the top of the faceplate (within the recess 3004) that extends down to and through the opening of the dispensing spout 3008.

As further shown in FIG. 3E, the extending central bore 3014 may have areas of differing diameter to define recesses and openings of different sizes. In FIG. 3E, for example, the central bore 3014 further defines: an upper open area 3020 that (as discussed below) may be used to position a sleeve bearing within the faceplate 3000; an intermediate open area 3022 that (as described below) may be used to house a sealing O-ring within the faceplate the open area 3016 discussed above, and the open bore 3024 (also discussed above).

The features within the faceplate reflected in FIG. 3E may be used to receive components used for the dispensing of product from the interior of the freezing cylinder 2500. Exemplary embodiments of such dispensing components are discussed hereafter in connection with FIG. 5E and FIGS. 5A-5D.

Figure 5A:
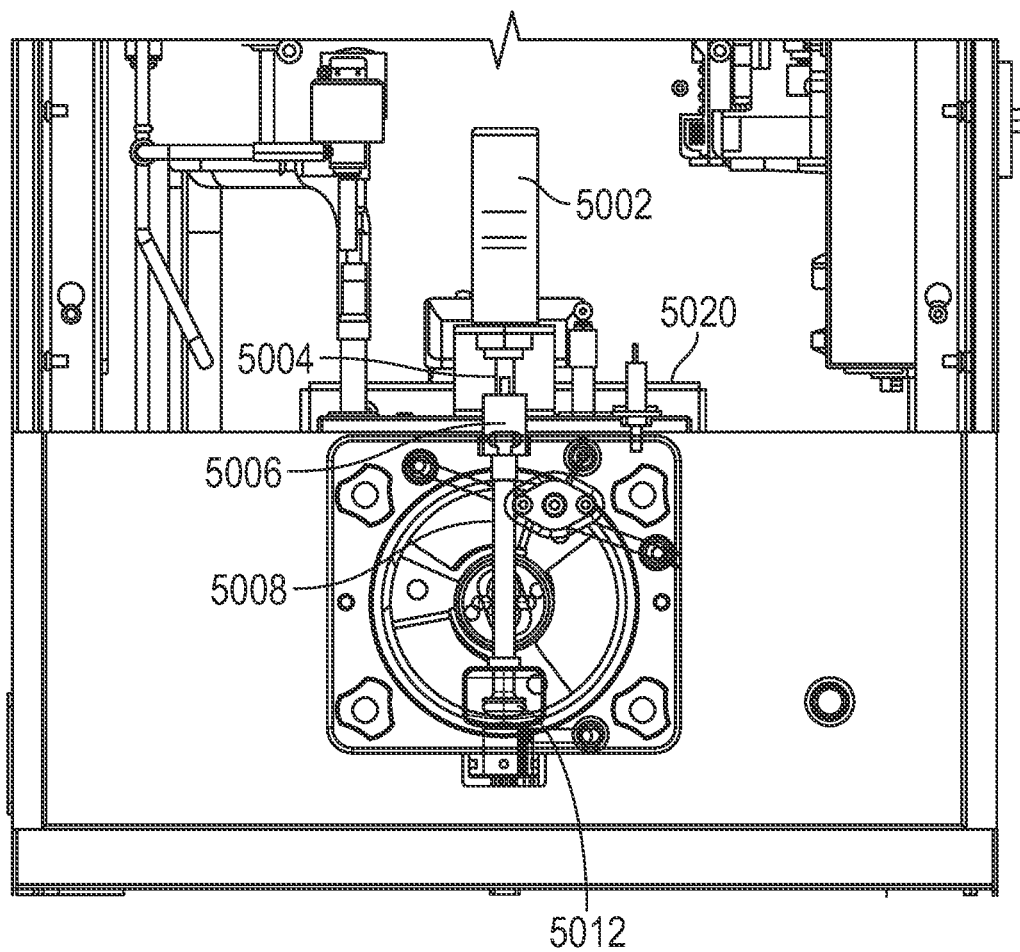
FIG. 5A illustrates a front view of the exemplary system with a portion of the front cover and various components not associated with the dispensing sub-system hidden.

FIG. 5A illustrates a front view of the exemplary system with a portion of the front cover and various components not associated with the dispensing sub-system hidden. As reflected in the figure, the exemplary embodiment of the dispending sub-system includes a pneumatically actuated air cylinder 5002 from which extends an air cylinder stroke shaft 5004. Activation of the dispensing air cylinder 5002 (for example through activation of the dispense pneumatic solenoid 2030 discussed above) will, in the example, cause the stroke shaft 5004 to retract within the cylinder 5002. In this example, deactivation of the air cylinder 5002 (e.g., through deactivation of the valve 2030 or a loss of power) will cause the stroke shaft 5002 to move to its original, extended, position. To ensure such movement, the cylinder 5002 may include bias springs to hold the stroke shaft 5004 in a normally extended position.

It will be appreciated that alternate dispense systems may be constructed using the teachings of this disclosure wherein activating of the dispensing air cylinder 5002 could cause the stroke shaft 5004 to extend from the cylinder 5002.

The extent to which the stroke shaft 5002 extends and retracts in response to the activation of the air cylinder 5002 may be such that the extreme extension and retraction points are dynamically controlled for each stroke of the cylinder (e.g., by controlling the amount of air or gas injected into the cylinder through controlled operation of the dispense valve 2030) or may—in some embodiments—be set to vary between a first fully extended position and a second fully retracted position. In such embodiments, activation of the pneumatic cylinder will result in an operation of the dispenser in an ON/OFF dispense mode such that the shaft is either in an OFF position, (such as the one illustrated in FIG. 5B) where product or fluid within the freezing cylinder 2500 is blocked from passing dispense spout of the faceplate 3008, or in an ON position where the shaft is retracted to a predefined distance to permit passage of product or fluid from the freezing cylinder 2500 and through the faceplate 3000 and into the dispense spout 3008. As discussed above, this is exemplary only and alternative embodiments are envisioned wherein the pneumatic cylinder 5002 may be actuated in an approximately linearly controlled manner such that it may extend from a base rest position to an extreme retracted position, and to substantially any intermediate position in between.

As reflected in FIG. 5A in the depicted example, the shaft 5004 from the pneumatic cylinder 5002 is coupled to a valve stem actuator in the form of lifter element 5006. As shown in the figure, the lifter element 5006 has a cutout that is shaped to receive one end of a dispensing stem 5008. In the exemplary embodiment the shape of the cutout of the lifter element 5006 and the shape of the dispensing stem 5008 are such that the dispensing stem 5008 can easily slide in a front-to-back and back-to-front manner to cause the end of the dispensing stem 5008 to engage with, and disengage from, the lifter element 5006. However, once the dispensing stem 5008 is engaged with the lifter element 5006, movement of the lifter element 506 upwards or downwards (through the application of air or gas to the pneumatic cylinder 5002) will cause the dispensing stem 5008 to move upwards or downwards in a corresponding manner.

Figure 5B:
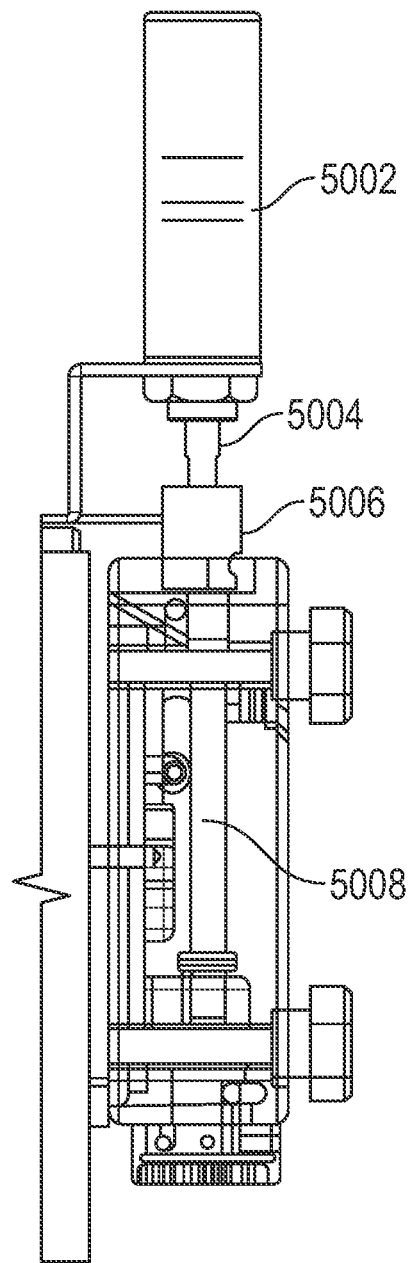
FIG. 5B illustrates a sideview of the system of FIG. 5A.

FIG. 5B illustrates a sideview of the system of FIG. 5A. This figure thus shows how the stem 5008 is positioned within the dispensing face plate 3000 and is retained in position by the face plate 3000 with respect to its front-to-back (right-to-left in FIG. 5B) orientation with respect to the lifting element 5006. As will be apparent from FIG. 5B, when the dispensing stem is positioned within the face plate 3000, removal of the faceplate 3000 from the overall dispensing system (e.g., by un-screwing connecting elements and pulling the faceplate off the dispensing system body) will result in the dispensing stem 5008 being decoupled from the lifting element 5006.

In the illustrated exemplary embodiment, once the face plate 3000 (and the retained dispensing stem 5008) is removed from the overall dispensing system, the dispensing stem 5008 can be readily separated from the face plate 3000 by passing the stem (and the O-rings coupled to the stem) through the discharge opening at the bottom of the face plate 3000. (Note that this may require removal of any shaping ring cap 4000 positioned about the dispensing spout 3008 of the faceplate). Such easy removal of the dispensing stem 5008 may allow for replacement or inspection of the O-rings coupled to the stem 5008, cleaning or replacement of the stem, and/or cleaning of the interior passage within the face plate in which the stem is located.

Figure 5C:
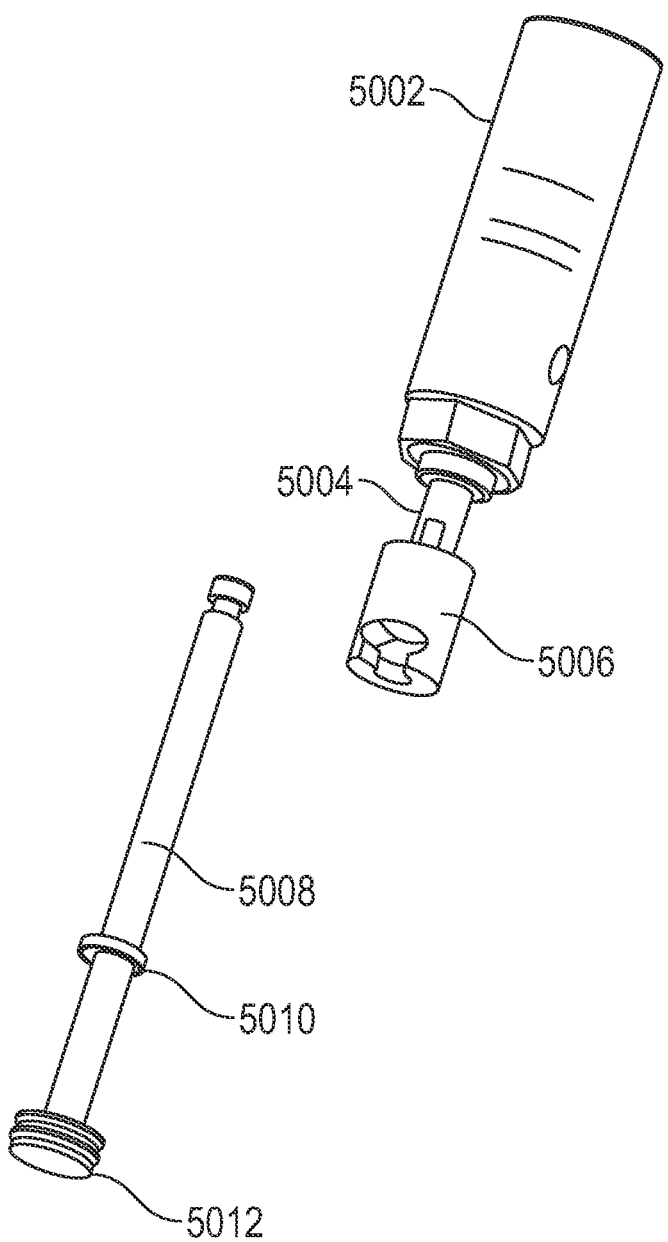
FIG. 5C illustrates an isometric view of certain components illustrated in FIG. 5A.

FIG. 5C provides an isometric view that further illustrates the manner in which the dispensing stem 5008 may be received within the lifting member 5006. As reflected in FIG. 5C, the lifting element 5006 defines an opening which, in the example, is a generally "T-shaped" opening that is sized and arranged to receive a generally "T-shaped" arrangement at the top end of the dispensing stem 5008. A sleeve bushing or sleeve bearing (not illustrated) may be provided to prevent the stem from wearing against the lifting element. A first sealing O-ring 5012 may be provided at the bottom end of the dispensing stem to seal against the faceplate when the dispensing system is not dispensing product. One or more additional O-rings 5010 may be provided to help position the dispensing stem within the faceplate and form a seal keeping the product entirely contained within the cylinder 2500 or pre-dispense cavity 3016.

Note that FIG. 3E generally illustrates a first faceplate opening 3020 within which any provided sleeve bushing or sleeve bearing may be located and a second faceplate opening 3022 in which an additional O-ring may be positioned.

Returning back to FIG. 5A, it will be noted that in the illustrated arrangement the lower portion of the dispensing stem 5008 (in the example the face associated with O-ring 5012) is in a position where it blocks the upper portion of the face plate dispensing spout 5008 but does not extend into or to the bottom of the dispensing spout 3008. As will be apparent from the figure, in this position, the lower portion of the dispensing stem 5008 (to which a sealing O-ring 5012 is attached in the illustrated example) will seal against an interior surface of the dispense bore to prevent discharge of product from the freezing cylinder through the exit of the dispense spout 5008. As described above, upon activation of the pneumatic cylinder 5002, the dispensing stem 5008 can move (up in the example) to provide an open flow port from the interior of the freezing cylinder 2500 to the output of the dispensing spout 3008 such that product can be dispensed from within the freezing cylinder. As will be apparent from FIGS. 3A-3D and 5A, when the dispensing stem 5008 is positioned to prevent discharge of product from the freezing cylinder, the lower open end of the bypass passage 3900 is at a point below the seal between the valve stem and the dispense bore.

Note that in the illustrated embodiment, the pneumatic cylinder 5002 can also be activated to move the dispensing stem 5008 such that the bottom of the stem 5008 extends all the way (or approximately all the way) to the bottom of the dispensing spout 3008 and/or past the opening of the dispensing spout (such that the bottom of the dispensing stem extends outwardly from the dispensing spout). Such "over-driving" of the dispensing stem 5008 may be useful, for example, during self-cleaning processes to force additional movement of cleaning solution through the system, and during dispensing operations, to "flush out" any retained product within the dispensing spout that could later drip from the spout.

Activation and/or deactivation of the pneumatic cylinder 5002 (and activation of the dispense solenoid 2030) may be accomplished in a variety of ways. The manner and method of activation may also vary depending on the operating state of the dispensing system.

For example, in certain embodiments, the dispensing system may include a controller that monitors various conditions of the system and places the system in a "lock-out"

state where the controller precludes activation of the dispensing valve 2030. For example, as otherwise discussed more fully herein, a system controller may place the system in a lock-out state if it is determined that the faceplate 3000 is not properly attached to the dispensing system. As discussed above, this determination may be made through the use of a limit switch that is activated once the faceplate 3000 is properly positioned. FIG. 5A illustrates the potential placement of one such exemplary limit switch 5020. It may be appreciated that the controller can place the dispenser in a lock-out state upon the detection of other system conditions. For example, the controller may place the system in a lock-out state upon the detection of one or more of the following conditions: (a) inadequate input water pressure; (b) the absence of an adequate amount of product ingredient; (c) inadequate input power; (d) undesired temperatures within the system; (e) absence of adequately regulated pressure; and/or (f) date and time restrictions (e.g., the system could be locked-out during non-retail hours, on holidays, etc.). Still further, the controller may lock-out the dispensing system during periods wherein the freezing cylinder is being defrosted and/or when the product within the freezing cylinder 2500 is detected (or inferred) as not having certain desired dispense characteristics.

In addition to being placeable into a lock-out state, the dispensing structure of the present disclosure may be activated to operate the described dispensing system during a self-cleaning operation to implement the process described generally above. In such operating conditions, the dispense solenoid may be activated to drive (and potentially overdrive) the pneumatic cylinder 5002 to stroke the dispense valve stem 5008 open, closed and/or repeatedly open and closed to control the flow of product and/or fluids (e.g., cleaning fluids) from the freezing cylinder 2500 during a cleaning operation and/or to provide a source of agitation to the product or fluids flowing through the system.

As a still further example, the dispense components of the present disclosure may be activated to dispense product from the freezing cylinder 2500. This may be done, for example, through the depression of a dispense button (such as the dispense button 1040 of FIG. 1A) by a user or operator. In such an embodiment, depression of the dispense button will then send a signal to the system controller and, in the absence of any control logic requiring otherwise, the controller may send a signal to actuate the pneumatic dispense valve 2030, which—in turn—will cause an upward movement of the dispense stem and will result in the dispensing of product form the system. In one embodiment, the controller may maintain the described state of the dispensing stem as long as the user or operator is depressing the dispense button.

Embodiments are envisioned wherein the controller evaluates the system condition during periods when the dispense button is activated to control the movement of the dispense stem 5008. For example, in some embodiments, the controller may operate to move the dispensing stem 5008 to a product dispensing position upon the initial activation of the button but can then deactivate the dispensing valve causing movement of the stem to a non-dispensing position upon the passage of a certain amount of time since the dispense button was activated. Additionally, at the conclusion of a dispensing operation (or periodically) the system may cause the dispensing stem 2008 to move downward to the end of the dispense spout 3008 to clear out any material that may have accumulated within the dispensing spout.

In another envisioned embodiment, the dispensing stem 5008 may be activated into a fully extended, non-dispense position immediately after the dispense button is pressed to forcibly expel any accumulation of matter from the dispense path before the dispensing stem 5008 is moved to a dispensing position. Similarly, the dispensing stem 5008 may be pulsed prior to, or after dispensing product.

It will be appreciated that the use of a dispensing button 1040 and a pneumatic actuating cylinder 5002 to activate the dispensing system for a product dispense is exemplary only and that alternate dispensing sub-systems may be used without departing from the teachings of the present disclosure.

Figure 5D:
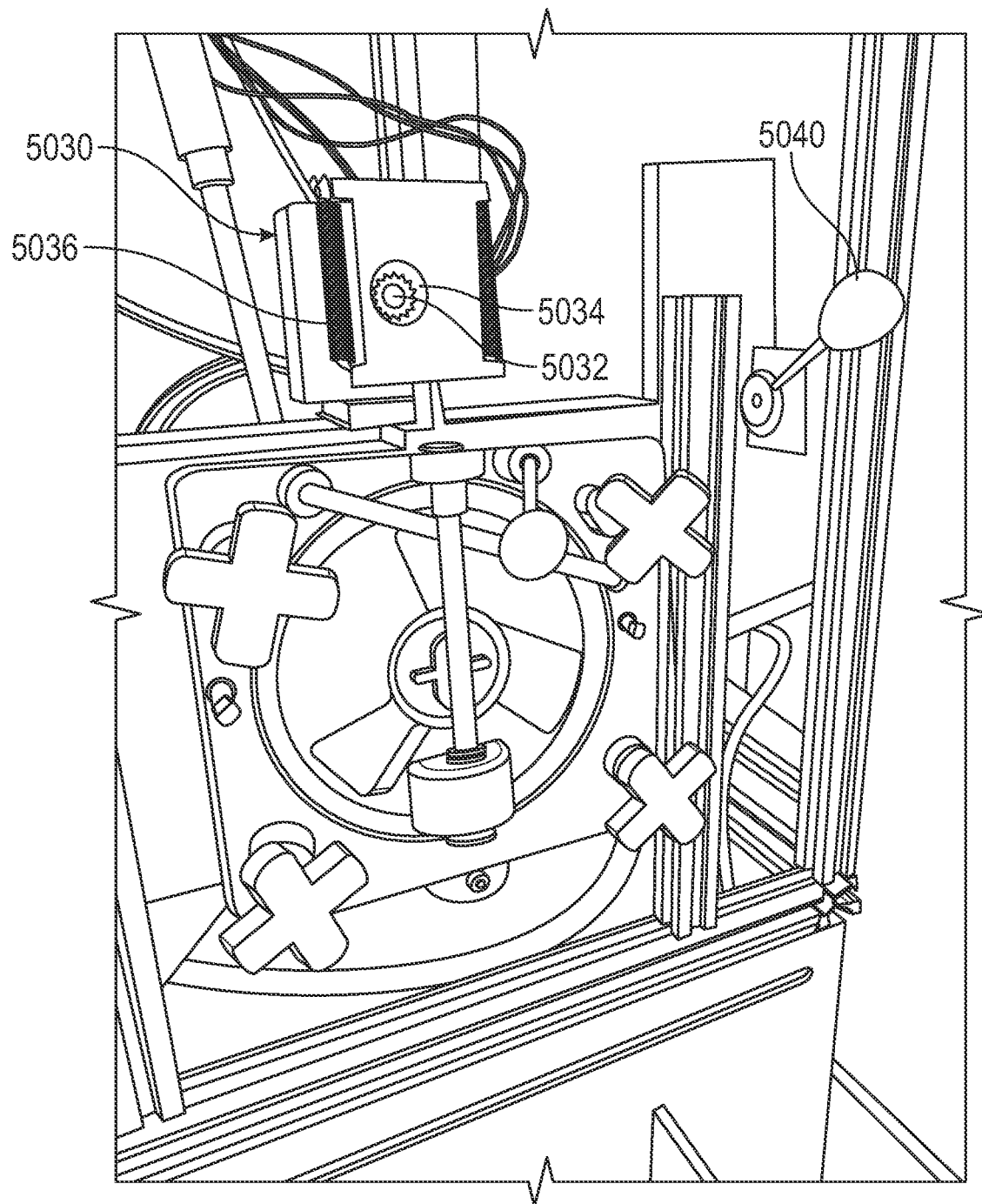
FIG. 5D illustrates a front view of an alternate embodiment of the disclosed exemplary system with a portion of the front cover and various components transparent.

For example, alternate embodiments are envisioned wherein the dispensing system may use a stepper motor to move a stem attached to the lifting element 5002. One such embodiment is shown in FIG. 5D where the shaft coupled to the lifting element 5002 is coupled to an electrically driven stepper motor assembly 5030. In the exemplary embodiment, the output shaft of a stepper motor with the assembly is coupled to a pinion 5032 connected to a rack 5034 to translate rotary motor shaft motion into linear motion. In this example, springs 5036 are used to normally bias the dispensing system to a closed position. As will be apparent from an inspection of FIG. 5D in the illustrated embodiment, activation of the system (e.g., through depression of a dispense button) may cause electrical signals to be provided to the stepper motor resulting in the desired movement of the dispense stem.

Note that the use of a dispensing button is also exemplary and that other user interfaces may be used in place of, or in addition to, such a structure. For example, as shown in FIG. 5D, a spring-loaded lever 5040 that is coupled to a potentiometer may be used to activate the dispense system. In such an embodiment a user or operator would pull down on the lever 5040 (rather than depress a button) and the extent to which the stepper motor assembly 5030 is activated will vary depending on the extent to which the lever is moved. One benefit of such a lever actuating device is that it can mimic the user experience commonly used with a conventional soft-serve ice-cream dispenser.

It may be appreciated that all of the electronically controlled dispense systems described herein (including both the pneumatically operated and stepper motor embodiments discussed above) are such that they may be tuned—and, in particular—dynamically tuned to align with different operation conditions, differing operating states, and different desired usages for the disclosed systems.

Thus, for example, an operator or servicing agent can—through appropriate configuration of the system—control the maximum rate of product dispense through changing the manner in which the controller activates the dispense sub-system (e.g., to adjust the amount of time the valve is open in response to a single depression of a dispense button, to adjust the stroke of the dispense stem 5008 upon activation of the cylinder 5002, etc.). Moreover, the disclosed dispensing system allows the controller to automatically adjust—or dynamically change—the dispensing performance of the system. For example, if the system is one that is capable of detecting the viscosity of the product within the freezing cylinder, the system may adjust the dispense characteristics in response to the detected (or inferred) viscosity such that the rate of dispense will vary depending on the product characteristics. For example, if the product is determined to have a relatively low viscosity—such that a relatively significant volume will be dispensed over a given time period—the system may adjust the amount of time the dispense stem 5008 is open for a given depression of the dispense button. Alternatively, if the determined viscosity is high, the dispense time could be extended. Still further, if the viscosity is below a minimum acceptable valve, the system may prevent dispensing entirely and/or limit the ability of a user to fully open the dispense valve to control the dispense velocity. Still further, the dispense characteristics may be varied depending on the nature and/or type of food product to be dispensed from the system. Thus, the dispense characteristics for a "shake" product, may vary from that for a "soft-serve ice cream" product, which could vary from the dispense characteristics of a hot soup product. Because the present system uses electronically and/or pneumatically controlled devices to implement the dispensing functions, such variation in the dispense characteristics can be efficiently implemented.

As briefly discussed above, in addition to being able to dynamically adjust dispensing characteristics of the disclosed system, the dispenser of the illustrated embodiment is also able to dynamically control (and relieve) the pressure within the freezing cylinder. This is accomplished through a novel cylinder vent relief assembly, one embodiment of which is depicted in FIGS. 3A-3B and FIGS. 6A-6C.

Referring first back to FIG. 3A, and as briefly discussed above, it will be noted that the front portion of the faceplate 3000 defines a generally diamond-shaped opening 3006 and a vent relief passage (bore) 3007 that extends through the faceplate 3000. As reflected in FIG. 3, the faceplate 3000 further defines a vent-relief activation passage that feeds into the interior of the faceplate 3000 and that opens to opening 3041 at the back of the faceplate.

Figure 6A:
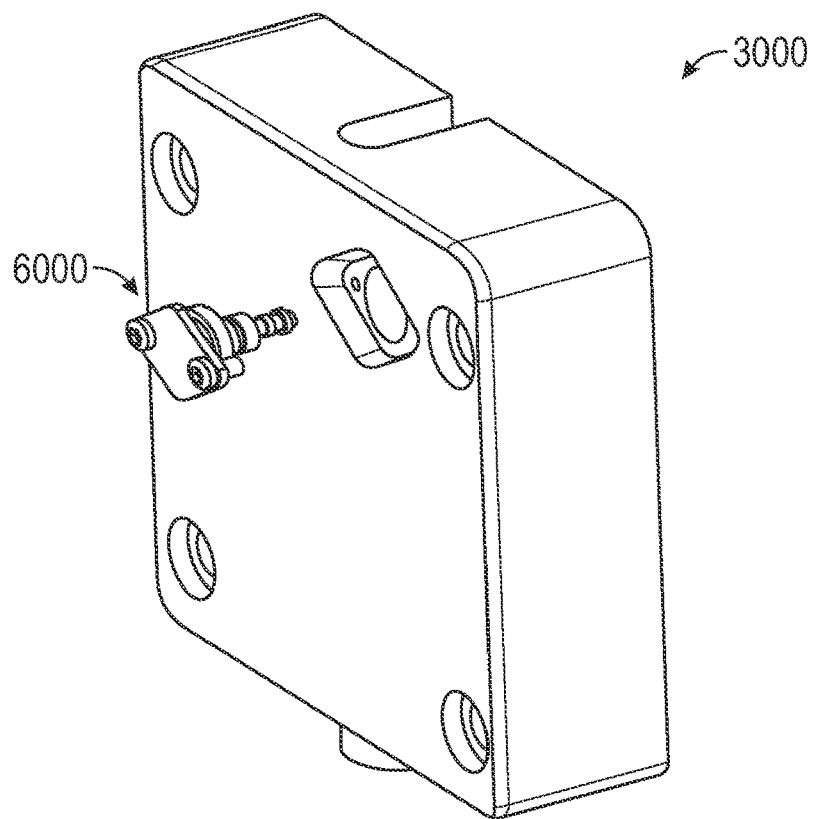
FIGS. 6A-6D illustrate aspects of an exemplary cylinder vent relief assembly as used in connection with the exemplary disclosed system.
Figure 6B:
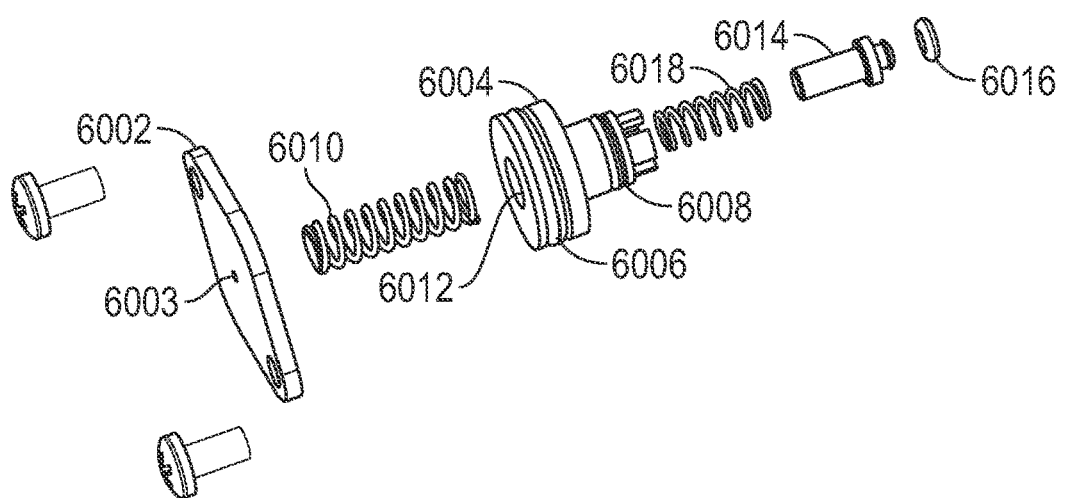
Figure 6C:
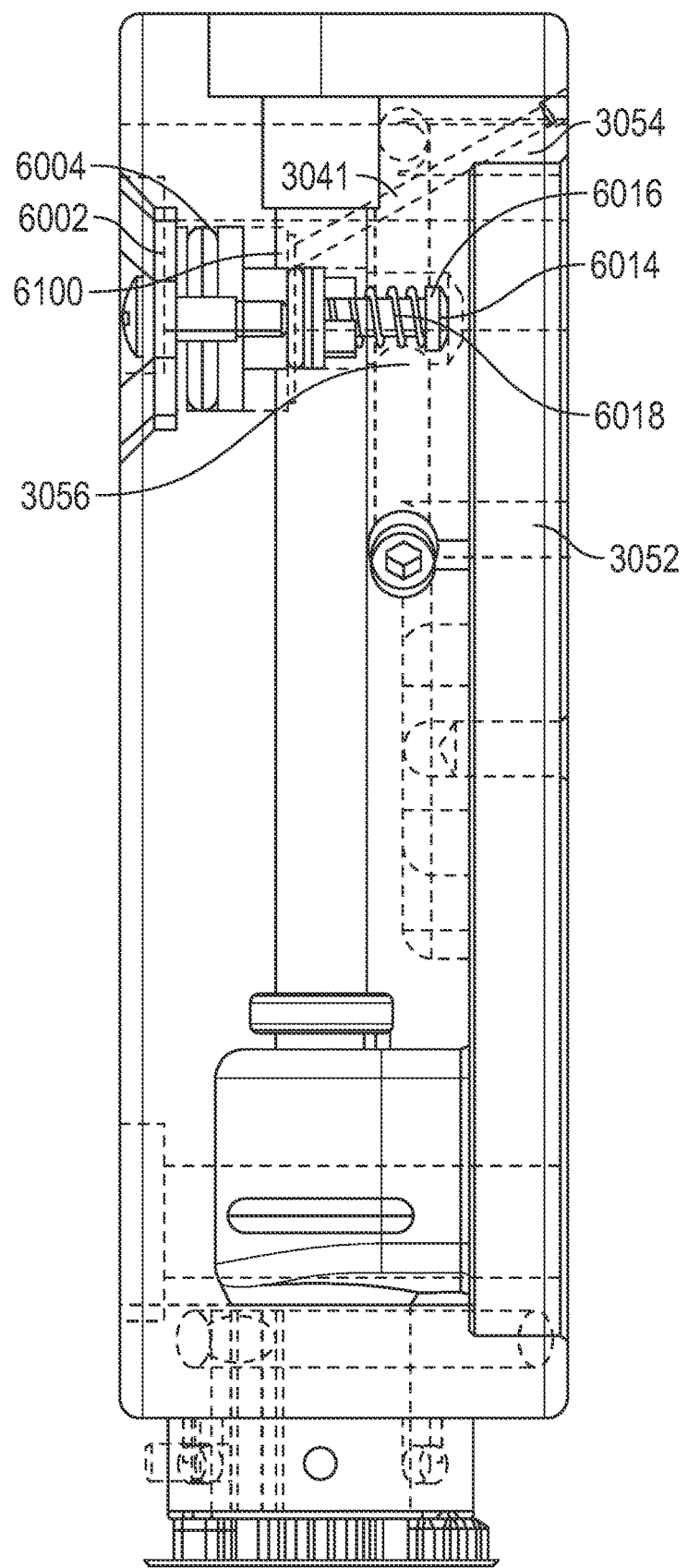

FIGS. 6A-6C illustrate how the openings and features describe above may be used to provide a dynamically controllable, readily cleanable, and mechanically-actuatable cylinder vent relief assembly.

As will be apparent from the figures and the present disclosure, the cylinder vent relief valve or vent relief assembly 6000 of the present disclosure performs at least two distinct functions. Specifically in the illustrated embodiment, the vent relief valve assembly is used to both: (a) provide a relief path to vent cylinder pressure in response to a controlled pneumatic signal and (b) and to act as an automatic over-pressure relief valve that provides a vent relief path as a result of the pressure within the freezing cylinder reaching a certain threshold pressure.

As shown in FIG. 6A the illustrated cylinder vent relief assembly 6000 is affixed to the front of the faceplate assembly 3000 using, in the example two screws.

FIG. 6B provides a more detailed, exploded view of the main components of the vent relief assembly 6000. As shown in the figure the assembly 6000 includes a plug member 6002 formed of a resilient material. The plug member defines an opening through which attachment elements (screws or other threaded members in the illustrated example) may pass to couple the plug 6002 to the faceplate 3000. Additionally, there exists a vent feature 6003 wherein the cavity created between 6002, 3006 and 6004 readily achieves equilibrium with the surrounding environment preventing a buildup in pressure with actuation of the assembly (e.g., when valve 2026 operates causing displacement of piston element 6004 and compression of spring 6010. Positioned behind the flexible plug member 6002 is a vent relief piston element 6004 (that, in the illustrated embodiments, supports O-rings 6006 and 6008). A first spring element 6010 is positioned between the plug member 6002 and the piston element 6004 such that one end of the first spring element 6010 is received within a front cavity 6012 defined by the piston element 6004. In the example of FIG. 6B, the front cavity is a closed cavity in that it is not opened at its rear surface.

A poppet relief element 6014, which in the illustrated example supports O-ring 6016, is provided that has an extending portion that fits within a rear cavity formed within the piston element 6008. A second spring element 6018 is positioned about the extending portion of the poppet relief element 6014 that has one end extending into a rear cavity of the piston element 6004. In the illustrated example, the rear cavity is closed in that its rear surface is not open. In the example of FIG. 6B, the structure of the piston 6004 that defines the rear cavity may have one or more cutouts to permit the passage of gas or fluids across the piston.

FIGS. 6A-6C further illustrate the manner in which the cylinder vent relief assembly 6000 is positioned within the faceplate 3000 and reflects the manner in which the assembly 6000 operates and may be cleaned.

As reflected in the figures, and specifically FIG. 6C, when positioned within the faceplate 3000, a rear surface of the piston 6004 fits with a cavity 6100 formed by a recess within the faceplate 3000. In the illustrated figure, the piston 6004 is held in place by the forces provided by the plug 6002 and the first spring element 6010. As further reflected in the figures, in the illustrated orientation, the poppet assembly is positioned against the side of the faceplate that defines the opening 3007 (discussed above in connection with FIG. 3A) which, if open, would provide a passage from the inside of the freezing cylinder 2500 to an open portion of the faceplate within the recess 3506.

In the orientation shown in FIGS. 6B and 6C, a portion of the cavity 6100 on the backside of the piston element 6004 is sealed from the external atmosphere by O-ring 6006 and the previously described vent relief activation passage 3041 passes from the back of the faceplate 3000 to the cavity 6100. Because of this structure, activation of the vent relief valve 2026 (which controls the application of pressurized gas to the passage 3041) will cause pressurized gas to flow from the accumulator 2008, through the vent relief solenoid 2026 and into the cavity 6100. In the illustrated example, this flow of gas into cavity 6100 will eventually cause a pressure build-up within cavity 6100 such that a sufficient force is created to force the piston 6004 to overcome the forces holding the piston in a closed position (namely the forces provided by the first spring element 6010 and the plug 6002) and move the piston 6004 to an "open position" (i.e., one where a pressure relief path is provided from the freezing cylinder). In the illustrated example, the pressure release path may be visualized by considering FIGS. 6B-6C in conjunction with FIGS. 3B-3D. Referring to such figures, it will be appreciated that—when the pressure relief path that is created as a result of piston 6004 moving to the open position—an open path will extend from within the interior of the freezing cylinder 2500, through the opening (or bore) 3007 on the rear of the faceplate (FIG. 3B), through the faceplate, through the opening created by the open piston 6004 and into the cavity 3056 that extends between port 3050 and 3052 (FIG. 3D). Both because of the pressurized nature of the freezing cylinder 2500, and because the opening 3007 is located above the opening for port 3052, any gas or product that flows through the faceplate into cavity 3056 will be directed into and through port 3052. As described previously, in the illustrated example, port 3052 is connected directly to the drain such that any released gas, fluid and/or product, will flow through the port 3052 into the drain without passing through the drain valve 2816.

As the piston 6004 moves to an open position, the force maintaining the poppet element 6014 in a sealed, closed position against the opening into the freezing cylinder 2500 will be reduced. As such, if the pressure within the freezing cylinder 2500 is of a sufficient magnitude, the pressure within the freezing cylinder 2500 can overcome the reduced force acting against the poppet element 6014, and thus provide a pressure release passage extending from the interior of the freezing cylinder, through the opening 3007, and through the faceplate 3000 into cavity 3056 (as described above). In this manner, the vent relief solenoid 2026 may be activated to control the pressure within the freezing cylinder 2500 and in response to a pneumatic control signal.

As will be appreciated by further study of FIGS. 6B and 6C, because the poppet element 6014 is spring biased against the faceplate, in part, by the force produced by the second spring element 6018, and because poppet element 6014 is positioned such that it can move against the force of spring 6018 towards the piston 6004, there is the potential that the pressure within the freezing cylinder 2500 reaches a sufficient magnitude that the poppet element 6014 moves to an open position, thus permitting the flow of gas, fluid or product within the freezing chamber through is the opening 3007, into the cavity 3056, out the port 3052, and into the drain. Further, a buildup of pressure within the cavity 6100 that can generate forces within the cavity 6100 sufficient to move the piston 6004 to an open position and, thus, provide a pressure relief path from the cavity 6100, over the piston 6004 to the atmosphere. In this manner, the illustrated exemplary cylinder vent pressure relief assembly 6000 may provide an automatic mechanical pressure relief valve for releasing pressure from within the freezing cylinder 2500, such that—in the illustrated example—any flow of gas, fluid and/or released product from within the freezing cylinder is fed directly to the drain without passing through the drain valve 2816. Of note, the pressure relieving aspects of the poppet element 6014 and the piston 6014 are not affected by any sticktion of either of O-rings 6006 and/or 6008.

As will be appreciated from the teaching of this disclosure, the pressure required to activate the vent relief assembly 6000 through application of a pneumatic control signal, and the pressure at which the assembly will automatically open as a result of overpressure within the freezing cylinder 2500 may be set and adjusted through the sizing and the selection of the spring elements 6010 and 6018.

Figure 6D:
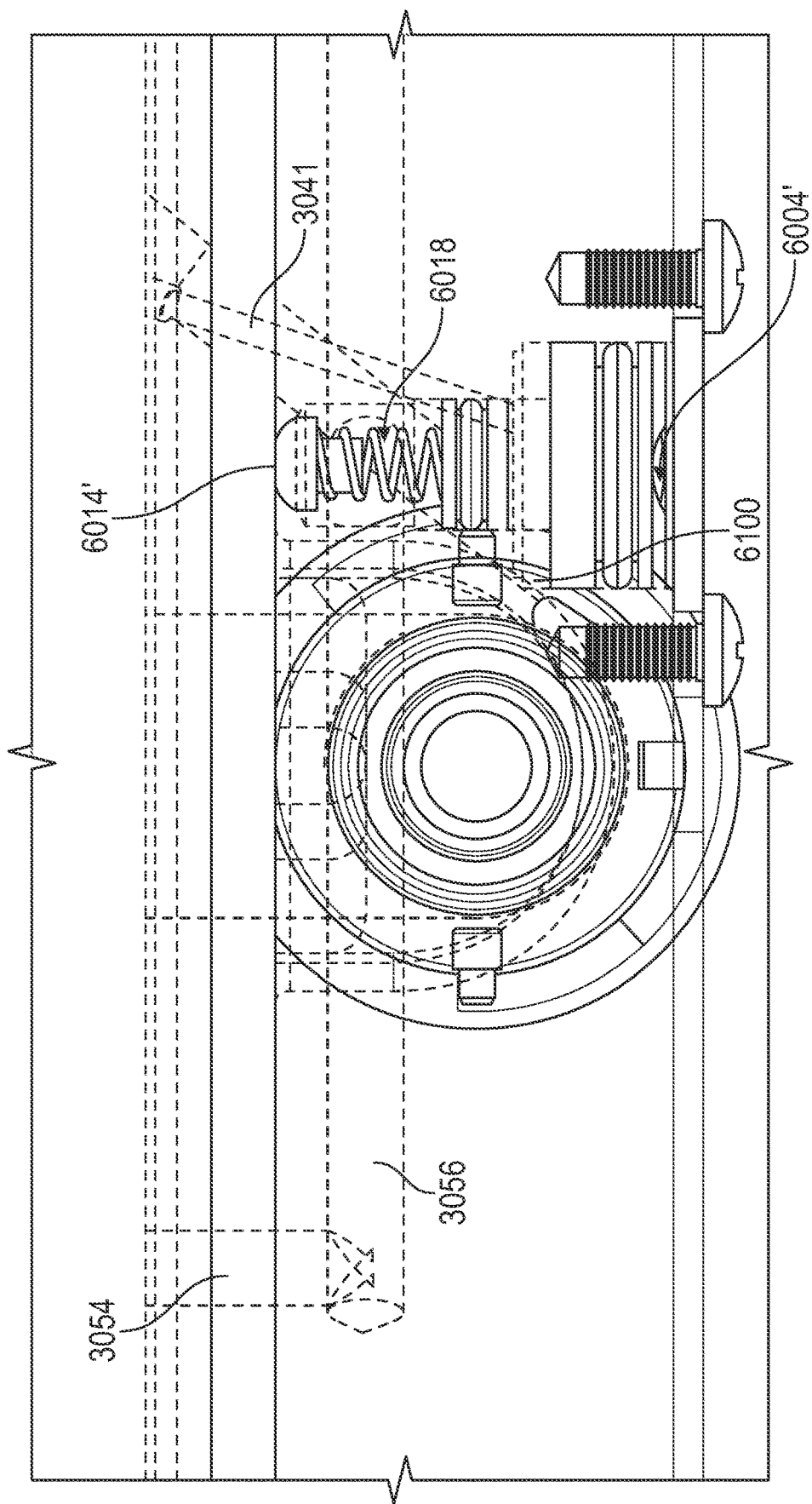

In the example of FIGS. 6A-6C, the opening of the vent relief assembly 6000 in response to the receipt of a pneumatic control signal from valve 2026 may or may not result in the poppet element 2014 opening and providing a pressure relief path from the interior of the freezing cylinder to atmosphere. As described above, whether the poppet element 2014 will open will depend on whether the pressure within the freezing chamber is sufficient to overcome the reduced closing force that will be applied to the poppet element 2014 under those conditions. FIG. 6D depicts an alternate embodiment where activation of the vent relief assembly 6000 through the application of a pneumatic control signal will always result in movement of the poppet element 2014 to an open position.

In the embodiment of FIG. 6D, the vent relief assembly 6000 is similar to that described above in connection with FIGS. 6A-6C except that the poppet element 6014' is retained within an interior space within the piston 6004'. In this configuration, whenever the piston 6004' moves to an open position, it will pull the poppet element 6014' with it.

As will be appreciated, because operation of the vent relief assemblies described above may result in the passage of gas, fluid or other materials from the interior of the freezing cylinder, through the faceplate, and across and through the vent relief assembly to atmosphere, there is the potential for product or materials to build up along the described pressure relief passage. In certain embodiments of the present dispenser, components and features may be provided to clean or flush out that passage. FIGS. 6C and 6D (in consideration with FIG. 2A illustrate one such flushing system.

As discussed above in connection with FIG. 2A, the cleaning/flushing system may include a vent flush passage (bore) in fluid communication with a vent flush control valve 2208 configured such that activation of the vent flush valve 2208 will cause water to flow through the vent flush line to clean the venting system. In FIGS. 6C and 6D, this vent flush passage takes the form of the passage 3056 which extends through the faceplate from opening 3054 (as shown in FIGS. 3B and 3D) at the inlet to opening 3052 at the outlet. As may be seen in FIGS. 6C and 6D, the vent flush passage 3056 extends to a region of the faceplate within which the second spring element 6018 and the non-sealing portion of the poppet element 6014 (or 6014' for the alternate embodiment of FIG. 6D) are positioned. As such, as water flows through the vent flush passage 3056, it will tend to clean the surfaces of the poppet element 6014 that are not exposed to the interior of the freezing cylinder 2500.

As will be appreciated from consideration of FIGS. 6C and 6D in light of the discussion provided above in connection with a self-cleaning element, during a self-cleaning operation, cleaning and/or sanitizing fluid will be provided to the freezing cylinder such that all exposed surfaces within the freezing cylinder 2500 (including all exposed surfaces of the poppet element 2014 and any associated O-rings) will be cleaned and sanitized. During that self-cleaning cycle the vent relief assembly 6000 may be repeatedly activated, which may result in cleaning/sanitizing fluid passing from the interior of the freezing cylinder, across portions of the vent relief assembly 6000 and out the front of the faceplate to atmosphere or through the vent flush passage 3056, and into the drain. In addition to this incidental cleaning, portions of the vent relief assembly 6000 may also be flushed through activation of the vent flush valve 2208 which may cause water to flow through the passage 3054, across elements of the vent relief assembly 6000, and into the drain.

In certain embodiments, the vent purge valve 2034 may be activated during all, a portion, or repeated portions of any incidental cleaning or any flushing period to both inject gas into the flush passage 3056 (thus impacting fluid flow) and cause movement of the piston 6004 (and movement of the poppet element 6014).

It will be appreciated from above discussion that not all of the surfaces of the vent relief assembly 6000 are exposed to the interior of the freezing chamber 2500 and that sanitizing of such non-product contact surfaces may be unnecessary. As such, in the above-described embodiments, the water from the water supply (as controlled by vent flush valve 2208) is used for the flushing operation described above. Alternate embodiments are envisioned where alternate fluid connections are made such that the fluid used for the flushing operation is the same cleaning and/or sanitizing fluid used for the cleaning and/or sanitizing of the freezing-cylinder.

As the above discussion indicated, in the described exemplary embodiment two areas of the system are refrigerated, namely the freezing cylinder 2500 and the refrigerated ingredient storage compartment 2600. Aspects of structures associated with one exemplary refrigeration storage compartment 2600 are illustrated in FIG. 1A and FIGS. 7A-7E.

Referring first to FIG. 1A, the exemplary refrigerated ingredient storage compartment (sometimes referred to herein in shorthand as the "refrigeration compartment") is positioned approximately within the middle ⅓ of the overall system and is accessible through a hinged-mounted and insulated door 1020 to which an affixed or removable drip tray 1025 may be attached. Although not illustrated in FIG. 1A, the refrigerator door may include or be coupled to suitable gasketing material and a thermal break to form a tight seal between the outer portions of the inner door surface and the outer portions of the refrigeration compartment.

FIGS. 7A-7E illustrate aspects of an exemplary refrigeration ingredient storage compartment 2600 with the hinged door 1020 removed. As generally illustrated in FIGS. 7A-7E, the ingredient refrigeration compartment may take the form of a cabinet containing the refrigeration components described herein that is surrounded by insulating material (e.g., dense insulating foam or other suitable material) and paneling. In the illustrated embodiment, the refrigeration compartment 2600 includes an overall structure that may include inner panel elements forming the interior walls of the refrigeration compartment, outer panel elements forming the exterior walls of the refrigeration compartment, and insulation positioned between the interior and exterior panel elements. These elements may all be positioned within the overall structural elements that form the overall product formation and dispensing system.

To increase the thermal isolation of the ingredient refrigeration compartment, the compartment's components may be separated from the frame on which it is positioned by mounts or spacers which may be designed to minimize the extent of thermal conductivity between the refrigeration cabinet and the remainder of the system. Such mounts or spacers may be located on all, or fewer than all, sides of the refrigeration cabinet.

Figure 7A:
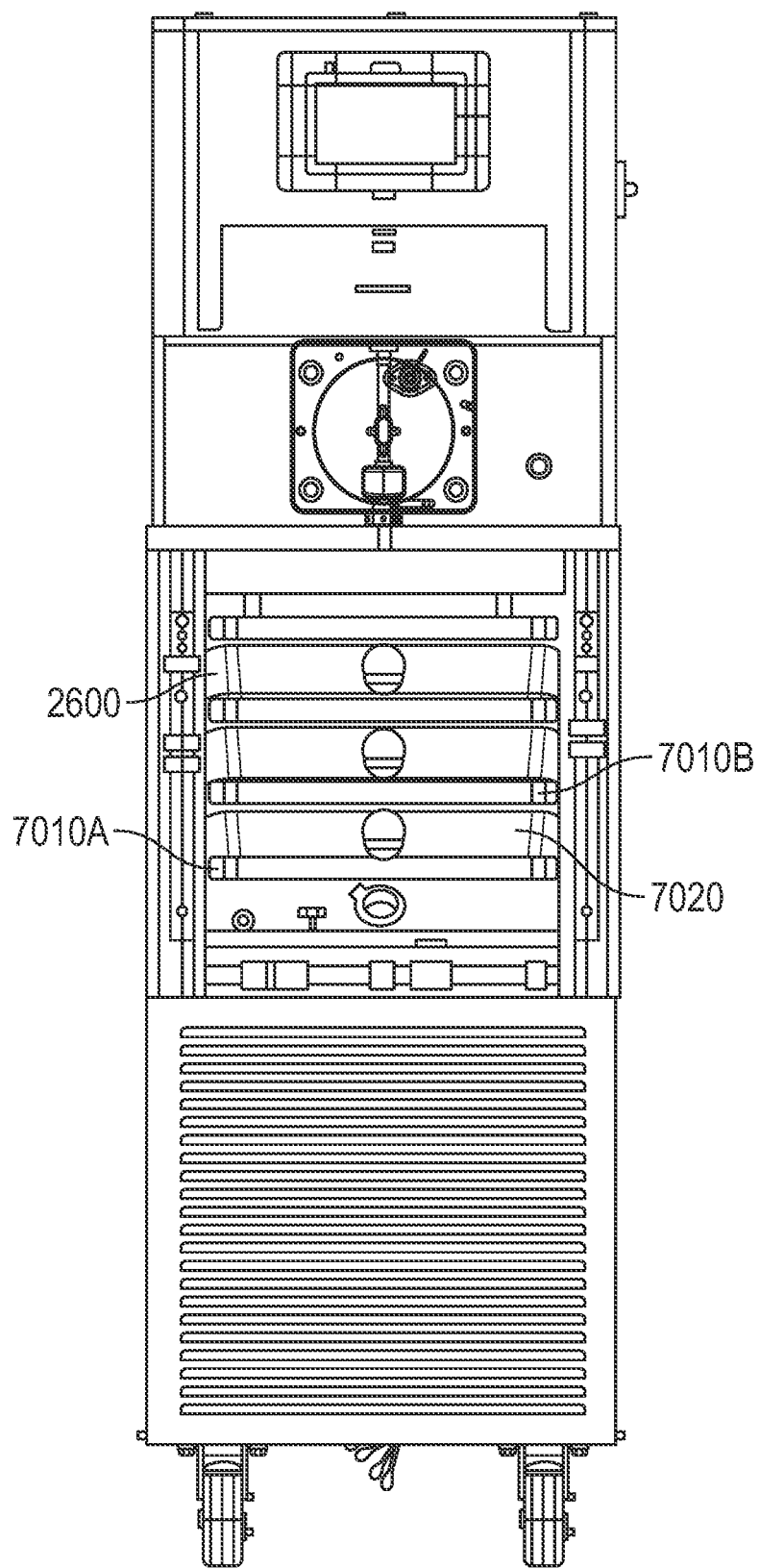
FIGS. 7A-7F illustrate aspects of an exemplary system constructed in accordance with teachings from this disclosure, including an exemplary ingredient storage compartment and ingredient supply apparatus as used in connection with the disclosed system with the hinged door removed.
Figure 7B:
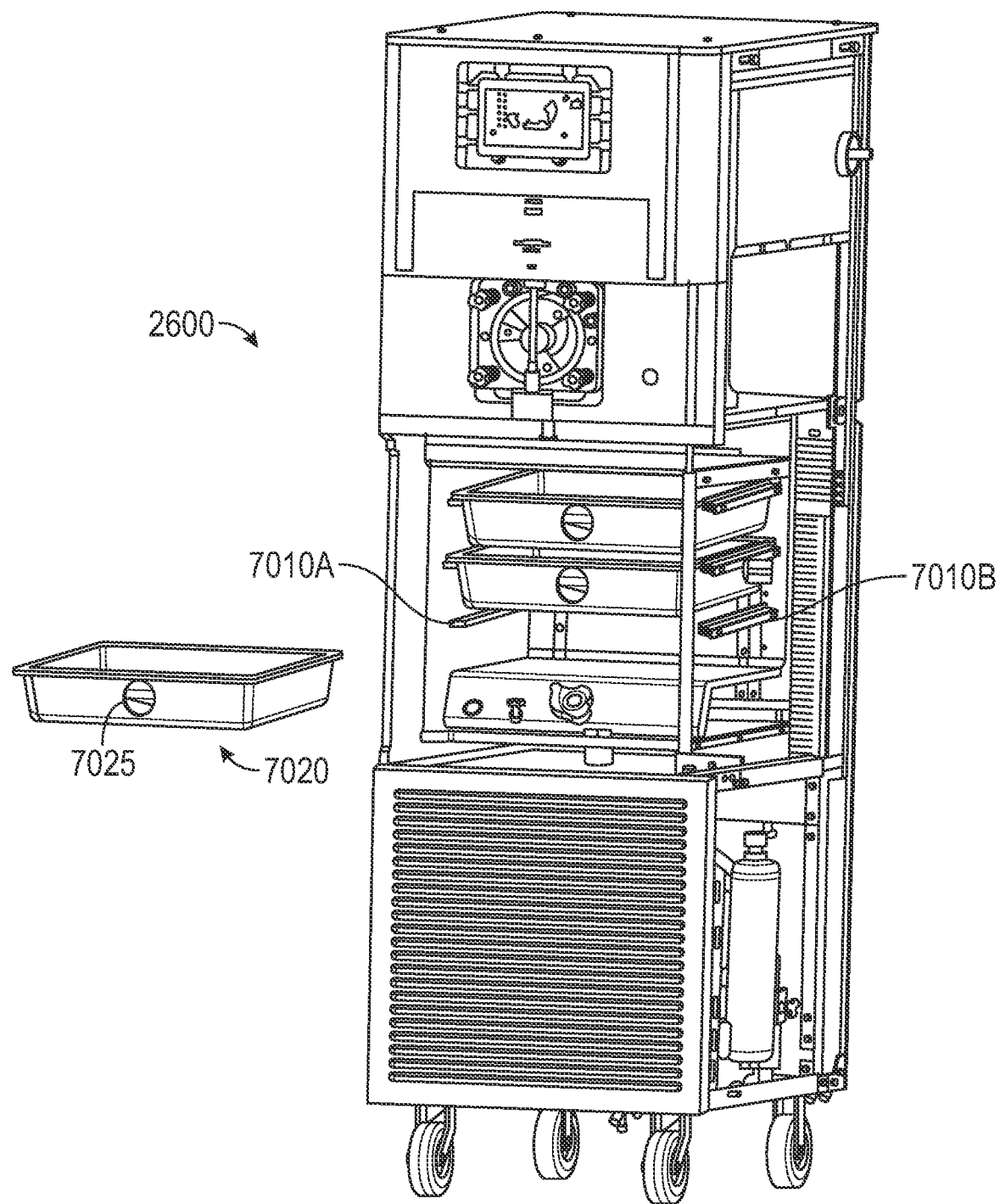
Figure 7C:
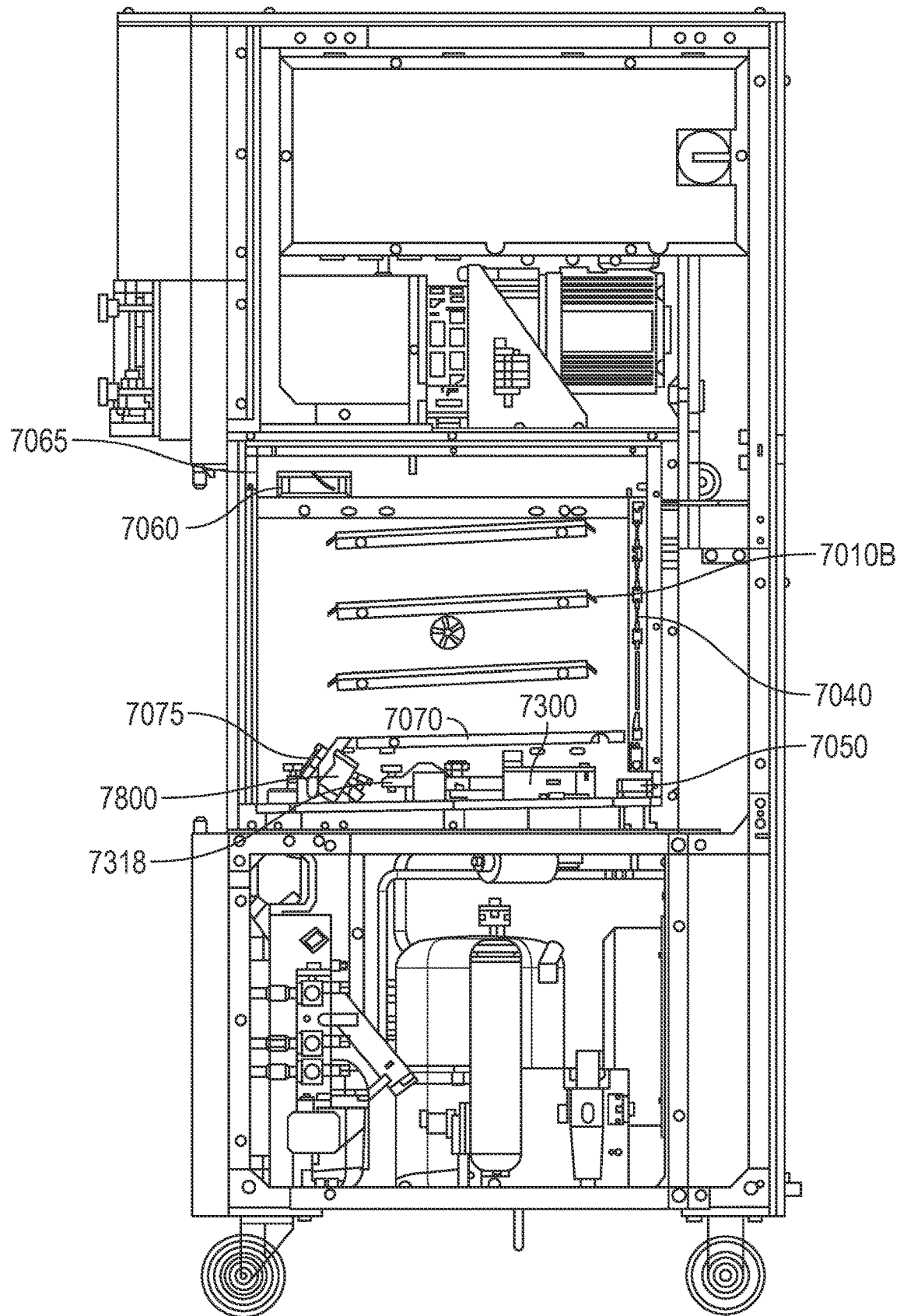

FIG. 7B illustrates the exemplary refrigeration compartment of FIG. 7A with one of the sides of the compartment rendered transparent. As reflected in FIGS. 7A and 7B, the interior of the refrigeration compartment contains a number of tray supports in the form of ridges that extend horizontally, essentially along the sides of the refrigeration compartment from front to back (only two of which 7010A and 7010B are identified). These tray supports are configured to support a plurality of removable ingredient storage trays, one of which is identified as element 7020 and—in the illustrated example—support them such that they are maintained in a configuration with a generally forward tilting slope to facilitate maximum drainage of the ingredients contained within the trays. As reflected in the FIG. 7B, each ingredient tray is removable from the refrigeration compartment for cleaning and replacement and/or for easy positioning of an ingredient supply within the tray.

As reflected in in FIG. 7B, the exemplary ingredient storage tray 7020 includes a main body having a pan-like structure that defines a dispensing port 7025 on one end, where the pan-like structure and the dispensing port 7025 are designed to receive an ingredient supply unit in the form of a bag containing a liquid ingredient that is connected to a sterile coupling.

The ingredients may be supplied from any suitable supply apparatus. In one embodiment, the supply apparatus may take the form of a bag-like container that is coupled to a connecting port that is designed to mate with a connector coupled to the appropriate input line for the system. Such an embodiment is reflected in FIG. 7D-2 where a suitable bag connection port 7500 is shown (the associated bag is not illustrated) along with an appropriate mating connector 7502. Forms of connection other than the one shown in FIG. 7D-2 can be used to couple ingredient lines (or any other fluid containing lines) in the disclosed system. For example, a sanitary connecting arrangement, such as the one depicted in FIG. 7D-3 can be used for such connections.

It should also be appreciated that the ingredients need not be supplied from an apparatus containing a collapsible bag. For example, FIG. 7F illustrates an ingredient supply apparatus that includes a rigid or semi-rigid structure.

In the illustrated example described herein, there are features on the faces of the ingredient storage trays which interact with the tray supports to counteract the effect of the generally forward tilting slope in which the trays are maintained such that the storage trays cannot easily move from a desired position and remain in place within the refrigeration compartment.

In certain embodiments, the ingredient provided by the ingredient supply unit may consist of or comprise a non-diluted, dairy-based solution that may be used to form soft-serve ice cream, shakes and/or smoothies. Of note, in such embodiments, proper operation of the system will not result in any (or any meaningful) exposure of the stored ingredients within the bag to any atmospheric air. As such, assuming that the ingredient material as supplied in the bag is suitable for human consumption (e.g., is a solution that was pasteurized prior to or within the bag) further pasteurization of the bag contents need not be performed. Thus, if a given ingredient bag is coupled to the system and used for several days, the ingredient bag may not need to be pasteurized as it will both be stored within the temperature-controlled environment of the refrigeration chamber and coupled to a sealed system that is not open to the external atmosphere. Note that the sealed system approach of the exemplary dispenser disclosed herein is thus significantly different from conventional open hopper systems where the hopper contents typically must be pasteurized or discarded on a regular—and sometimes daily—basis.

Referring back to FIG. 7C. a side-view of the exemplary embodiment of FIG. 7B with all of the ingredient storage trays removed is provided. As this figure reflects, in the illustrated embodiment, the interior of the refrigeration compartment contains—in addition to the components discussed above—a single row evaporator coil 7040 that extends substantially across the entirety of the rear surface of the refrigeration cabinet and a drip tray 7050 that may be positioned below the evaporator coil and that may be configured to collect condensate drippings that collect and fall from the evaporator coil 7040. As FIG. 4C also illustrates, the refrigeration cabinet in the illustrated exemplary embodiment may also include an evaporator fan 7060; an air shroud 7065; a pump cover 7070; and a front panel 7075.

In the illustrated embodiment the evaporator fan 7060 is positioned within a location towards the middle front portion of the air shroud 7065 such that activation of the fan will pull air generally from the front of the refrigeration cabinet, up through the fan 7060 and into an air chamber defined by the air shroud 7065 and force air to flow down over the evaporator coil 7040 and out into the interior of the refrigeration compartment. Thus, activation of the fan 7060 will result in the circulation of air within the refrigeration compartment and across the evaporator coil 7040. Alternate embodiments are envisioned wherein the air flow direction is reversed such that flowing air would be pulled through and over the evaporation coil before passing into the refrigeration compartment.

In the illustrated embodiment the evaporator fan 7060 is designed and configured to operate in response to signals provided by a controller (discussed below) on an ON/OFF basis and at a constant speed. Alternate embodiments are envisioned, however, where the speed of the evaporator fan may be variable and controlled based on, for example, the difference between the temperature within the product refrigeration cabinet and a desired set point temperature, and/or on the time since the last activation of the evaporator fan.

In one embodiment the evaporator fan 7060 is configured through the use of switching elements to be energized and run anytime the refrigerator door is closed. In this embodiment, airflow will be provided throughout the product refrigeration cabinet regardless of the temperature within the cabinet. In alternative embodiments, the evaporator fan may be run based on the differential between the detected temperature within the product refrigeration cabinet and a desired setpoint temperature and/or on a timed or pulsed basis to ensure that there are no lengthy periods over which the fan is not operated. Such an embodiment may ensure at least minimal air circulation within the product refrigeration cabinet. Still further embodiments are envisioned wherein the evaporator fan is operated at a given speed (or turned off) whenever the refrigeration door is open to try to minimize any temperature increase that may occur through the opening of the door or the introduction of a non-chilled ingredient supply unit into the refrigeration cabinet.

As described in more detail below, a number of components are positioned below the pump cover 7070 yet within the refrigeration cabinet such that the components are cooled within the refrigeration cabinet. In the exemplary embodiments, these components include a self-cleaning receiving port 7800 (that corresponds with the system connection port 2610 discussed above in connection with FIGS. 2A-2C); a peristaltic pump 7300 (that corresponds to the pump 2300 discussed above); and an air check valve 7318 that controls the injection of gas into the fluid output line from the pump 7300.

Figures 2, 7D:
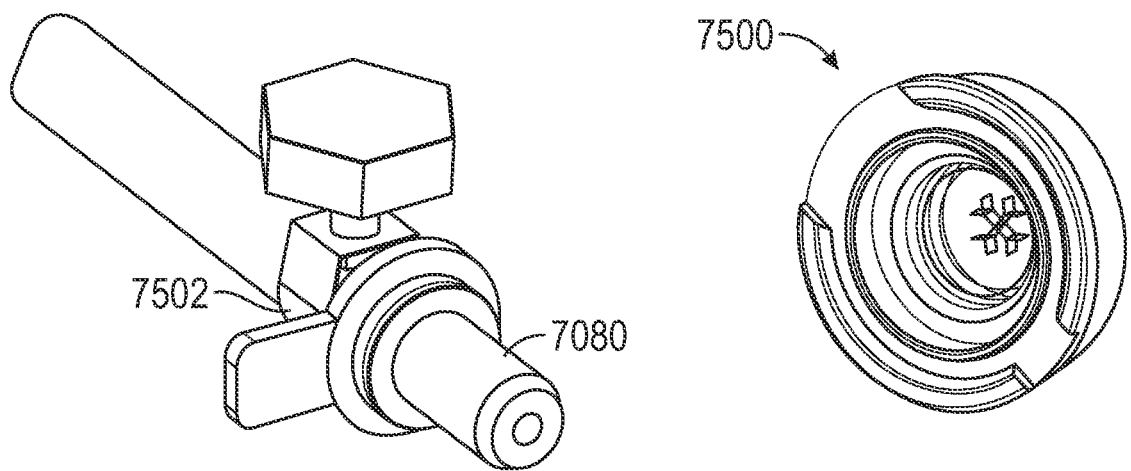
FIGS. 8A-8E-2 illustrate details of exemplary embodiments of a pressure block assembly as may be used with the exemplary disclosed system.
Figures 3, 7D:
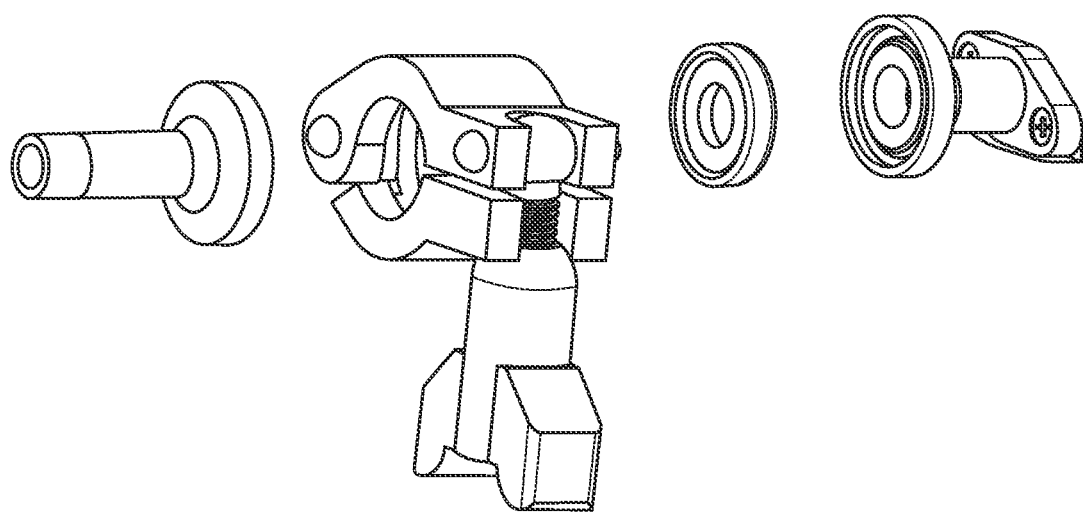
Figure 8A:
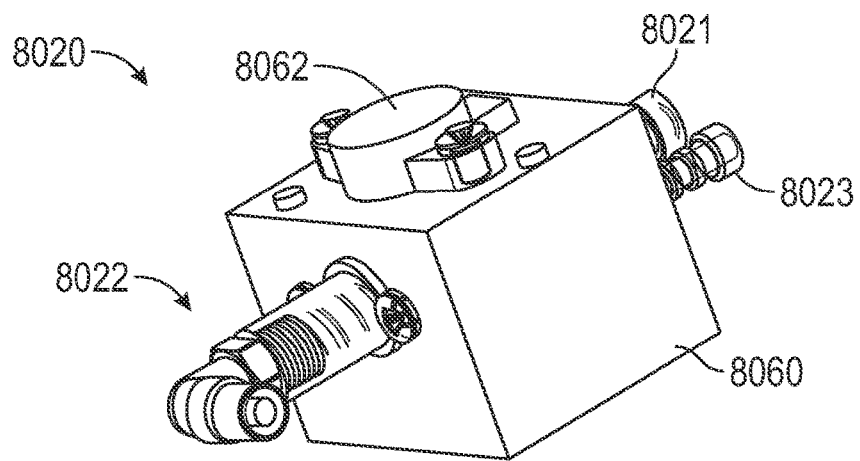
Figure 8B:
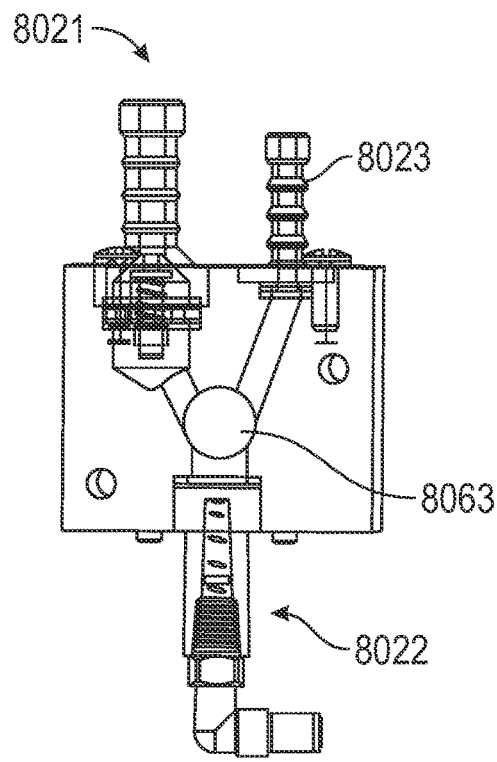
Figure 8C:
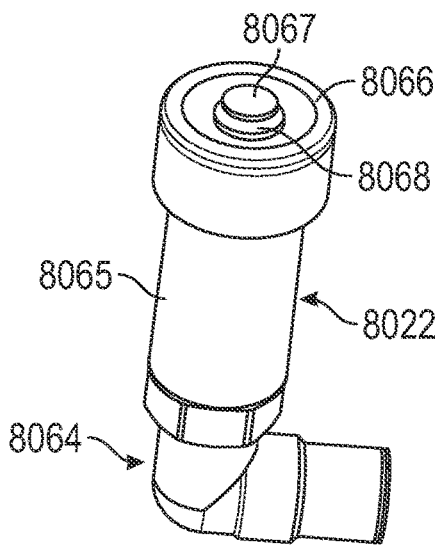
Figure 8D:
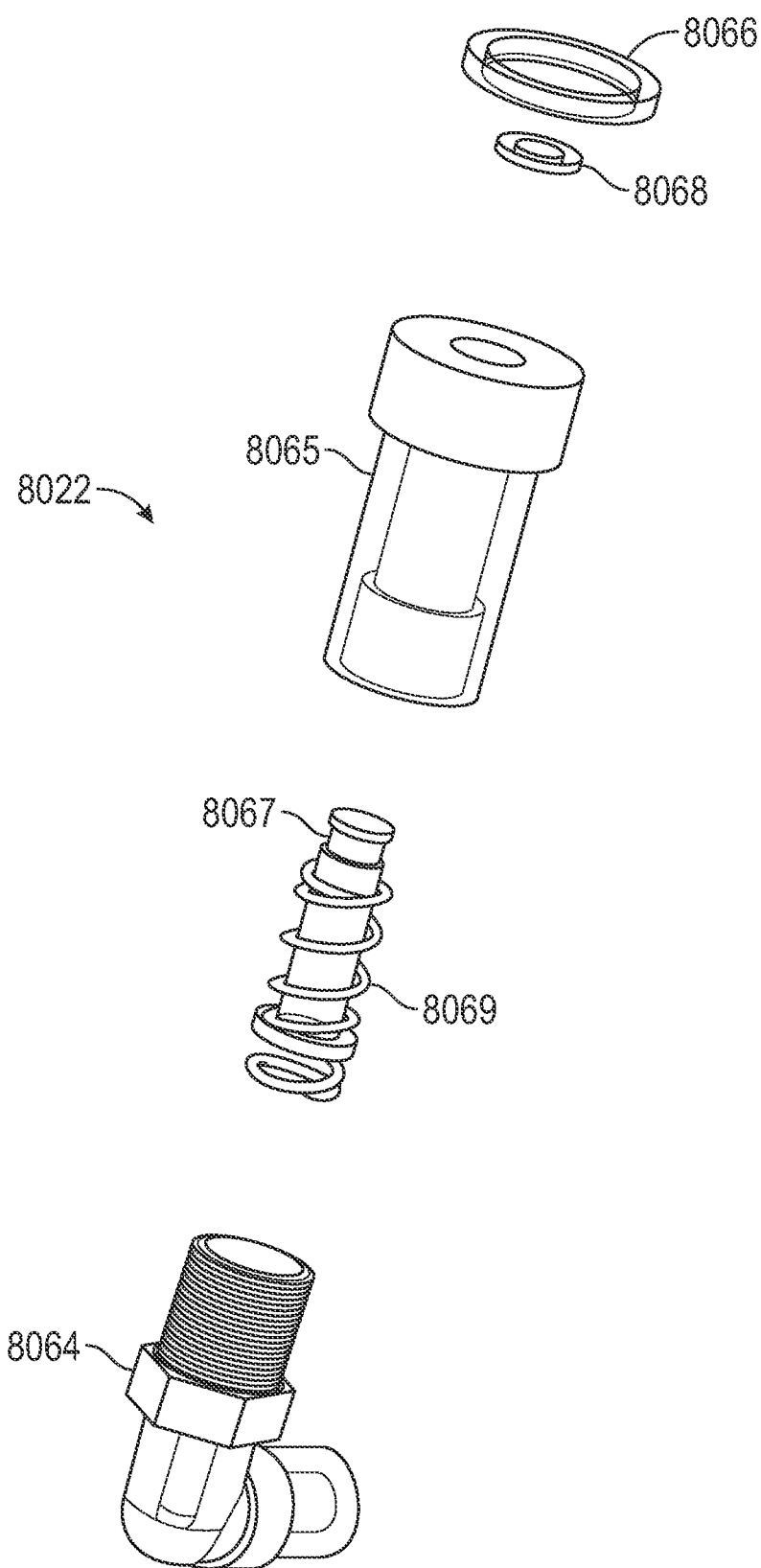
Figures 1, 8E:
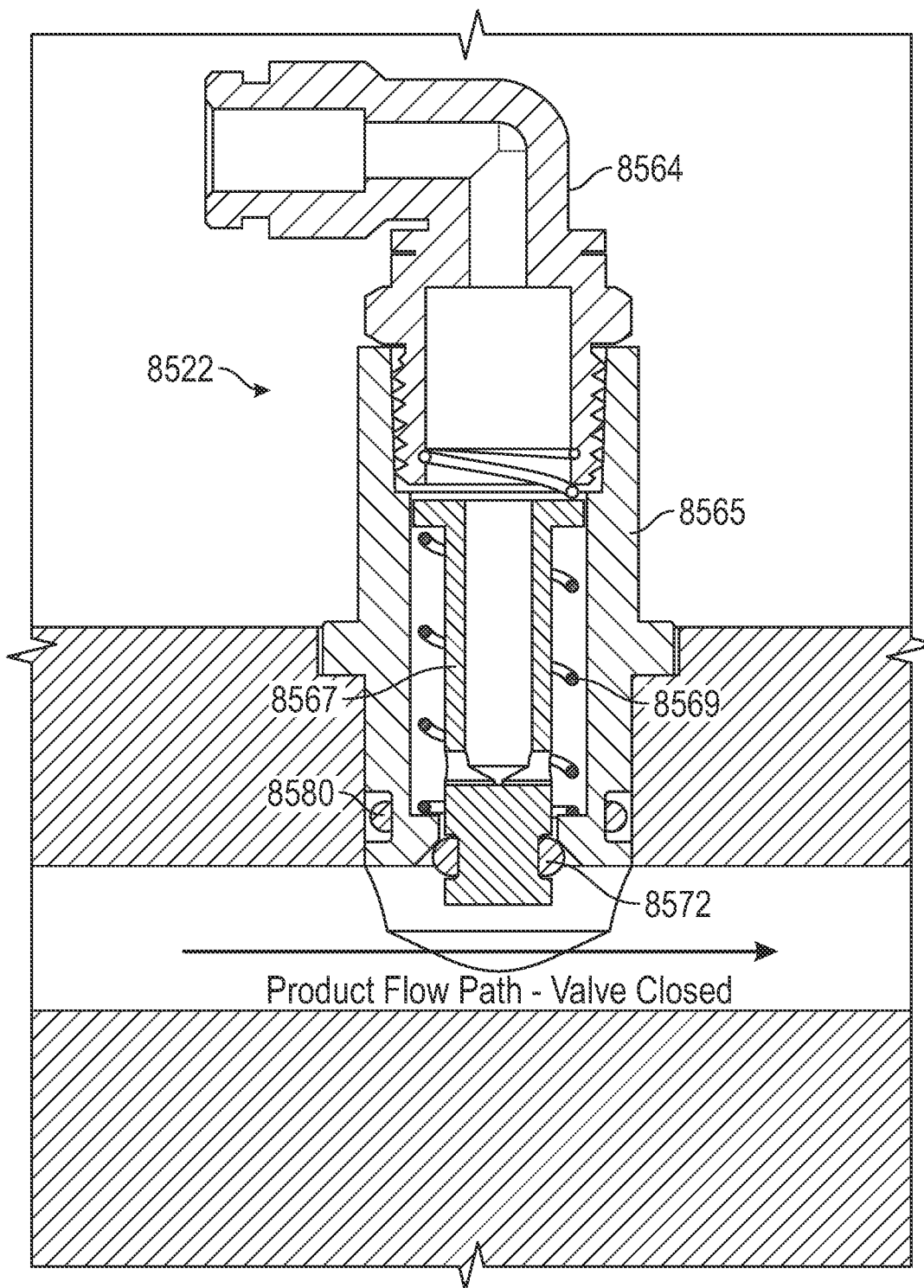
Figures 2, 8E:
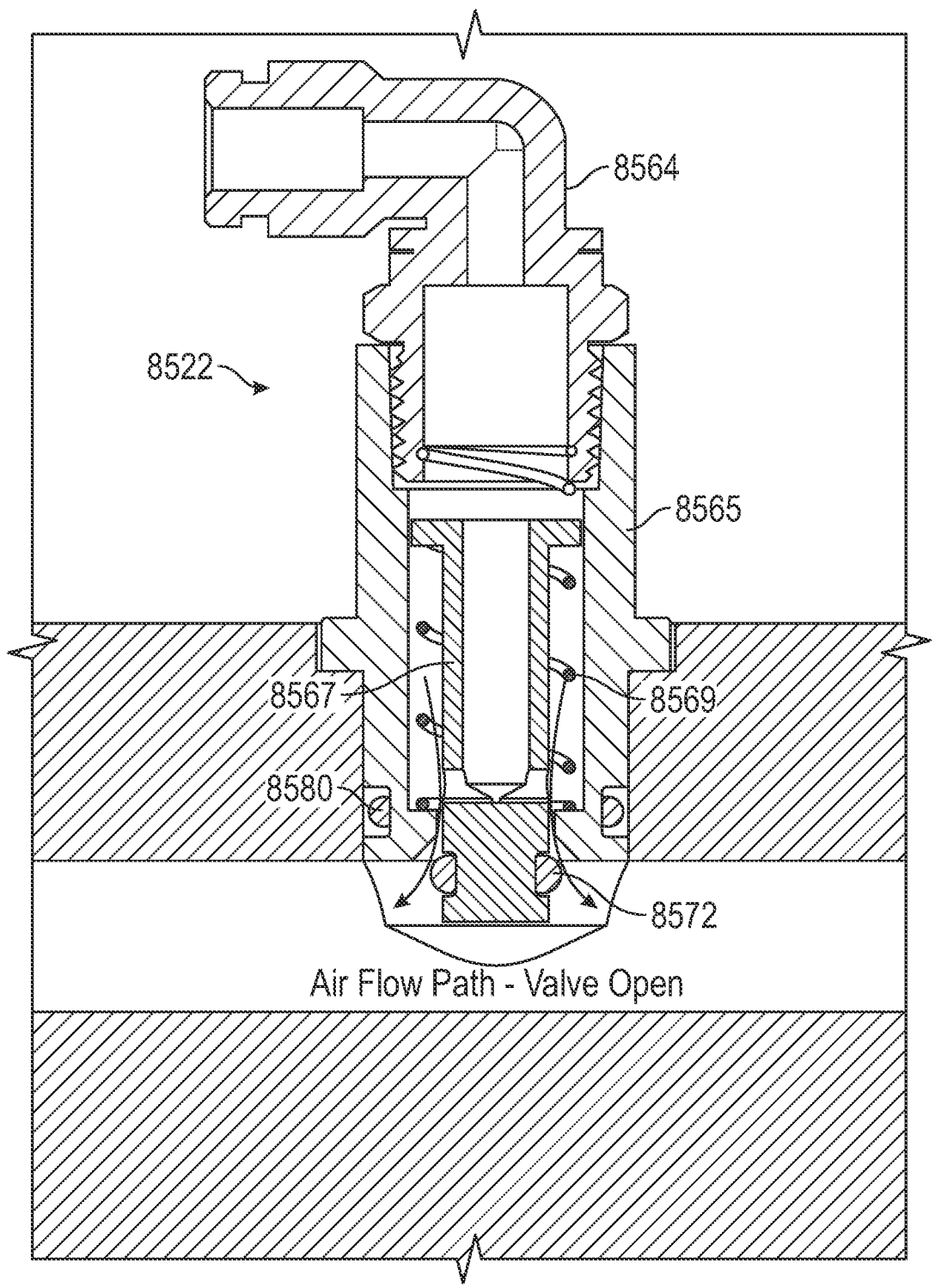

FIG. 7D-1 illustrates an expanded, angled view of the front panel 7075 and the self-cleaning receiver port 7800 (which is depicted as a specific exemplary embodiment of the self-cleaning port 2800 discussed above). As reflected in the exemplary figure, the self-cleaning receiver port 7800 is positioned along an angled surface of the front panel 7075. In the figure, the front panel 7075 also defines an opening through which a hose element may pass. As reflected in FIG. 7D-2, the hose element may include at its distal end a connecting element 7080. In the exemplary embodiment, the connecting element 7080 is configured so that it may make connection with either the self-cleaning receiver port 7800 or a dispensing port 7500 of an ingredient supply unit (e.g., as shown in FIG. 7D-2).

As FIG. 7D-1 shows, the self-cleaning receiver port 7800 port includes a first, generally ring-like structure, that defines a connection port and a movable locking member or clamp 7805 that may be rotated between a first position that permits the placement of a connecting element unto the connection port; and a second position that may be used to hold a connecting element positioned within the connection port in place. The locking clamp may be constrained in the second position by, for example, a screw, latch or other element, to maintain the locking member in place. Alternatively, the clamp may be oriented such that gravitational forces alone keep the locking member 7805 in place. Although not specifically illustrated in FIG. 7D-1, a sensor or switch element (such as a microswitch or a magnetic switch) may be used to detect when the locking clamp is in the second (or locked) position and/or when a connection element (such as 7080 as shown in FIG. 7D-2) is properly positioned within the port 7800. This may be accomplished, for example, through the use of a magnetic element positioned within the locking clamp or the connecting element.

Considering the discussion provided above in connection with FIGS. 2A-2C, it may be appreciated that the disclosed dispenser system may be configured to be placed in the product formation and dispense configuration or the self-cleaning configuration based on the positioning of the connecting element 7080. For example, when the connecting element 7080 is coupled to the dispense port of an ingredient bag, the dispenser will be in the product formation and dispense configuration as schematically shown in FIG. 2B. When the connecting element 7080 is coupled to the self-cleaning receiver port 7800, on the other hand, the dispensing system may be partially placed in the self-cleaning configuration as schematically reflected in FIG. 2C. To completely place the dispensing system into the self-cleaning configuration, a blocking member in the form of a blocking cap 4500 must be affixed to the dispense spout of the faceplate 3008. Such positioning of the blocking cap 4500 will—as described above—enable fluid to flow from the dispense portion of the faceplate into the bypass passage 3900 and, thus, enable the disclosed system to perform a self-cleaning operation as describe above.

As further reflected in FIG. 7D-1, the interior portion of the refrigeration cabinet defines a relatively flat floor section 7090 that extends from the front opening of the cabinet and (in the illustrated example, is sloped from back to front) in which is positioned a cleaner tank spout 9030. As discussed in more detail below, the cleaner tank spout 9030 and the self-cleaning receiving port 7800 may be involved in an exemplary self-cleaning operation. (Notably, in the described example, both the self-cleaning receiver port 7800 and the cleaner tank spout 9030 are positioned within the refrigeration cabinet, 2600 such that the refrigeration cabinet door 1020 must be opened to access the port and/or the spout 9030.)

In the illustrated example, the cleaner tank spout 9030 is used to permit the placement of a cleaning or sanitizing product into a cleaner tank structure (discussed in more detail below). The positioning of the cleaner tank spout 9030 (and the cleaner tank structure) physically below the ingredient storage trays 7020 minimizes the possibility that any cleaning sanitation products will find their way into the ingredient trays (or be mixed with any content in the trays).

Although not separately illustrated herein, embodiments of the described ingredient refrigeration cabinet 2600 are envisioned wherein the door to the cabinet is associated with a locking element that can be activated to lock the door and prevent access to the interior of the cabinet 2600 and/or lock out any dispensing of product within the freezing cylinder upon the detection of certain conditions warranting a lockout. For example, in certain embodiments the controller may receive an indication if the detected temperature within the refrigeration compartment is determined to be within an undesired range (e.g., above a certain temperature level) for an undesired period of time, and lock the system out (e.g., prevent the dispensing of product) if such a condition is detected. Additionally—or alternately—the lock-out system could monitor the frequency at which the product ingredient supply bags are changed out and lock the system out in the event that a bag is not changed within a determined period. Still further, the lockout system could monitor the frequency at which the self-cleaning feature of the system is activated (as discussed in more detail below) and lock the system out in the event that the system is not subjected to self-cleaning within an acceptable period of time since the last cleaning.

In embodiments that include a lock-out system the controller may be programmed to provide a visual indication that the system is locked out, an indication of the reason for the lock-out, and instructions on how the system can be reset and the lock-out condition removed.

In the exemplary embodiment of FIGS. 7A-7E, a substantial number of the system components that will come in contact with any food ingredients are positioned within the refrigerated compartment such that they are maintained at a controlled temperature level. Such components may include but are not limited to the ingredient supply elements; the connection element 7080 the pump 7300; the air check valve 7318; and the fluid connections between those components. One exemplary approach and arrangement for positioning such components within the refrigeration compartment is provided in FIG. 7E which shows a downward-looking view towards the bottom of the refrigeration compartment 2600 with the cover 7070 removed.

Figure 7E:
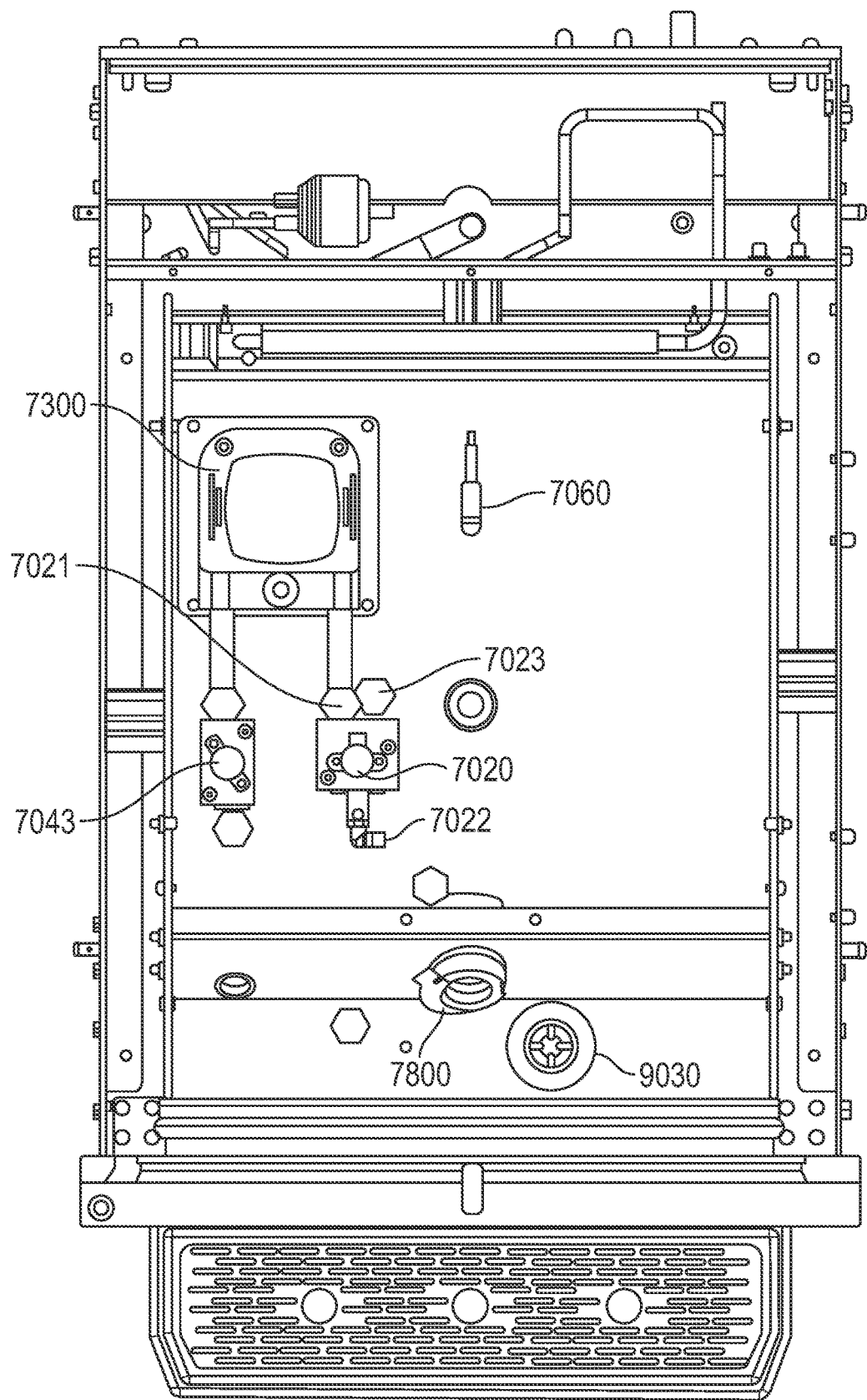
Figure 7F:
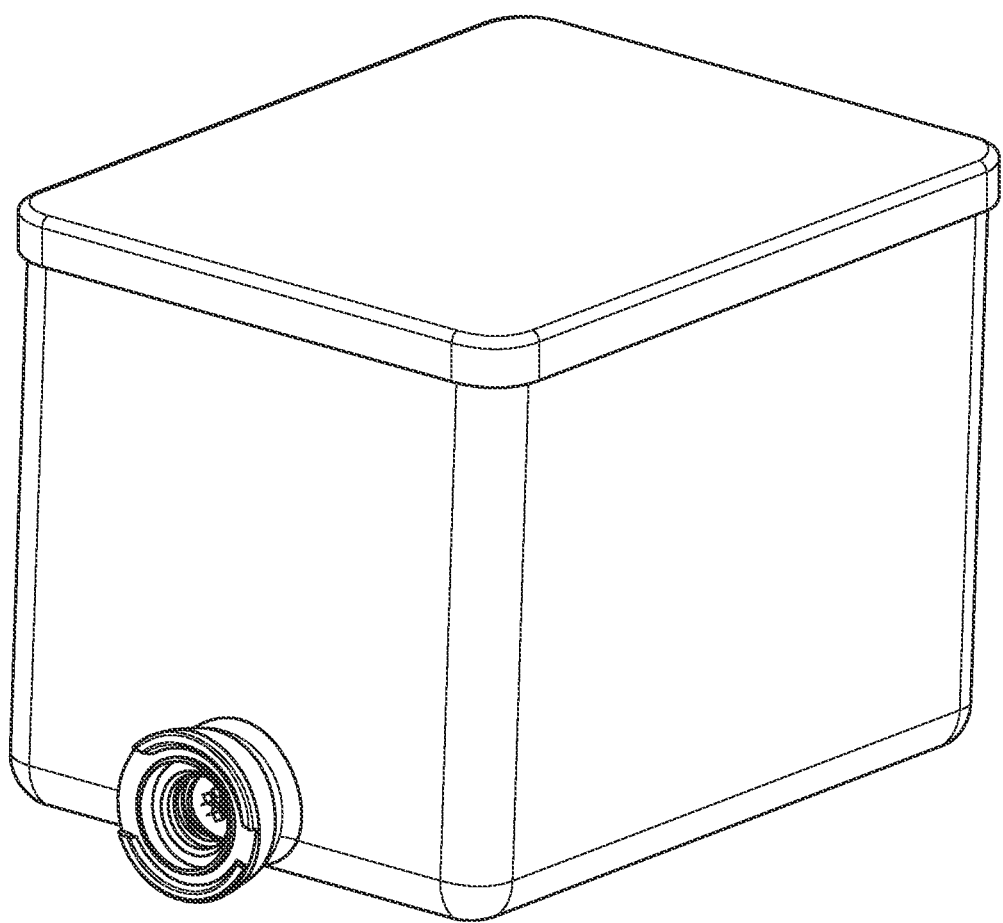

One of the benefits of the particular arrangement depicted in FIG. 7E is that the use of the pump cover 7070 within the refrigeration chamber 2600 may provide both a protective barrier to prevent any potentially spilled ingredient within the refrigeration compartment from directly contacting any of the described components and it provides a structure that may be easily removed to permit direct access to the described components for any required maintenance.

As reflected FIG. 7E, the pump 7300 may be positioned on the floor of the refrigeration cabinet 7600 and may be configured such that its input is fluidly connected to a hose element coupled to the connecting element 7080 (not shown in FIG. 7E). In such an arrangement, operation of the pump will pump fluid through the connecting element 7080 into the system. When the connecting element 7080 is coupled to an ingredient supply element, the pumped fluid will be the ingredient. When the connecting element is coupled to the self-cleaning port 7800, the pumped fluid may be comprised of water, a mixture of water and cleaning and/or sanitizing fluid, or only cleaning and/or sanitizing fluid. The pump may take any suitable form and, in one embodiment may take the form of a positive displacement driven pump, such as a rotary peristaltic pump. Such a pump may be driven by an electrically actuated motor (not visible in the provided figures).

As described above, in the disclosed system the output from the pump 7300 (which will typically be a fluid output) is combined with pressurized gas such as air or another pressurized gas, which may be provided through activation of the gas control valve 2016 (discussed above in connection with FIGS. 2A-2C).

The combining of a fluid output from the pump 7300 and the pressurized gas may be accomplished in various ways. In the example of FIG. 7E, the combination of fluid from the pump 7300 and pressurized gas is accomplished through the use of a novel pressure block assembly 7020 that defines a first input 7021 for receiving the fluid output from the peristaltic pump, a second input 7022 for receiving a pressurized gas (which may be received from the output of the gas control valve 7016, discussed above in connection with FIGS. 2A-2C) and an output 7023 from which will typically flow a solution comprising a mixture of the fluid from the pump 7300 and the pressurized gas from the (or one of a plurality) gas source to provide a gas/ingredient mixture that will be provided to the freezing cylinder.

In certain embodiments a pressure transducer (not labeled in FIG. 7E) may be used to provide the pressure at the output of the pressure block assembly 7020.

In the example of FIG. 7, a temperature measuring thermistor 7060 is also positioned below the pump cover to provide an indication of the temperature within the refrigeration compartment.

FIGS. 8A-8E-2 illustrate details of exemplary embodiments of a pressure block assembly 8020 that may be used as the pressure block assembly 7020 of FIG. 7E.

FIG. 8A provides a partial isometric view of the exemplary pressure block assembly 8020. As depicted in the figure, the exemplary assembly includes a main block element 8060 which may take the form of a block of suitable material (e.g., metal, or a plastic or resin component, or a composite) in which are formed the openings, passages and features required for proper operation of the block. Positioned within the exemplary block in the exemplary embodiment is a fluid input connection barb assembly 8021 for receiving the fluid output from the pump 7300. The fluid input connection barb assembly 8021 may include: (a) a check-valve, for ensuring that there is no back-flow from the assembly 8020 into the pump 7300, and suitable O-ring elements (and receiving features) to ensure a proper seal between the fluid input connection barb assembly 8021 and the main block element 8060.

An output connection barb assembly 8023 is also provided in the example of FIG. 8A for providing an output connection from the assembly 8020. In the illustrated example, no check valve is illustrated or necessarily required for the output connection barb assembly 8023.

In the example under discussion, a gas input assembly 8022 is provided that includes a check-valve (discussed in more detail below) for receiving pressurized gas.

A pressure transducer 8062 is coupled to the body 8060 to detect the pressure within the body at a point where the fluid received at the fluid input has been mixed with the gas received at the gas input. This pressure measurement may be provided to a controller and may be monitored to provide information concerning the operation of the system. For example, during a period when the dispenser is operating in a product formation and dispensing configuration, the pressure signal from the pressure transducer 8062 may be monitored to determine whether a product ingredient supply element is empty (as a low-pressure condition would be associated with an empty supply element). Additionally, or alternatively, the presence of an unexpectedly low pressure could indicate that certain connections necessary for proper system operation (e.g., a connection of the system input connector 2610 to the self-cleanings port 2800) were not appropriately made or have come loose.

Still further, because the junction at point 8063 is fluidly coupled to the interior of the freezing cylinder 2500, the pressure detected at the junction 8063 by transducer 8062 may be used to infer the pressure within the freezing cylinder 2500. As discussed elsewhere herein, this detected pressure may then be used to determine whether activation of a cylinder vent relief assembly is necessary to drop the pressure within the cylinder 2500.

FIG. 8B provides a cross-section view of the example of FIG. 8A with the section taken along a plane passing roughly at the midpoint between the top of the assembly (where the top of the pressure transducer 8062 is located) and the bottom of the assembly.

As reflected in FIG. 8B, the block 8060 defines a first opening that receives the fluid input assembly 8021 that is fluidly coupled to a first passageway that feeds to a central space (i.e., a junction point or passage) 8063. The block 8060 further defines a second receiving opening for receiving the gas input assembly 8022 that is fluidly coupled to a second passageway that is also fluidly coupled to central space 8063. The block further defines a third receiving opening for receiving the output assembly 8023 and a third passageway that couples the central space 8063 to the output assembly 8023. As will be apparent from FIG. 8B, during operation, fluid may be pumped into the block assembly 8060 by the pump 7300 into the central space 8063 where it may be mixed with gas from the pressurized gas supply, and the mixed gas-fluid mixture may be forced through pressure produced by the pump 7300, gas pressure and/or a combination of both, out of the output assembly 8023 and (although not illustrated in the figures under discussion) into the freezing cylinder of the system.

For purposes of ensuring proper operation and self-cleaning, the gas input assembly 8022 of the illustrated embodiment has a configuration that promotes cleaning efficiency. Details of this design are reflected in FIGS. 8C and 8D.

Referring to FIGS. 8C and 8D, it may be seen that the air input assembly 8022 includes a gas fitting elbow 8064, coupled to a main air check body 8065. A sealing compression ring 8066 is positioned external to the main air check body 8065. A portion of an air check poppet 8067 passes through an opening in the air check body 8065 and a poppet sealing O-ring 8068 is positioned around an external portion of the poppet 8067. A spring element 8069 is positioned within the main body 8065 and serves to bias the air check poppet 8069 in a closed position against the main body 8065.

As these images show, the portion of the air input assembly 8022 that is exposed to the inner space 8063 where the input fluid and the input gas mix is both limited and of a relatively simple geometry in that it comprises the upper flat surface of the housing 8065, the poppet sealing 8068, and a small portion of the poppet 8067. As these figures also show the exposed portions are of a relatively simple geometry with no hidden pockets where material could be retained. Because of this configuration, when cleaning and/or sanitizing solution is pumped through the system as part of a self-cleaning operation, all components of the air check valve that come into contact with food product and/or ingredients used to form food product will be adequately cleaned and sanitized.

In the example of FIG. 8A-8D, the compression ring 8066 takes the form of a flat gasket washer. The use of a flat gasket washer helps prevent crevices that could be difficult to clean and further ensures a strong seal that will prevent any backflow.

In the examples of FIG. 8A-8D (and other examples set forth herein in which separate O-rings or compression structures are described) it should be understood that any separate structures could be formed through an over-molding process as elements integral with the elements to which the O-rings are attached. In addition to promoting the effectiveness of cleaning and sanitizing operations, the configuration of the block assembly 8020 provides for a single component that may be readily replaced should any aspects of the overall assembly fail or require replacement for any other reason.

It should be appreciated that the embodiment of FIGS. 8A-8D are exemplary only and that other forms of components and, in particular, air-check valves may be used without departing from the teachings of this disclosure. For example, FIGS. 8E-1 and 8E-2 depict an alternate embodiment of an alternative air input assembly 8522 that may be used in connection with an embodiment like that described in FIGS. 8A-8D where it is positioned in a block that also receives a fluid input, or in connection with a stand-alone application, where the pressurized gas is injected into a line feeding the freezing cylinder through an independent connection (e.g., one that does not involve a common block).

As reflected in FIGS. 8E-1 and 8E-2, the alternate air input assembly 8522 includes an elbow connection 8564, a main body 8565, and air check poppet 8567. A spring element 8569 is provided to bias the air check poppet in a closed position. In the illustrated example, the air check poppet 8567 defines a main central passageway through its interior that is fluidly coupled to the gas inlet from the elbow connection 8564 and one or more passageways that permit the passage of gas from the main central passage to the exterior of the poppet 8567. As shown in the figure, a portion of the poppet 8567 passes outside of the main body 8565, and an O-ring 8572 is attached to the poppet 8567 external to the main air body. In the example of FIGS. 8E-1 and 8E-2, the main valve body 8565 defines a recess in which the O-ring 8572 may be received.

FIG. 8E-1 illustrates alternative air-check valve assembly 8522 in a closed position. As will be seen in this example, the O-ring 8572 seals against the main valve body 8565 and the pressure from the spring element 8569 within the main valve body tends to maintain the air check assembly in the closed position.

FIG. 8E-2 illustrates the alternative air check valve when pressurized gas is provided at the input of the elbow connection 8565 the pressurized gas acting on the surface of the poppet 8567 overcomes the force of the spring element and drives the valve open.

In the example of FIGS. 8E-1 and 8E-2, the entirety of the air check valve assembly 8564 may be held in place through a variety of different approaches suitable for holding the assembly 8564 securely in place and energizing the seal 8066. For example, in one embodiment, a press-fit sealing arrangement may be used in which the air-check assembly 8522 is positioned within a recess defined by the block and in which the air-check assembly is held in place by virtue of the compressive forces provided by a sealing O-ring 8580. Alternative approaches are envisioned in which mechanical fastening approaches—such as an approach using screws and/or a snap ring—are used to maintain the appropriate forces on the seal 8066 and maintain the proper positioning of the entirety of the air check valve assembly 8564. A benefit of the approaches discussed above is that they allow for easy and rapid removal and replacement of the air-check valve. In applications of the present dispensing system where extreme sanitary conditions must be maintained (e.g., in a health treatment environment) the alternative air check assembly 8564 of FIGS. 8E-1 and 8E-2 may be easily removed and replaced at each cleaning cycle for the dispensing assembly or on an alternate schedule (e.g., every fifth cleaning cycle, every other month, or upon a change in the provided product or the anticipated consumer for the dispensed product).

As will be appreciated from those having the benefit of this disclosure, through the use of the pressure block assembly 8020, and/or the controllable vent relief assembly 6000, the exemplary disclosure discussed herein allows for dynamic control of the pressure within the freezing cylinder 2500. The ability to control the pressure within the cylinder 2500 enables the disclosed dispenser to process a wide variety of ingredients and food products. Moreover, because of the unique nature of the pressure block assembly 8020 and the vent relief valve positioned within the faceplate, the disclosed dispenser allows adjustment of the cylinder pressure through the injection of pressurized gas alone into the cylinder (through operation of the gas supply valve 2016), through the injection of fluid alone (through operation of the pump 7300); and through injection of a gas/fluid mix. The ability to dynamically, and in a controlled manner, inject pressurized gas alone into the freezing cylinder (without any fluid product) or to inject fluid alone (without any intermixed gas) greatly expands the operating characteristics of the disclosed dispenser.

In addition, the disclosed dispenser is capable of generating a suitable product upon a "first freeze" of the product. This can be done through a multi-step process wherein, in a first step, the system initially fills the freezing cylinder with liquid ingredient only (e.g., through activation of the pump 7300 during conditions where no gas is mixed into the pumped ingredient) while at the same time operating the vent relief assembly 6000 to avoid a pressure buildup in the cylinder and, at the same, time NOT operating the auger (such that no gas is mixed into the liquid in the cylinder during this initial filing step). This first step can be terminated once it has been determined or inferred that a desired amount of liquid ingredient has been pumped into the cylinder. Once this initial fill is done the system can proceed to a second step, wherein pressurized gas (or air) is injected into the system until the cylinder pressure reaches a desired level. In a third step (which can begin after, during, or co-incident with the second step) the auger can be activated to begin processing the material in the cylinder. The result of the described first freeze process is a product that will tend to have the same quality and consistency as product typically formed after a dispenser has been operating for an appreciable amount of time. As will be appreciated by those having the benefit of this disclosure alternative methods and sequences of control can be executed to achieve benefits enabled by the use of non-air gasses. For example, if non-air gasses are used, the sequence could include a first step in which the freezing cylinder and all or some of the passages within the system are filled with the non-air gas while the vent is open to displace all "air" from the system. In such an embodiment, the system can be substantially or entirely purged of all "air" such that only the desired non-air gas is used for product creation or dispensing.

As described above in connection with FIG. 2A, during the self-cleaning operation, operation of the pump 7300 may be used to pull cleaning and/or sanitizing solution from a cleaner supply element 2820.

The cleaner supply element 2820 may take many different forms including a replaceable cartridge element containing a cleaning and/or sanitizing solution, a bag of cleaning and/or sanitizing solution and/or a storage tank in which cleaning and/or sanitizing solution may be added. The cleaning and/or sanitizing material provided to cleaner supply element 2820 may take any suitable form, and may be, a liquid cleaner similar to the type used for cleaning dairy milking and bottling equipment.

In the exemplary embodiment discussed above, the cleaner supply element 2820 may take the form of a tank coupled to a cleaner-receiving spout. Examples of such a cleaner supply element 2820 are depicted in FIGS. 9A-9D.

Figure 9A:
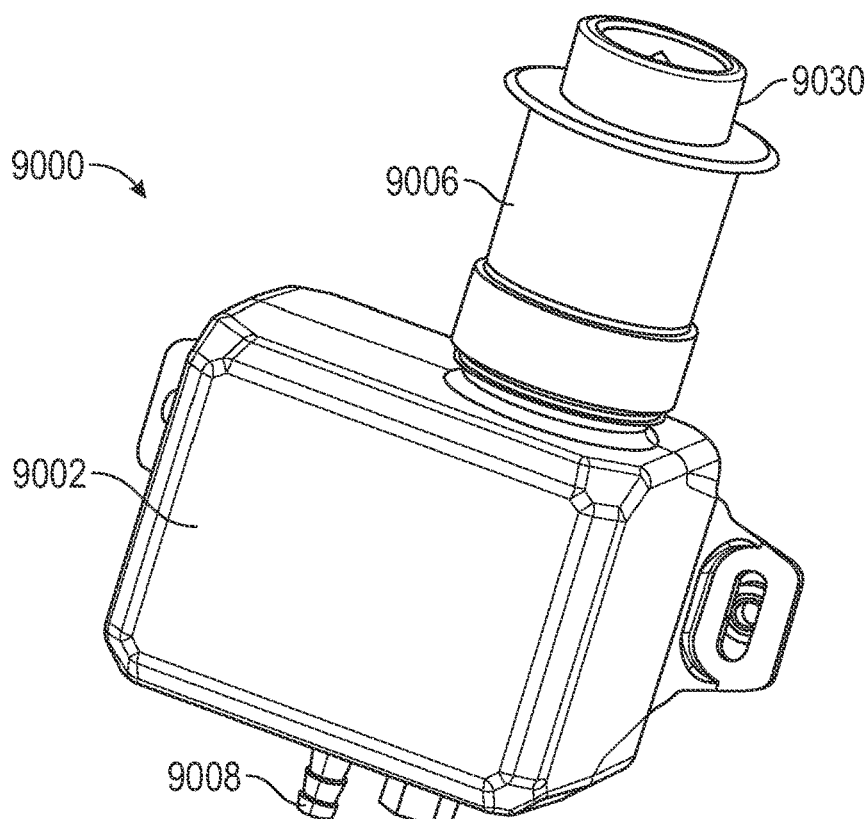
FIGS. 9A-9D illustrate an exemplary cleaner supply element as used in connection with the exemplary disclosed system.

FIG. 9A provides a partially orthogonal view of an exemplary cleaner supply element 9000 that includes a storage tank 9002, a piercing receiving spout 9030, and a sleeve element 9006. As reflected in FIG. 9A, the tank defines an outlet element 9008 that may feed via a hose to a manifold that houses the cleaner solenoid 2818 (discussed above in connection with FIG. 2A). Such a coupling of the cleaning agent storage tank 9002 and a separate cleaning agent solenoid 2818 provides flexibility in the positioning of the tank 8002 and the solenoid 2818 since they can be positioned independent of each other.

Figure 9B:
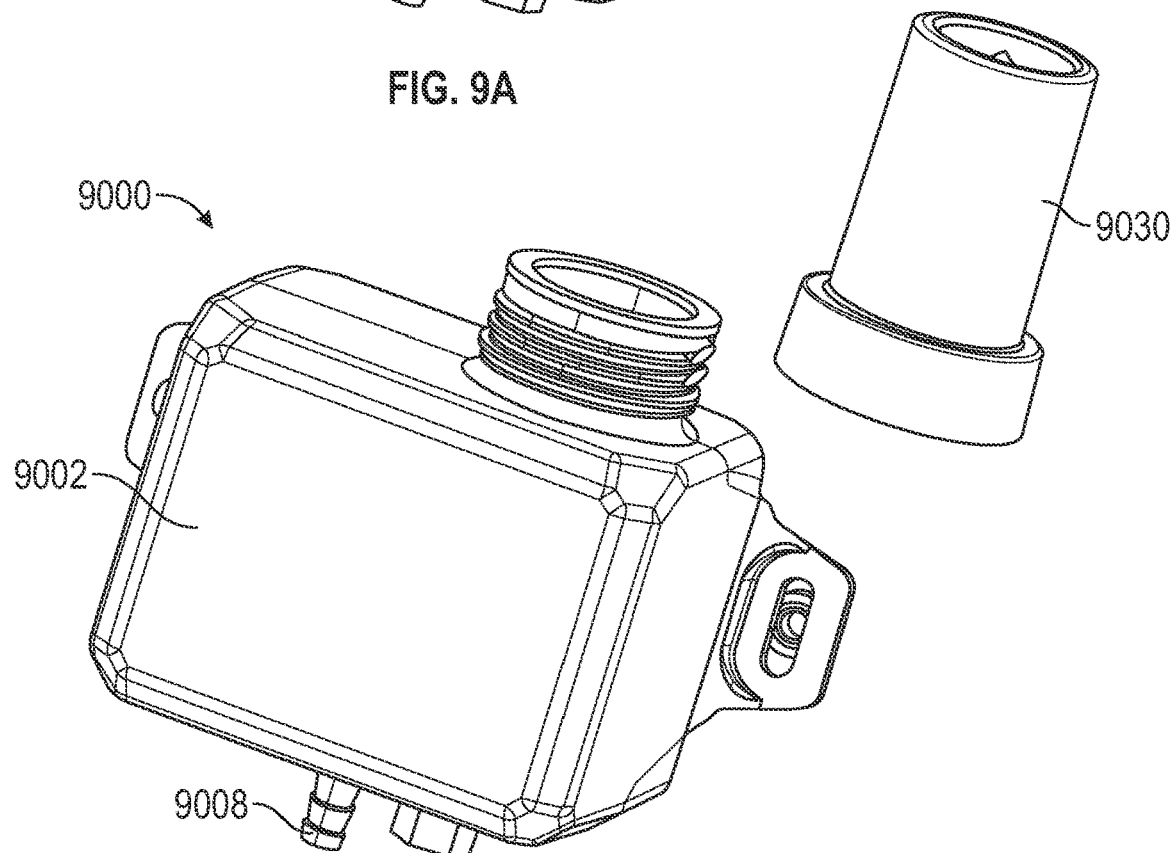

FIG. 9B illustrates an alternate version of the structure shown in FIG. 9A with the sleeve element 9006 hidden and the piercing receiving spout 9030 separated from the storage tank 9002.

In operation of a system utilizing the cleaner supply element 9000 described above, a source of cleaning and/or sanitizing material (such as a container with a foil lid structure) may be aligned with the cleaner supply element 9000 such that the foil lid of the container is aligned with the piercing/receiving spout 9030. The foil lid may then be compressed against the piercing/receiving spout 9030, such that the spout pierces the foil lid, thus allowing the cleaning and/or sanitizing material to flow from the supply into the tank 9002. Once in the tank 9002, the cleaning and/or sanitizing materials are available for use in a self-cleaning operation as described above. The cleaning and/or sanitizing material may take the form of a liquid material, a solid material (in granular, pellet or other form), or a mixed liquid/solid material.

The cleaner supply element of FIGS. 9A and 9B is exemplary. Alternate embodiments are envisioned, including embodiments that include a cap structure and/or a float switch positioned within the tank 9002 to confirm the presence of a suitable amount of cleaning agent prior to the initiation of a self-cleaning operation. One such embodiment is depicted in FIG. 9C.

Figure 9C:
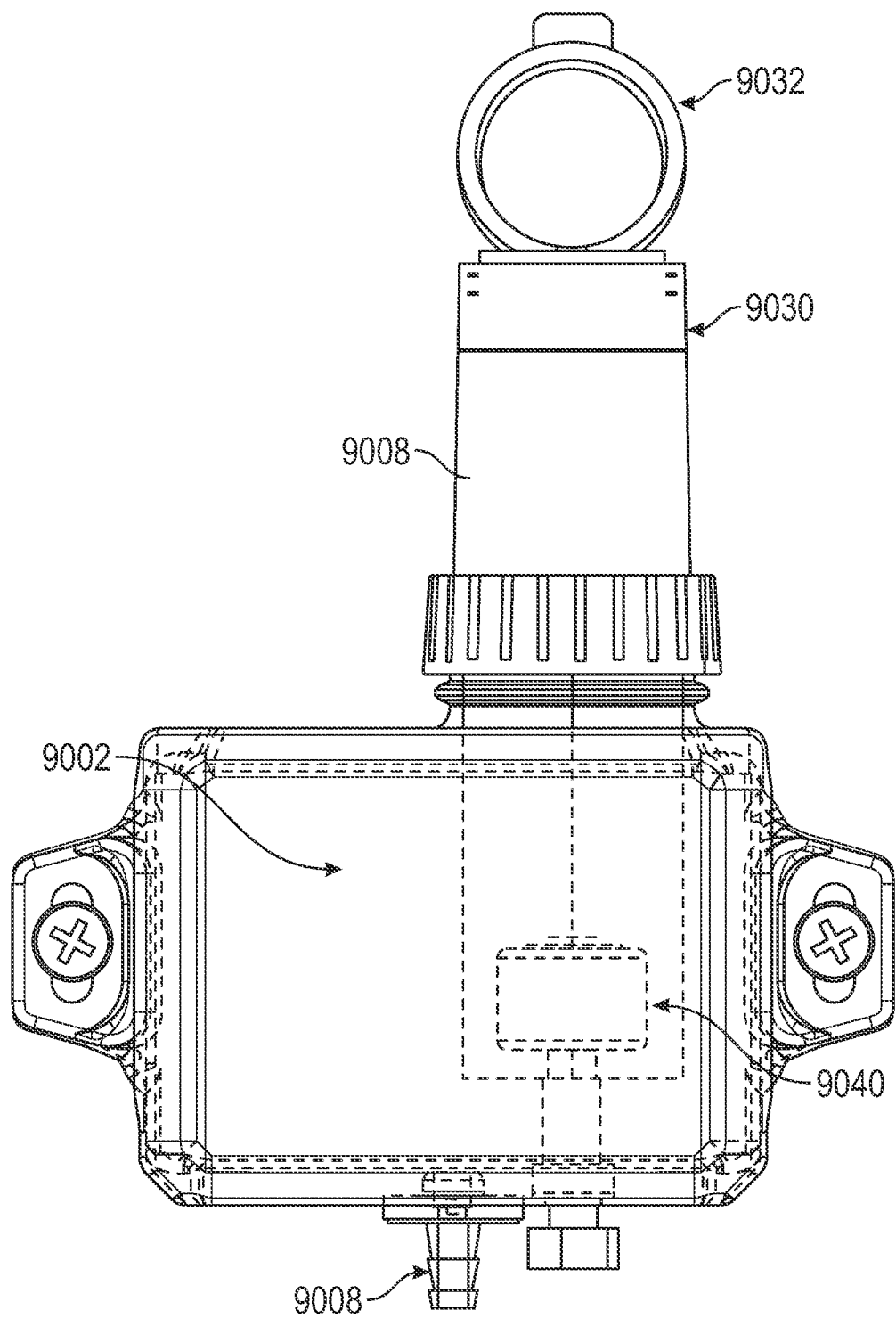

The embodiment of FIG. 9C is generally similar to the embodiment of FIGS. 9A and 9B with the primary differences being the inclusion of a flip-off cap 9032 and a float switch 9040. The float switch 9040 may be coupled to a system controller to provide an indication of whether a sufficient amount of cleaning agent is detected within the reservoir 9002. The output from the float switch 9040 may also be used to verify that the cleaning agent is being pumped out of the reservoir 9002 during a self-cleaning operation.

In the exemplary embodiments of FIGS. 9A-9C, the cross-section of the storage tank 9002 may be generally rectangular and the tank 9002 is coupled to the cleaning agent solenoid 2818 through a hose connection. Alternative embodiments are envisioned wherein the structure for storage of the cleaning agent has a generally circular cross-section and/or where the cleaning agent solenoid valve 2818 is formed in an integrated manner with the cleaning agent storage reservoir. One such alternative structure is generally depicted in FIG. 9D.

Figure 9D:
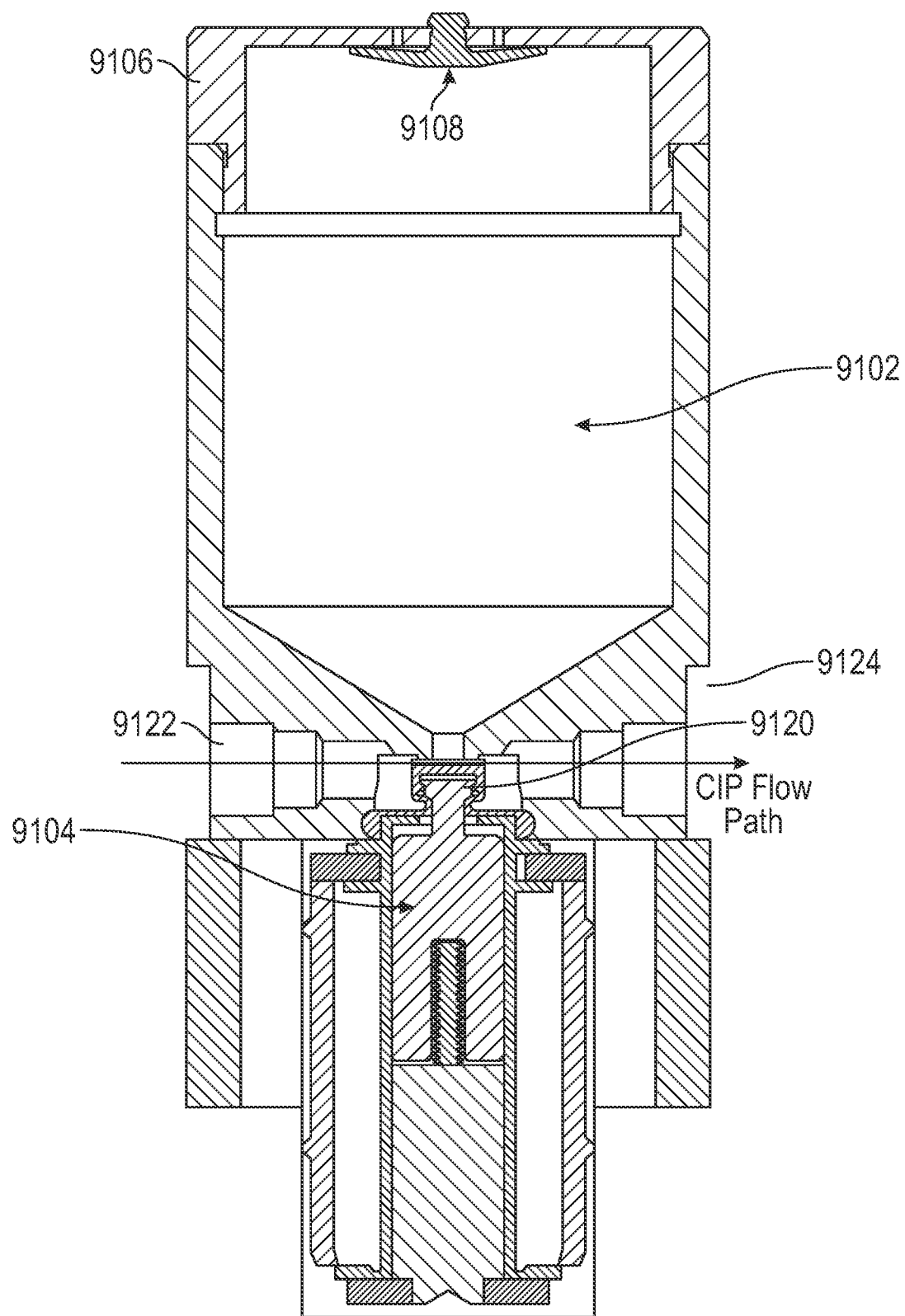

Referring to FIG. 9D a generally cylindrical reservoir element 9102 is provided that defines a relatively cylindrical storage space that has an open upper portion and a sloped lower portion. The sloped low section feeds into a junction area 9120 that is coupled to receive fluid passing from a fluid inlet 9122 to a fluid outlet 9124. A plunger element from a solenoid valve 9104 (that may be used as the cleaner solenoid 2818 in FIG. 2C) is provided that, in its normal un-activated position, extends into the junction area 9120 and prevents the flow of solution from the reservoir or from the fluid inlet to the fluid outlet. Activation of the solenoid valve, however, will cause the plunger element of solenoid 9104 to move to an open position such that solution from the reservoir may flow into the junction area and fluid may flow from the fluid inlet to the junction area where it may be mixed with cleaning agent, and the fluid/cleaning agent mix may flow out of the fluid outlet.

In the illustrated example, a cap-structure 9106 with a check-valve element 9108 is also provided that may be removed (e.g., by unscrewing and removing it) to permit the introduction of cleaning agent into the reservoir and that may be positioned (e.g., by screwing) to close out the reservoir during other operating intervals. The check-valve element 8108 will allow air to be sucked into the interior tank reservoir 9102, thus facilitating evacuation of the cleaning agent solution from the tank.

The general operation of the cleaning supply elements discussed above will hereafter be described. At an appropriate time, an operator of the system can place cleaning agent material into the cleaning agent reservoir by, for example tearing open a pouch of cleaner or by using the piercing-receiving element to pierce the lid of a cleaning agent container. At a later time, the cleaner solenoid valve 2818 may be activated to enable fluid connection between the tank and the remainder of the self-cleaning system. Under such conditions, activation of the pump 7300 which is "downstream" of the tank, will create a partial vacuum that will tend to pull the cleaning agent solution from the tank into the remainder of the self-cleaning system. It should be noted that in embodiments where the cleaning agent reservoir is not sealed from the exterior atmosphere (e.g., by a screw-on cap with a check-valve) it will be desirable to turn on the pump 7300 before the cleaning agent solenoid 2818 is activated to ensure that a negative pressure exists within the storage reservoir at the time the solenoid 2818 is opened. In other words, the operation of the pump creates a pressure differential between across the fluid in the tank (e.g., a differential between atmospheric pressure operating against one surface of the cleaning fluid and the relative vacuum created by the pump operating against the other surface). Otherwise, there is the potential that positive pressure at the output of the storage reservoir could cause some backfill. In certain embodiments additional control schema may be implanted to provide for a controlled backfill of the reservoir to provide a rinsing function for the cleaner supply tank. During such an operation, the tank would first be partially or completely drained as described above. Then—with the drain valve 2816 closed, the pump 2300 OFF, and the dispense valve in the OFF position—the water fill valve 2808 may be opened resulting on the backfilling of the tank with water. Under such circumstances, the float switch 9040 can be used to sense the fluid level within the tank. Once the desired state change has been detected, the water fill valve 2808 can be turned off and the tank drained as described previously. This tank cleaning operation can be repeated as necessary and may be implanted in such a manner that the tank cleaning operation is implemented is performed each time a system self-cleaning operation is performed, once per a given number of system self-cleaning operations (e.g., every third system self-cleaning operation), or upon request by a user.

The use of a cleaner reservoir or tank as illustrated above with packages or small containers of an amount of cleaning agent sufficient for a single self-cleaning operation is exemplary. Alternate embodiments are envisioned wherein the cleaning agent is supplied in a large bag-in-box container that contains sufficient cleaning agent for multiple self-cleaning operating cycles. Still further embodiments are envisioned wherein the cleaning agent is provided through means of a small, single use, flexible pouch with a rigid connector. In such an embodiment, the user of the system could connect the rigid connector to a receiving port provided by the self-cleaning system and the system could then evacuate the contents of the pouch in a manner similar to that described above in connection with the evacuation of tank. The use of a bag-in-box container, or a flexible pouch container, are potentially beneficial in that they tend to minimize the potential for an operator spilling or coming into contact with the cleaning agent. Moreover, such embodiments may utilize flexible packaging for the cleaning agent, and vents or check valves (for sucking air) may not be required for efficient evacuation of the cleaning agent from the provided packaging.

Of note, the piercing receiving spout 9030 described in connection with FIGS. 9A and 9B may be positioned such that it extends into the refrigeration cabinet 2600 (as generally depicted in FIG. 7D-1 above). In such embodiments, the preparatory steps to the initiation of a self-cleaning operation may involve opening the refrigeration door, and then—in no specific order—(a) moving the connecting element from one configuration where it is coupled to an ingredient bag port to an orientation where it is coupled to the self-cleaning connection port and (b) placing cleaning and/or sanitizing materials into the tank.

Figure 10A:
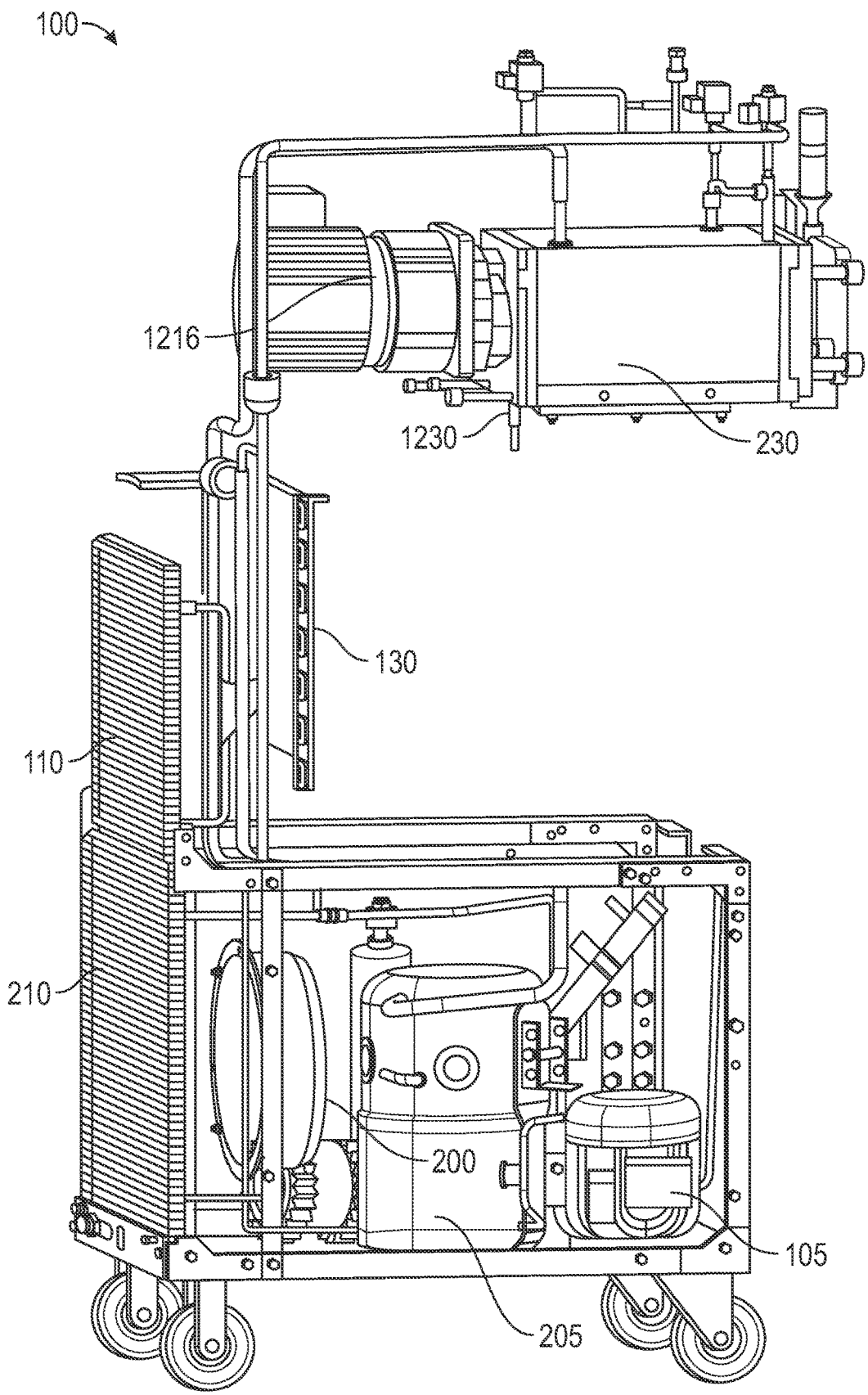
FIGS. 10A-10D illustrate views of exemplary components used within refrigeration system of the exemplary disclosed system.
Figure 10B:
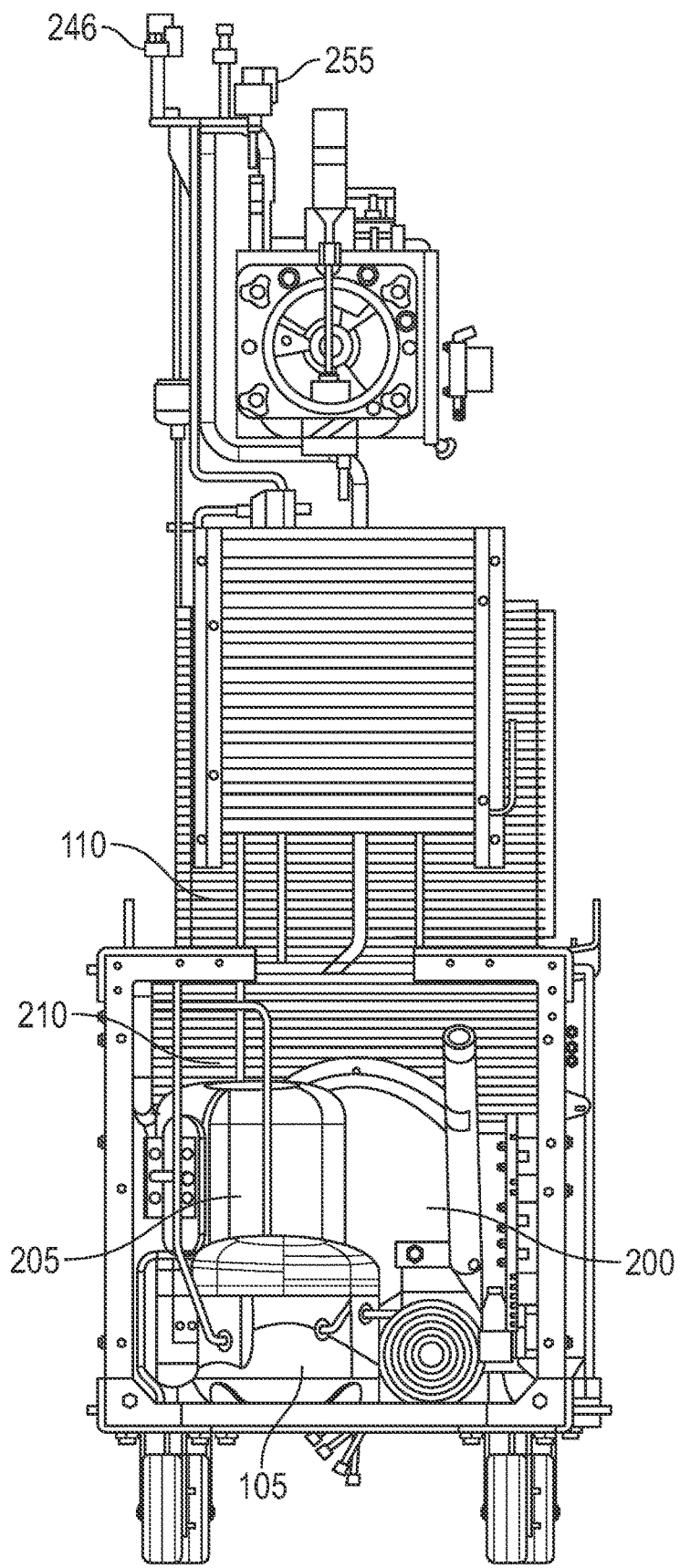
Figure 10C:
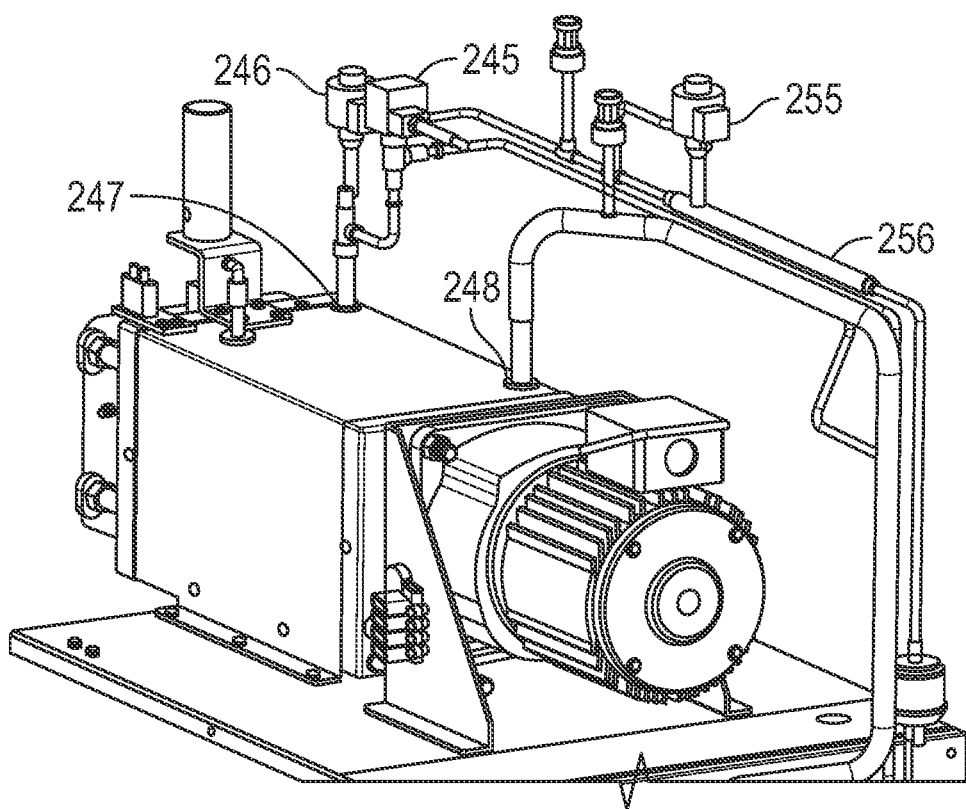

As the above discussion reveals, the disclosed system includes two components that are actively refrigerated, specifically the refrigerated ingredient storage compartment 2600 and the freezing cylinder 2500. FIGS. 10A-10C illustrate aspects of exemplary refrigeration sub-system for performing these functions.

Referring to FIG. 10A, select components in exemplary refrigeration sub-system 100 for use within the overall system are shown. The refrigeration sub-system 100 depicted in FIG. 10A. performs at least two distinct cooling/refrigeration/freezing functions. First, the refrigeration sub-system 100 operates to maintain the temperature within the refrigerated ingredient storage compartment 2600 within a desired range. Second, the refrigeration sub-system 100 operates to control the temperature within the freezing cylinder 2500 to provide a dispensable food product having certain desired properties.

As reflected in FIG. 10A, the illustrated exemplary refrigeration sub-system comprises a first compressor 205 and a second compressor 105. In the illustrated example, the compressors may be of differing sizes with the second compressor 205 having a larger capacity than the first compressor 105. The first compressor 105 may be fluidly coupled to a first condenser 110 and the second compressor 205 is fluidly coupled to a second condenser 210. In the example of FIG. 10A, the second condenser 210 is larger than the first condenser 110 and, the first condenser 110 is physically positioned above the second condenser 210.

In the illustrated example, the first condenser 110 may be fluidly coupled to an evaporator 130 that may comprise the evaporator positioned within the refrigerated ingredient storage cabinet 2600, discussed above. In the example of FIG. 10A, the evaporator 130 takes the form of a wall-line structure through which the fluid/gas carrying portions of the evaporator snake through in a generally serpentine pattern.

In the example, the second condenser 210 is fluidly coupled to an evaporator 230 that is positioned within the cold pack assembly containing the product freezing cylinder 2500 and positioned to cool the freezing cylinder. In the example of FIG. 10A, the second evaporator includes a fluid/gas path that generally surrounds and encircles the freezing cylinder.

As reflected in FIG. 10A, a single condenser fan 200 is provided that, when activated, causes air to flow across both the first condenser 110 and the second condenser 210.

Although not depicted in FIG. 10A, the illustrated exemplary refrigeration sub-system also includes a controller that receives various input signals from sensors within the dispensing system and that provides various output control signals to control various components of the dispenser, including components of the refrigeration system of FIG. 10A. For purposes of the present discussion, the exemplary input signals to the controller may include but are not limited to a signal reflective of the temperature within the product storage refrigeration cabinet 2600, and/or signals reflective of conditions within the freezing cylinder 2500. For purpose of the present discussion, the output control signals provided by the controller include at least signals to control the operation of the compressor 105, the compressor 205, and the common condenser fan 200.

The general operation of the illustrated refrigeration system components associated with controlling the temperature within the ingredient refrigeration cabinet 2600 will be discussed first.

In the illustrated embodiment of FIG. 10A, the controller receives the signal reflective of the temperature within the ingredient storage cabinet 2600. In the example, the controller is set at (or provided with) a desired setpoint temperature (or range of temperatures) for the product storage refrigeration cabinet. For example, a desired range of 33° F. on the low end and 38° F. on the high end could be programmed into the controller and/or selected by a user or system operator during system configuration. If the controller determines that the temperature within the cabinet has exceeded the upper range setting (or has exceeded a single setpoint by a given amount) the controller may activate the compressor 105. Alternatively, if the controller determines that the temperature within the cabinet is below the lower range setting (or below a single setpoint by a given amount) it may then either turn off the compressor 105 or maintain the compressor in an off state if it is not operating.

In certain embodiments, the controller may also be configured to operate the condenser fan 200 in conjunction with the activation of the first compressor 105 and to de-activate the condenser fan 200 whenever the compressor 105 is not operating. In other embodiments, in response to the reception of signals warranting activation of the compressor 105, the controller may be configured to first activate the condenser fan 200 for a given delay period of time (e.g., 5-10 seconds) if it is not already activated, and then, after expiration of the delay period, activate the compressor 105. (Note that there may be no need to delay activating the first compressor if the condenser fan is already running at the time the controller receives signals warranting activating of the compressor). In still other embodiments, the controller may operate the condenser fan based on other parameters.

The controller may further be configured to deactivate the condenser fan 200 once the conditions warranting activating the associated compressor are no longer present, and in the absence of other signals warranting continued operation of the fan (e.g., continued operation of the freezing chamber compressor).

In addition to the above situations, the controller within the exemplary system under discussion may be configured to operate the condenser fan 200 under additional conditions unrelated to the operational state of the compressor 105 (or the compressor 205). For example, because exposure of any compressor to high heat may tend to reduce the useful life of the compressor, embodiments of the illustrated system are envisioned wherein the controller receives a signal from a temperature sensor within the interior space within which the compressor 105 (and potentially the compressor 205) is/are located and runs the condenser fan 200 to cool this interior space should the detected temperature within the space rise above a certain level. The compressor or compressors may also be run together or individually to maintain conditions within a pre-established range for a given period of time.

To avoid running the compressor 105 during conditions where the condenser fan 200 has failed (a condition that could damage the compressor) the controller may further be configured to receive a signal confirming proper operation of the fan 200. For example, a tachometer could be coupled to the condenser fan 200 that would generate an output above a certain level if the fan was operating properly. Alternatively, the controller may receive an indication of the fan current such that the presence of fan current above a certain level would indicate proper fan operation. Still further indications known to those skilled in the art may be used to detect proper fan operation. In any of the preceding examples, the controller may be configured to deactivate the compressor 105 (or any operating compressor) in the absence of proper fan operation. If these conditions are met, the system controller may be further configured to take further actions that may result in continued operation of the system, albeit at a reduced capacity, or to deactivate the system. The system controller may also be configured to alert an operator to these abnormal conditions.

In the example of FIG. 10A, the condenser fan 200 may be a single speed fan that is either activated or deactivated. Alternative embodiments are envisioned where the fan 200 may be a variable or multi-speed fan that can be operated at different speeds based on different operating conditions. For example, in embodiments (discussed in more detail below) in which the condenser fan 200 is operated when either the compressor 105 or a the compressor 205 is to be activated, the controller may be configured to control the fan 200 to operate at one speed when one of the compressors is activated (e.g., only compressor 105), another speed when only the other of the compressor (e.g., compressor 205) is activated, and yet at another speed if both compressors are activated at the same time. It should be appreciated that the concept of a variable/multi-speed fan may be implemented either through a fan that includes a fan motor designed to operate at multiple speeds (e.g., a motor with different input power taps) or a fan motor that may be operated at variable speeds based on the level of the current and/or voltage and/or the frequency or duration of voltage pulses applied to the fan motor.

In the exemplary embodiment of FIG. 10A, a fixed baffle may be used to control and direct airflow caused by operation of the common condenser fan 200 across both the first 110 and the second condenser 210. Alternate embodiments are envisioned wherein an adjustable baffle may be used to control what portion of the airflow generated by the common condenser fan flows across the first condenser and what percentage flows across the second condenser. In such embodiments, the controller may be configured to adjust the positioning of the adjustable baffle based on a variety of inputs and conditions, such as, but not limited to: whether one or both condensers are operating; the relative prioritization of cooling the refrigeration cabinet interior versus freezing the interior of the freezing cylinder; or any other suitable control strategies that may be envisioned by those in receipt of the disclosures contained herein. It will be appreciated that control of such a dynamic baffle may adjust, and may be used to control or partially control, the head pressure (or discharge pressure) from the first and/or the secondary compressors.

At a high level, the operation of the exemplary refrigeration system 100 of FIG. to control the temperature within the product freezing cylinder 2500 may be accomplished through an operation where compressed refrigerant is provided from the second compressor 205 to a refrigerant fluid input feeding the evaporator encircling the freezing cylinder 2500, circulation of the compressed refrigerant about, and evaporation of the refrigerant within the evaporator 230 associated with the freezing cylinder 2500, and discharging the evaporated refrigerant from a refrigerant outlet.

Considering FIG. 10A in combination with FIG. 10B additional details of the described embodiment may be understood. As reflected in these figures, in the exemplary embodiment of FIGS. 10A and 10B, the first and second compressors 105 and 205 are both positioned at the bottom of the described dispenser and within the lower one-third of the cabinet structure supporting the dispenser. As shown more clearly in FIG. 10B, which provides a front view of the exemplary system (with various components hidden) substantially all of the first and the second compressors 105 and 205 are located on the same side of the dispenser with respect to a vertical plane passing through the mid-point of the top of the dispenser and extending from the front of the dispenser to the rear of the dispenser. In this example, it will also be noted that various components associated with the freezing cylinder 2500 refrigeration system, such as the main expansion valve 246, an optional gas-bypass valve 245, and an optional liquid injection or second expansion valve 255, are all located on the same side of the compressor (with reference to the plane discussed above) as the compressors 105 and 205.

As further shown in FIGS. 10A and 10B, the first and second condensers 110 and 210 may be of differing size and may be arranged such that the first condenser 110 is positioned substantially in the middle ⅓ of the rear panel (and within the area associated with the rear panel horizontal vents) and the second condenser 210 may be positioned substantially in the lower ⅓ of the system frame. This positioning may provide a low center of gravity for the system which promotes the overall stability of the system.

As further reflected in FIGS. 10A-10B, the condenser fan 200 may be positioned such that, when activated, it causes air to flow from the exterior of the system 1000, through an air inlet at the rear of the system, through the fan, then across the two compressors. Alternatively, the airflow could be into the interior of the system through the front kick plate, past the first and the second condensers 110 and 210, and to the exterior of the system through the vents in the rear panel. Of note, in the examples described above, each described airflow path directs air across the first and second compressors 105 and 205 such that operation of the single condenser fan 200 serves the dual purpose of both directing air across the condensers 110 and 210 and across the two compressors 105 and 205.

In one exemplary embodiment of the refrigeration system 200 of FIGS. 10A-10B, the expansion valve used to control the expansion of the compressed refrigerant through one or both of the evaporators 130 and/or 230 may take the form of a motorized stepper valve or a variable continuous expansion valve. In some embodiments, the expansion valve may take the form of a valve whose open area may be variably controlled through a variable drive element, such as a stepper motor. One such embodiment, in which a stepper-motor driven expansion valve is used to control the injection of expanded compressed fluid into the evaporator 230 within the cold pack assembly is depicted in FIG. 10C.

Referring to FIG. 10C, the cold pack assembly is illustrated without showing the details of the freezing cylinder 2500 evaporator. As will be appreciated, the freezing cylinder 2500 evaporator can take any form. FIG. 10C does illustrate, however, the refrigerant inlet 247 and outlet 248 lines feeding into and out of the cold pack assembly.

As depicted in FIG. 10C, a stepper-motor driven variable expansion valve 246 is located upstream of the refrigerant inlet 247. As will be appreciated, the open area of the variable expansion valve 246 can be controlled dynamically such that the amount of refrigerant flowing into the evaporator 230 can be controlled. This can be controlled through a direct adjustment of the open area of the valve 246 or through operation of the valve 246 in a pulse width modulated mode (or a pulse frequency modulated mode) wherein the valve 246 is alternately open and closed in accordance with a variable duty cycle, for fixed duration pluses at a variable frequency or a combination of pulse width and pulse frequency control.

By controlling the extent to which refrigerant is provided to the evaporator 230, the cooling/freezing characteristics of the freezing cylinder 2500 may be configured and adjusted. This adjustability is one of many aspects that are important in the present dispenser because it allows the freezing cylinder refrigeration system to be adapted to a variety of different food products. Thus, for example, through proper control of the variable control valve 246, the characteristics of the freezing cylinder 2500 may be adjusted to be optimized for the dispensing of soft-serve ice cream, a shake product, a smoothie produce and/or a food product having a specific desired consistency. In particular, the evaporator capacity of the evaporator 230 (and/or 130) may be controlled and adjusted through control of the control valve 246.

Figure 10D:
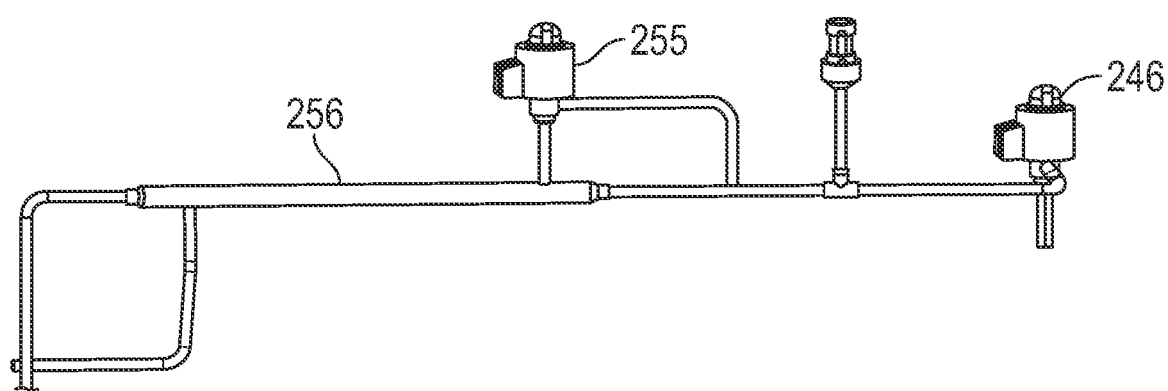

In addition to using a controlled variable expansion valve 246 (or as an alternative) the capacity of the evaporator 230—and thus the freezing characteristics of the freezing cylinder 2500—may be controlled through the use of an additional controlled expansion valve, such as the additional controlled expansion valve 255 shown in FIGS. 10C-10D. The additional controlled expansion valve 255 may take the form of any suitable controlled expansion valve that may be either turned ON and OFF or that may be dynamically controlled (through discrete adjustment of the valve's open area, through pulse with or pulse frequency modulation, or any other suitable control scheme). As shown in FIGS. 10C-10D, the additional controlled expansion valve 255 is located "upstream" of the expansion valve 246 with respect to the flow of refrigerant into the evaporator 230.

Operation of the additional controlled expansion valve 255 will result in a portion of the refrigerant flowing from the compressor 205 to the evaporator 230 being shunted to and through the additional expansion valve 255 and into an outer region of a coaxial cooling tube 256. The illustrated coaxial cooling tube incudes a central tubular section, through which fluid may flow form a tube inlet, through the central tubular section, to the output of the coaxial cooling tube and into the expansion valve 246. The illustrated coaxial tube includes an outer section that surrounds the central tubular section (but is fluidly isolated from the central tubular section) such that fluid may flow through the additional expansion valve, into and through the outer coaxial section, and into the fluid return line. Thus, when the additional expansion valve 255 is activated, fluid will be flowing in opposite directions through the coaxial cooling tube, such that fluid will be flowing in one direction through the tube to the expansion valve 246 and fluid will be flowing in the opposite direction from the additional expansion valve 255 through the coaxial cooling tube to the fluid return. This flow will result in an expansion of the refrigerant flowing through this annular cavity and a cooling of the fluid being provided to the main expansion valve 246 (discussed above). It should be noted that this coaxial arrangement is one embodiment of the design, and additional configurations exist with similar impact, such as a tube-to-tube configuration wherein one tube contains the expanded refrigerant leaving expansion valve 255 which is thermodynamically connected to the liquid filled refrigerant line feeding expansion valve 246. The operation of the additional expansion valve 255 may thus be used to cool the refrigerant entering the main expansion valve 246 (and thus the refrigerant entering the evaporator 230). By controlling the timing, manner, and extent to which the additional expansion valve 255 is operated, the extent to which the refrigerant flowing into the evaporator 230 is cooled may be controlled. One exemplary reason for this increased control is because the cooling provided by operation of the additional expansion valve 255 will increase the capacity of the evaporator 230.

In certain embodiments, the timing and operation of the additional expansion valve 255 will depend on the operating conditions of the dispenser. For example, the evaporator 230 may be sized such that, in normal operation when a properly frozen product is within the freezing chamber, the refrigerant cooling provided by operation of the additional expansion valve 255 is not required. However, during conditions where the conditions within the freezing cylinder 2500 may benefit from an increase in the capacity of the evaporator 230—such as during an initial cool-down of a product load within the cylinder or a refreezing of the cylinder contents after a defrost operation—the additional expansion valve 255 may be operated as described to improve the operability of the system. Notably, in the arrangement of FIG. 10C, operation of the additional expansion valve 255 does not result in an appreciable reduction of the mass flow and/or cooling effect, of the refrigerant entering the evaporator 230. During high load conditions, the increased temperature of the evaporated refrigerant leaving the evaporator 230 and entering the compressor 205 results in a lower density of the refrigerant, and consequently a lower total mass flow through the circuit. Since the output from the valve 255 is fed back into the refrigerant line feeding the annular cavity of 256 and evaporating on the surface of the liquid filled refrigerant line feeding expansion valves 255 and 246 in one embodiment, or a tube thermodynamically connected to the liquid filled refrigerant line feeding expansion valves 255 and 246 in an alternative embodiment, two conditions exist simultaneously: (1) the evaporating refrigerant leaving expansion valve 255 cools the liquid refrigerant flowing through the liquid filled refrigerant line further reducing the energy state of the refrigerant entering expansion valve 246, and consequently reducing the energy state of the refrigerant entering evaporator 230 thereby increasing the cooling effect of the refrigerant flowing through evaporator 230; and (2) cooling the refrigerant leaving the evaporator 230 and entering the compressor 205, thereby increasing the density of the refrigerant entering the compressor resulting in an increase of the relative mass flow of refrigerant in the circuit.

In still further embodiments, the activation of the additional expansion valve 255 may be dependent on the temperature differential between the temperature of the uncompressed refrigerant entering the compressor 205 and the temperature of the compressed refrigerant exiting the compressor 205, or on the temperature differential between the temperature of the uncompressed refrigerant leaving the evaporator 230 and entering the compressor 205, or only on the temperature of the uncompressed refrigerant leaving evaporator 230, or only on the temperature of the compressed refrigerant exiting the compressor 205. In such embodiments, if the temperature of the compressed refrigerant entering or exiting the compressor 205 is determined to be above a configurable threshold limit, the additional expansion valve 255 may be operated in a manner to bring the entrance or exit temperature to within a desired range. Additionally, or alternatively, the operation of the additional expansion valve 255 may be based on the temperature differential between the refrigerant inlet and outlet of compressor 230.

In still further embodiments, the cooling capacity of the evaporator 230 can be modulated through activation of valves 245, 246, and 255 in various sequences. For example, the hot gas bypass valve 245 can be operated concurrent with the primary expansion valve 246 to provide an 'unloading' effect for the evaporator. It should be noted that the hot gas bypass valve can take a variety of forms beyond that of a standard solenoid. Some examples of which are a standard solenoid with a downstream restricting orifice, or a motorized valve.

In yet further embodiments, capacity of the refrigeration system 100 can be modulated through the use of a variable speed compressor 205. The capacity of the primary refrigeration system could be controlled using external sensor input and available data from the system controller to vary the speed of the compressor motor, resulting in a change in the resulting mass flow of the refrigerant flowing through the refrigeration system. The compressor speed, and resulting refrigerant mass flow would be known, and the expansion valve 246 and second expansion or liquid injection valve 255 could be tuned by the system controller to match the output of the compressor. Additionally, if the condenser fan 200 is a fan configuration with multiple or variable speeds, the condenser fan speed could be controlled to modulate condenser performance in response to the associated changes in compressor output.

These aforementioned capacity regulating methods provide significant advantage for the energy efficiency of the system, demand response capabilities, as well as in situ adjustments to the cooling needs of the equipment.

As will be appreciated, operation of the disclosed refrigeration system to cool the interior of the refrigerated ingredient storage compartment 2600 will tend to cause condensate to build up on the evaporator coils 7040 (see FIG. 7C) within the refrigerated compartment. In the illustrated example, the condensate may build up on the coils to the point that it aggregates and drips by gravity into the condensate tray 7050 positioned below the coils. Under certain conditions, it is possible that condensate may build up and freeze on the coils. In situations where such conditions may be encountered, the system can be configured to implement a coil defrost function in which the coils are defrosted, and the frozen condensate is liquified and shed from the coils. One exemplary approach for implementing such a coil defrost function is to allow for a defrost period in which—during a period of time—the compressor for the ingredient storage compartment is not operated such that a period is provided for the coil to defrost and any condensate to drain from the coil. Additionally, or alternatively, combinations of discrete evaporator control can be used independently or in conjunction with the defrost period described above. A still further—additional or alternative—method of defrosting would be to use a dedicated heating element to warm the air around and/or passing over the evaporator to facilitate the defrosting and draining of the condensate from the coil.

In certain embodiments the condensate tray 7050 may be a removable structure that may be removed and emptied by the system operator on a regular basis. Alternate embodiments are envisioned wherein an active condensate processing system is included within the overall dispensing system to automatically evacuate condensate from the system. One such alternate embodiment is shown in FIGS. 11A and 11B.

Figure 11A:
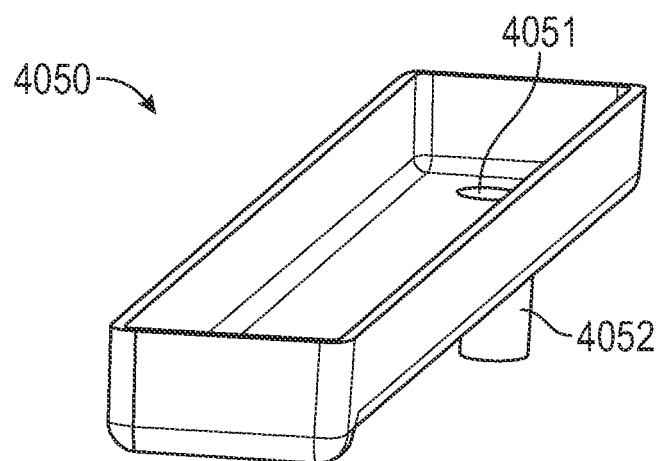
FIG. 11A illustrates an exemplary primary condensate tray as used in connection with an
exemplary disclosed system.

In FIG. 11A an exemplary primary condensate tray 4050 is shown which defines a large trough-like reservoir 4051 that may be positioned below the evaporator coil 4040 (or any other structures from which condensate may drip) to collect condensate. The exemplary trough further defines an opening that extends into a condensate discharge spout 4052. Although not depicted in FIG. 11A, additional condensate trays 4050, similar in construction to the depicted tray may be positioned at any location within the system where condensate may collect.

Figure 11B:
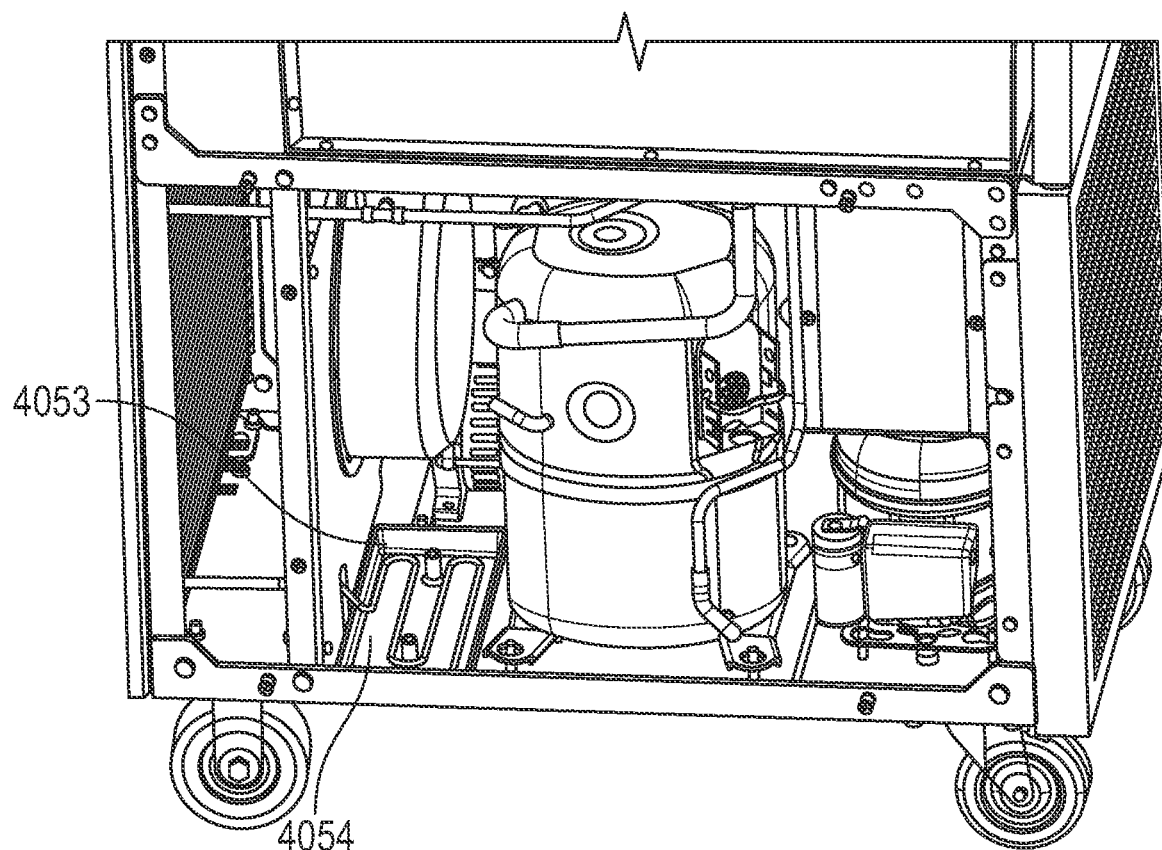
FIG. 11B illustrates the lowest portion of the interior of the exemplary disclosed system.

In the example of FIG. 11A the condensate collected within the primary condensate tray (or trays) 4050 is fed from the discharge spout (or spouts) 4052 into a main condensate collection tray 4053, which is shown in FIG. 11B. As reflected in FIG. 11B, the main condensate collection tray 4053 is positioned on a lower surface of the dispenser and at a location over which air sucked into the system through the vents 1015 in the front kick-plate 1010 by the shared condenser fan 200 will flow. This passage of air will tend to cause condensate collected within the main condensate tray 4053 to evaporate and be expelled from the interior of the system.

To further promote evaporation of condensate from the main condensate collection tray 4053 the compressed hot-vapor discharge line from one of the compressors in the system (e.g., the compressor associated with the ingredient storage refrigeration system) may be routed such that a portion of the lines passes through the main condensate collection tray 4053. The passage of such lines through the tray 4053 will help to heat any condensate within the main condensate tray and further promote evaporation. In one embodiment, the heating provided by the routing of the discharge line is such that the temperature of the fluid within the main condensate collection tray can reach 90° F.

Note that the use of the discharge line from the ingredient refrigeration system compressor as a means for heating the condensate in the main condensate collection tray 4053 is exemplary only. Alternate sources of heat could alternatively or additionally be used including, but not limited to: (a) the discharge line associated with the freezing cylinder refrigeration system compressor; (b) the discharge lines from both compressors in the system; (c) the output fluid line from the heater element 2801; and/or (d) the output of a dedicated heating element.

In the example of the FIGS. 11A-11B, the main condensate collection tray may have a volume that is approximately twice that of the volume of the (or one of the) primary condensate trays 4050. For example, in one embodiment, the primary condensate tray 4050 will be sized such that it can store approximately 14.3 cubic inches of fluid, while the main condensate collection tray 4053 will be sized to store approximately 31.3 cubic inches of fluid.

It will be appreciated that the condensate processing system described above may be used to process and eliminate fluids that may build up within the dispensing system other than the condensate falling from the evaporator 4040. For example, in embodiments where input air is compressed in the unit, or onsite, stored in an accumulator, filtered and/or dried, fluid may be collected as part of that operation. Such fluid may be collected at the location where the air is compressed, stored, or regulated, (e.g., the pressure regulator 2012 shown in FIGS. 2A-2C) through the use of a primary collection volume and then passed to the main condensate collection tray 4053 for processing as described above. The aforementioned process would constitute a 'blow down' process to remove the condensate built up in the compressed gas system. One embodiment of this 'blow down' process could occur through the use of a mechanical float valve, which would open when sufficient volume of condensate formed in the collection volume such that sufficient buoyant forces were generated to lift the float and open the flow path. The float would automatically re-seat when the condensate had been evacuated. Another embodiment of the 'blow down' could be the use of a solenoid valve, which when activated, would allow the passage of condensate from the collection volume into the condensate management system. This solenoid could be controlled through a variety of methods, one of which would be an automatic timer, or similar function from the system controller. It will be appreciated that the components comprising the compressed gas system, especially the accumulator 2008, and pressure regulator 2012, and any interconnecting tubing, are arranged in a manner which promotes drainage through gravitational forces of any condensate formed within the system into the primary collection volume.

As generally discussed below, during operation of the described system ingredients used for the formation of a dispensed product may be mixed with one or more pressurized gases and then the gas/ingredient mix may be pumped into the freezing cylinder 2500 where the ingredient/gas mix will be processed to form a food product that may be dispensed through activation of the dispensing assembly as described above.

Figure 12:
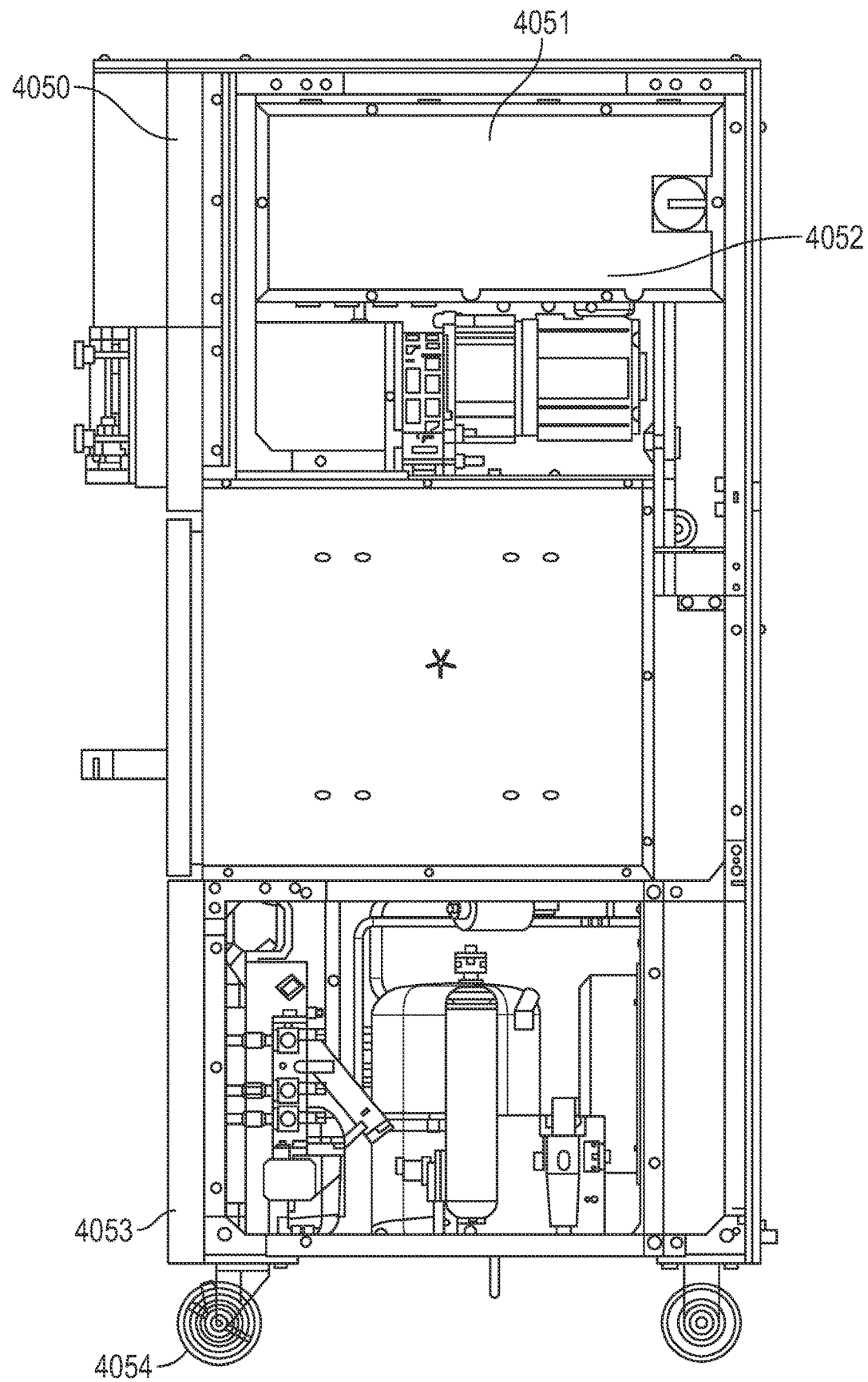
FIG. 12 illustrates a side view of the exemplary disclosed dispensing system.

FIG. 12 illustrates a side view of the exemplary dispensing system that depicts several of the components involved in the preparation and dispensing of food products. One of the side panels has been hidden, as have certain components not involved in the operations under discussing.

Figure 13A:
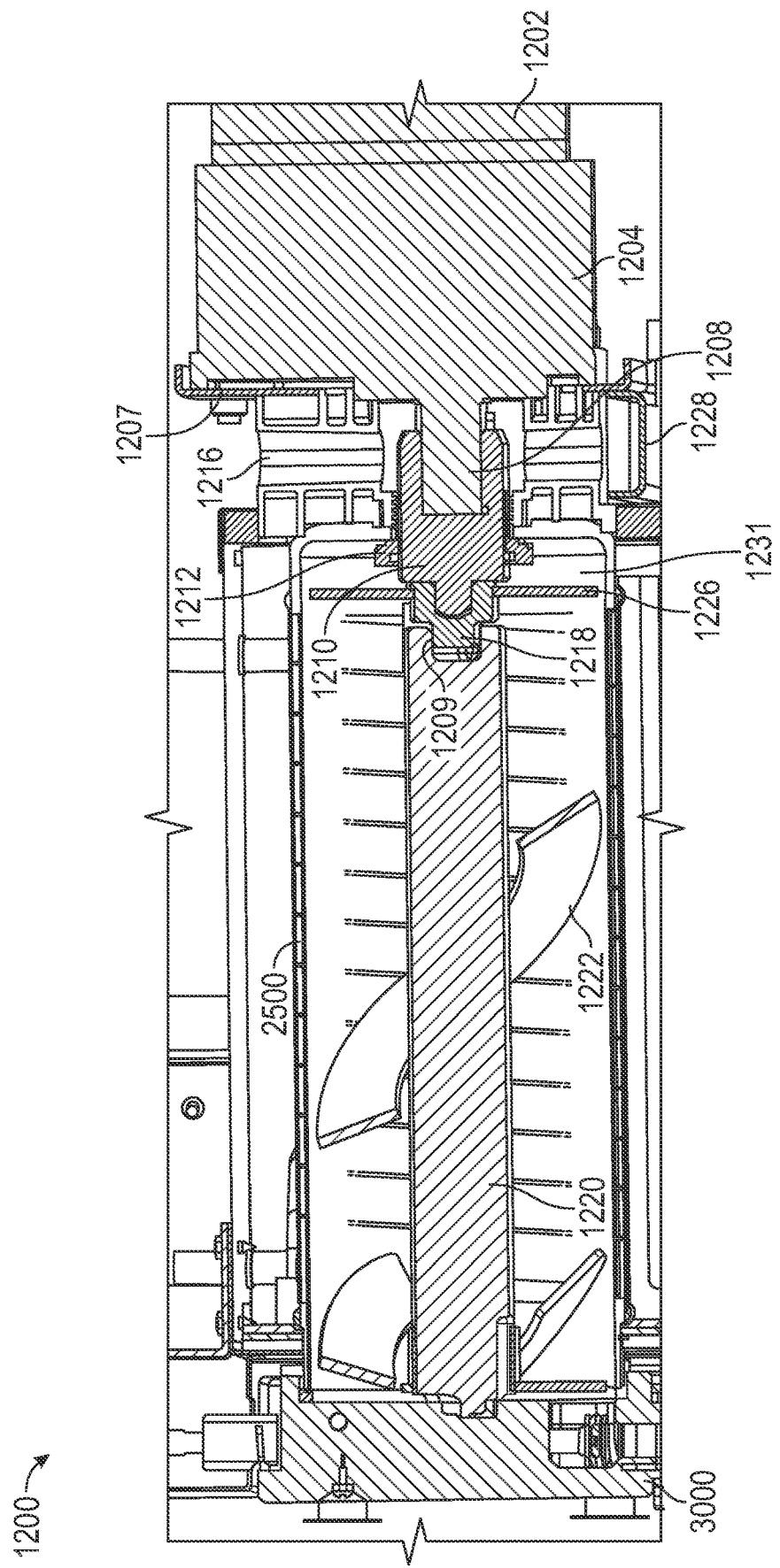
FIG. 13A illustrates a cross section of several of the components illustrated in FIG. 12A.

A reflected in FIG. 13A, the faceplate 3000 and the associated dispensing system may be coupled to the freezing cylinder 2500 which is located within an insulated cold pack assembly 1200. As described in more detail below, components within the cold pack assembly 1200 may be coupled to an electric motor 1202 through the use of a gearbox assembly 1204 and a motor mounting plate 1207.

As depicted in FIG. 12, the cold pack assembly 1200 containing the freezing cylinder 2500 is mounted on top of the ingredient storage refrigeration cabinet 2600 discussed above. Although not illustrated in FIG. 12, the fluid connection containing the ingredient/gas mix will flow from the interior of the refrigerated compartment 2600 and into and through an opening feeding the freezing cylinder 2500 and may be positioned such that it extends within an insulated area of the cold pack assembly 1200. As such, and as a result of the refrigerated nature of the refrigeration cabinet, the refrigerated nature of the freezing cylinder 2500 and the chilled or frozen product within the freezing cylinder 2500, the material within this fluid connection will be maintained at temperature levels that may be configured by an operator during operation of the disclosed system.

In the exemplary embodiment disclosed herein, the fluid connection feeding the ingredient/gas mixture into the freezing cylinder 2500 is designed to feed the ingredient/gas mixture through an opening located at the bottom portion of the freezing cylinder and at a location closer to the electric motor 1202 than to the faceplate 3000. In one exemplary embodiment, the opening into the freezing cylinder is positioned in the bottom freezing cylinder 2500 (referenced from the top to the bottom of the cylinder) and in the rear one-quarter of the freezing cylinder 2500 (with the rear being the end of the cylinder closest to the motor 1202).

FIG. 13A illustrates a cross section of several of the components described in FIG. 12. In particular, FIG. 13A depicts: a cross-section of a portion of the motor 1202 and, a cross section of: the gearbox assembly 1204, a motor mounting plate 1207, the freezing cylinder 2500 and certain other components discussed in more detail below.

While any suitable electric motor and gearbox assembly may be used, in the illustrated example under discussion motor 1202 takes the form of a variable speed electronically controlled motor. Such a motor may take the form of a controlled induction motor ("CIM"); a brushless permanent magnet motor ("BPM"); a switch reluctance motor ("SRM"), or any other motor that can be controlled to rotate at multiple speeds and/or over a variable speed range.

In the illustrated exemplary embodiment of FIGS. 13A-13D, the output from the motor 1202 is coupled to the input of a gearbox assembly 1204. The gearbox assembly 1204 may take any suitable form and may, in some examples, be integrally provided with the electric motor 1202. As generally reflected in FIGS. 13A-13D, a motor mounting plate 1207 is coupled to the face of the gearbox assembly 1204, and a floating alignment plate 1216 positioned such that it engages the motor mounting plate 1207. A motor shaft 1208 extends from the gearbox assembly, through the motor mounting plate 1207, through the floating alignment plate 1216, and into a recess that is formed within a coupling shaft 1210. An O-ring gland element 1212 surrounds the coupling shaft 1210. The O-ring-gland element 1212 includes a first region having a first general cross-sectional width that is positioned within the freezing cylinder 2500 and a second region having a second generally cross-sectional width extending through a rear opening in the freezing cylinder 2500 and into a recess formed within the floating alignment plate 1216. In the example under discussion, the cross-sectional width of the first region is greater than the cross-sectional width of the second region. In the example of FIGS. 13A-13D, the floating alignment plate 1216 is bolted, on a first side, to mounting structure associated with the freezing cylinder 2500 and, on a second side, to the motor mounting plate 1207. In the illustrated example a gasket element 1206 positioned between the floating alignment plate 1216 and the components forming the exterior portions of the cold pack assembly 1200 to help thermally isolate the interior of the cold pack is assembly 1200 from the other portions of the apparatus and from the outside environment.

Figure 13B:
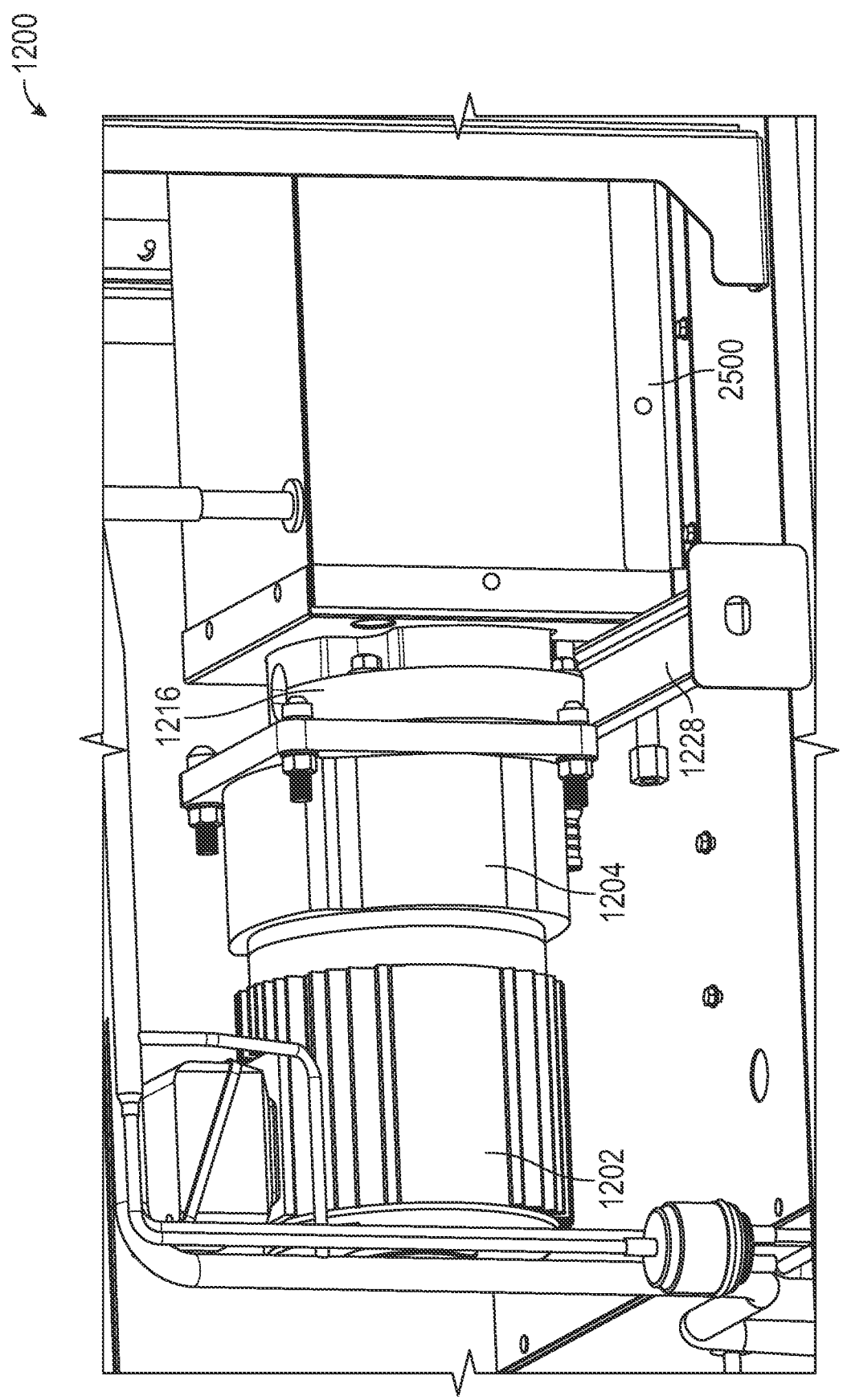
FIG. 13B illustrates a cross-section of an exemplary temperature controlled chamber with motor as used in connection with the disclosed system. In this example the temperature-controlled chamber is a freezing (and/or heating) chamber.
Figure 13C:
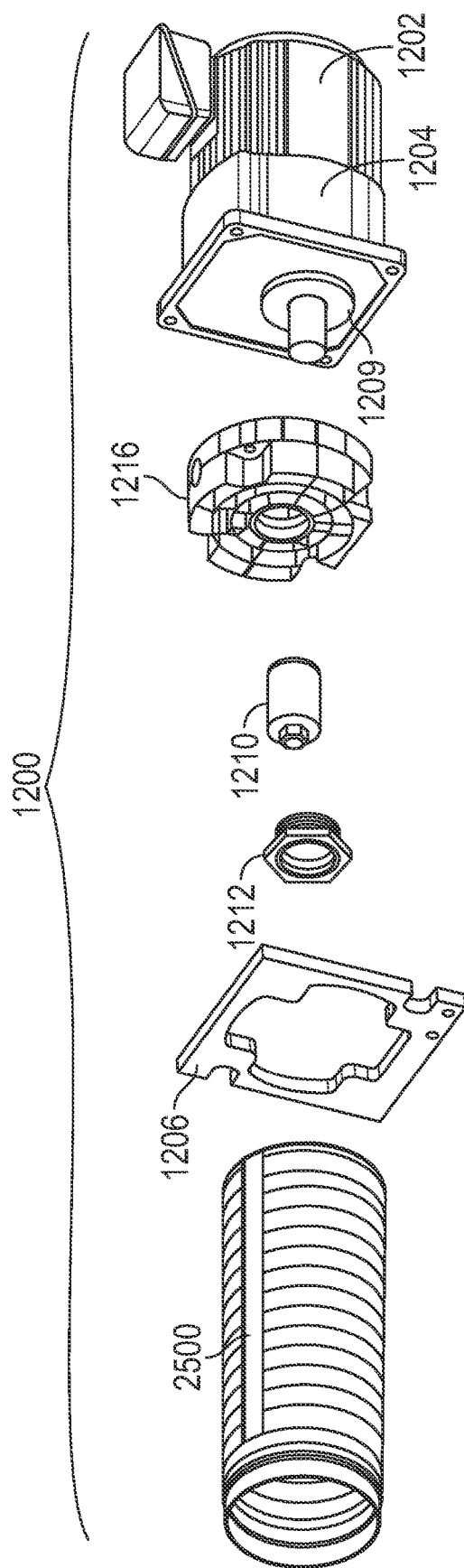
Figure 13D:
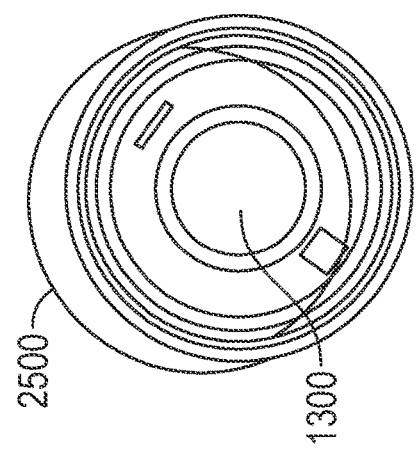

As best shown in FIGS. 13A and 13D, an output from the coupling shaft couples with a recess in an auger coupling element 1218 that, in turn, is coupled to a rear receiving recess within an optional/removable auger core element 1220 of an auger assembly. The core element 1220 of the auger assembly is a generally cylindrically shaped element that extends along substantially the entire length of the freezing cylinder 2500. Auger prop elements 1222 (only portions of which are shown in FIG. 13A) extend from the auger core and may be coupled to one or more bars (not shown in FIG. 13A) that extend from a rear auger plate 1226.

Figure 14A:
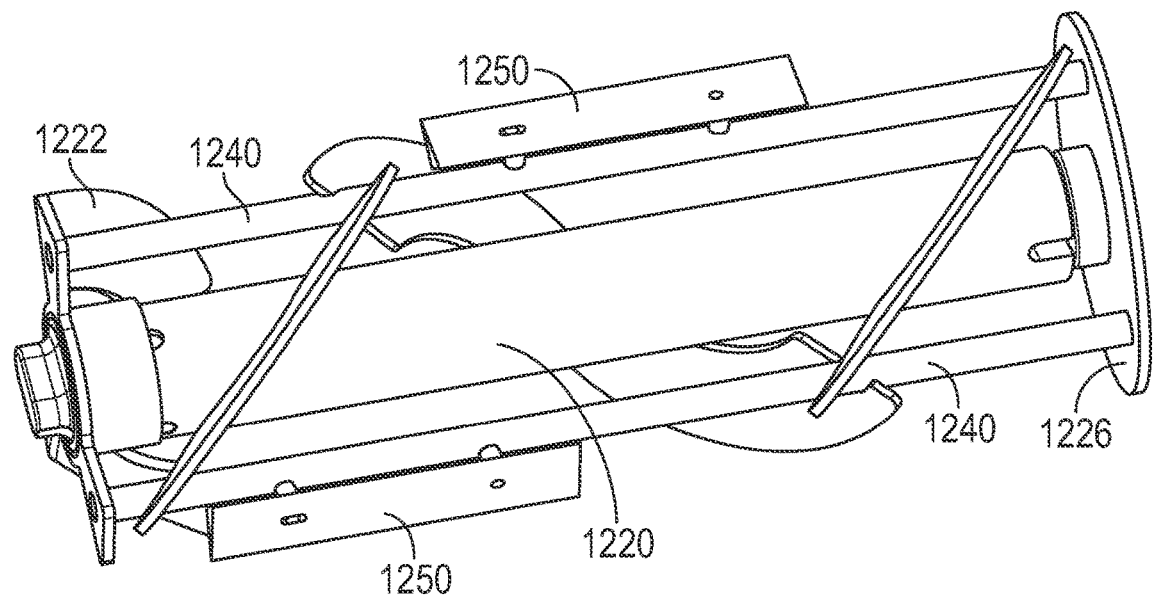
FIGS. 14A and 14B illustrates aspects of a beater bar assembly that may be used in embodiments of system disclosed herein.
Figure 14B:
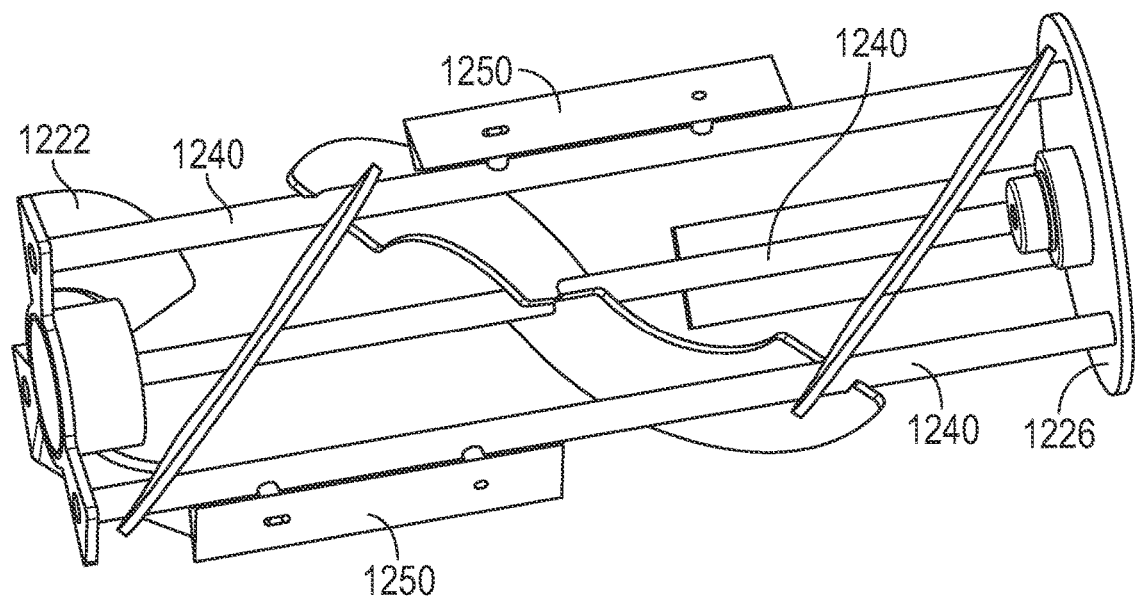

FIGS. 14A and 14B further reflects details of the auger assembly. As shown in FIG. 14A, the auger core extends from the auger coupling element 1218, along substantially the entire length of the auger, to and through an opening defined at the end of the auger assembly that—in use—will be closest to the faceplate. As reflected in FIG. 14A, the faceplate end of the auger core 1220 defines a feature that may be received within, and engage a corresponding recess formed in the faceplate 3000 (such as the recess 3009 of FIG. 3B). In such embodiments, the manner in which the auger core assembly 1220 engages with the faceplate recess and the auger coupling element may be such that the auger core rotates along with the auger assembly whenever the auger assembly is rotated. Alternatively, the manner in which the auger core assembly 1220 engages with the faceplate recess and the auger coupling element may be such that the engagement of the auger core element 1220 with the faceplate recess will prevent rotation of the auger core assembly 1220 while the engagement between the auger core element 1220 with the auger coupling element 1218 will permit the auger core element to rotate with respect to the remaining elements of the auger assembly.

As further reflected in FIG. 14A three bars 1240 extend from the rear auger plate 1226 along substantially the entire length of the auger assembly. In the illustrated example, three flat blades 1250 (which may be spring biased and allowed to flex radially) are positioned on extensions from the auger bars 1240 and may be used to scrape the inner surface of the freezing cylinder 2500 during operation. As depicted in FIG. 14A, the bars 1240 terminate with attachments to an auger prop element 1222 that is designed and shaped to move product within the area encompassed by the prop element towards the faceplate 3000.

As will be apparent from FIG. 14A, the entire auger assembly may be easily separated from the remainder of the dispenser system when the faceplate is removed by simply pulling the auger assembly out through the open end of the freezing cylinder 2500. As will also be apparent from FIG. 14A, the auger core element 1220 may be easily separated from the remainder of the auger assembly by pulling it out of, and away from, the auger coupling element 1218. It will also be apparent from FIG. 14A, the flat blades 1250 may be easily separated from the remainder of the auger assembly. The flat blades 1250 also contain 2 scraping edges, only one of which is active in a given orientation, and indicators for orientation of the blade with respect to rotation of the auger assembly. It may be appreciated that these features extend the service life of the blades.

As described above, use of the auger core element 1220 is optional. FIG. 14B illustrates the auger assembly with the core element 1220 removed. As will be appreciated, when the auger core element 1220 is used, the shape of the auger core may be configured and optimized to match the desired characteristics for the product to be dispensed from the dispenser. Thus, for example, the auger core element configuration used for a freezing cylinder 2500 intended to dispense soft-serve ice cream may differ in construction from an auger core element intended for use with a freezing cylinder intended to dispense a shake or a smoothie.

As reflected in FIGS. 13A and 13B a rear seal drip tray 1228 may be provided to catch content flowing from the freezing cylinder 2500 in the event of an unexpected failure of the rear seal. In some embodiments—such as the one depicted in FIG. 13B—the rear seal drip tray 1228 may include a sidewall with an opening such that product will spill through the opening in the event of a product buildup within the rear seal drip tray 1228. In such embodiments, the opening may be positioned such that any outflow of product through the opening will be readily observable by a user or operator of the dispenser. For example, the opening may be positioned on a side of the dispenser in the manner shown in FIG. 1C for element 1085.

Referring back to FIG. 10A, one exemplary location for the port 1230 through which the product ingredient/gas mixture (and/or cleaning/sanitizing solution) is pumped into the freezing cylinder is shown. While such a port may be used to introduce a product ingredient/gas mixture (or cleaning/sanitizing fluid) into the freezing cylinder at any desired location, in one exemplary embodiment, the introduction of the product ingredient/gas mixture (during a product formation and dispense) and the introduction of the cleaning/sanitizing solution (during a self-cleaning operation) occurs at a location behind the auger mounting plate 1226. One such location is identified as region 1231 in FIG. 13A.

Referring again to FIG. 13A, it will be appreciated that the combination of the depicted variable speed electric motor 1202 with an auger assembly (for example the auger assembly of FIG. 14A) produces a product formation system that has a high degree of variability. Not only does the described example permit easy and efficient modification of the auger assembly to match a desired product or certain desired product characteristics, the use of variable speed electronic motor 1202 permits the rotational speed of the motor to be varied during the operation of the dispenser, and permits the direction of rotation to be reversed. Thus, for example, during a self-cleaning operation, the motor 1202 may be operated at rotational speeds that are higher—and in some instances more than 25% higher—than the average rotational speed used during product formation and dispense operations. The direction of rotation may also be changed between counterclockwise and clockwise directions during certain operations. Additionally, and/or alternatively, the rotational speed of the motor 1202 may be varied depending on the state of the product within the freezing cylinder 2500. For example, during an initial pull-down and/or refreezing operations, the motor 1202 may be operated at a rotational speed that is lower than—and potentially more than 15% lower than—the rotational speed used during periods where the product within the freezing cylinder 2500 is frozen and ready to be dispensed. The use of a slower rotational speed in such circumstances may result in a change in the freezing characteristics of the product within the freezing cylinder and may have many other uses to those skilled in the art and in possession of this disclosure.

Still further, the use of a variable speed drive system permits the motor 1202 to be driven at a very low rotational rate during any operation where the motor is rotated, and the rotor current is detected to determine the freeze state of the product within the cylinder. During such freeze-check operations the use of a low rotational speed both saves energy (and thus energy costs) by using a low rotational speed for such operations and avoids the introduction of unnecessary energy (and the resultant heat) that would result from a high-RPM freeze check operation. Further, depending on the nature of the product within the cylinder, the use of lower rotational speeds can reduce product breakdown and/or maintain desired product consistency and characteristics.

Still further, during intervals where the interior of the cylinder 2500 is being defrosted, the motor 1202 may be run at a rotational speed that is higher than—and potentially as much as 30% higher than—the rotational speed at which the dispenser normally operates during a product dispense operation. The use of such a high rotational speed helps to improve mixing while defrosting and helps prevent frozen product from clinging around the center of the auger and not melting, thus decreasing the time required to complete the defrost application.

And further, the use of a variable speed motor allows the disclosed dispenser to more effectively freeze down, maintain, and dispense different products without having to make any meaningful mechanical adjustments within the system. As will be appreciated, different products require different auger rotational speeds during product formation and dispense operations for optimal performance. For example, shakes and smoothies require faster RPMs than soft serve for optimum product quality. The use of the disclosed variable speed motor 1202 (and an associated motor drive) allows the motor speed during various operating conditions to be easily and optionally configured to a variety of different products.

FIGS. 13C and 13D (in conjunction with FIG. 13A) illustrate details concerning the rear seal assembly used in the disclosed embodiments.

As reflected in certain of the figures, the gearbox assembly 1204 terminates in a relatively flat face from which a rotating shaft 1208 extends. As best reflected in FIG. 13C, an alignment feature 1209 extends from the face of the gearbox assembly 1204 about the rotating shaft 1208. In general, the alignment feature is such that an element positioned about the alignment feature 1209 will be concentrically aligned with the rotating shaft 1208.

A floating alignment plate 1216 is provided that defines a passage that passes through the entirety of the plate. In the example of FIG. 13C the alignment plate includes a first set of openings that may be used to receive a plurality of connecting elements (e.g., bolts) that can affix one side of the alignment plate (the left side in FIGS. 13A and 13C) directly to the freezing cylinder 2500. In one of many possible embodiments the bolts used to connect the floating alignment plate 1206 may be configured to be integrally formed with, and extend from, the freezing cylinder. The alignment plate may be formed from a low thermally conductive material—such as low conductivity thermoplastic—to minimize any transfer of heat from the motor assembly to the freeing cylinder 2500.

In the examples of FIGS. 13A and 13C, the floating alignment plate 1216 includes a recess that may be configured to receive the alignment feature 1209 that extends from the gearbox 1204. The floating alignment plate 1206 further includes a second set of openings that may be used to receive a second plurality of connecting elements (e.g., bolts or other threadable members) that may be used to affix a second side of the alignment plate (the right side in FIGS. 13B and 13D) to the motor mounting plate 1207.

As best shown in FIG. 13B, the coupling of the floating alignment plate 1216 with the exposed face of the gearbox assembly 1204 may—because of the receipt of the alignment feature 1209 within the floating alignment plate 1216—ensure concentric and axial alignment of the plate 1216 with the rotating shaft 1208 extending from the gearbox 1204. Further, because the floating alignment plate 1216 is directly attached to the freezing cylinder 2500, the floating alignment plate 1206 will be axially and concentrically aligned with the freezing cylinder 2500 (and in particular the opening passing through the end of the freezing cylinder). Accordingly, because the disclosed arrangement ensures proper alignment between the floating alignment plate 1216 and the freezing cylinder 2500 on one side of the plate, and proper alignment of the alignment plate 1216 and the rotating shaft 1208 from the gearbox 1204, the illustrated arrangement further ensures proper axial and concentric alignment between the rear opening in the freezing cylinder 2500 and the rotating shaft 1208 extending from the gearbox 1204.

As shown in FIGS. 13A and 13C—and as generally described above—a gasket 1206 may be positioned between the floating alignment plate 1216 (or any other components within the system) and the freezing cylinder 2500 (or a feature of the cold pack assembly) to minimize thermal loss from the interior of the faceplate.

Referring back to FIG. 13D, in the specific illustrated embodiment, it may be seen that the inner surface of the opening in the rear of the freezing cylinder has configurable features (e.g., ridges) that may be adapted to receive mating features in a first portion of the O-ring gasket element 1212 and that the floating alignment plate 1216 also defines an opening having an inner surface defining features adapted to engage with mating features associated with a second portion of the O-ring gasket element 1212. It will be appreciated that the construct depicted in FIG. 13D is exemplary and optional and that the function of element 1212 could be provided through alternative structures. For example, the same or a similar feature could be included in an element comprising the freezing cylinder 2500.

As also reflected in FIG. 13A, when assembled, the coupling shaft 1210 is positioned such that it extends from within the freezing cylinder 2500, through the opening 1300 in the rear of the cylinder, through the interior of the O-ring gasket element 1212, and through the floating alignment plate 1216 until it engages within the rotating shaft 1208 extending from the gearbox 1204. In one embodiment, the engagement between the O-ring gasket element 1212 and the inner surface of the opening 1300 through the rear of the freezing cylinder 2500 (and/or the engagement between the O-ring gasket element 1212 and the inner surface of the floating alignment plate 1216) when the coupling shaft 1220 is positioned as shown is such that rotation of the O-ring gasket element 1212 is prevented. This can be accomplished, for example, by having the O-ring gasket element 1212 define features that are received within either the rear wall of the freezing cylinder and/or or a portion of the floating alignment plate that will inhibit rotational movement of the gasket element (and/or vice versa, e.g., features associated with the rear wall of the freezing chamber and/or the floating alignment plate that engage with the gasket element 1212. The non-rotation of the O-ring element 1212, ensures that the only relative rotation between elements of the illustrated rear sealing structure is between the rotating coupling shaft 1212 and 1210 and the resilient O-ring sealing gasket 1212, such that any wear resulting from rotation will occur with respect to these elements which are easily replaceable and accessible from the front portion of the system. In other words, because the O-ring sealing gasket 1212 and/or the coupling shaft 1210 can both be accessed through the open end of the freezing cylinder 2500 (without having to disassemble significant elements of the system), replacement of such elements is simplified.

It will also be appreciated from an inspection of FIGS. 13A, 13C and 13D that the coupling shaft element may (with the faceplate and auger assembly removed) be easily removed from the front of the machine by simply pulling the coupling shaft out the open front of the freezing cylinder. The same may be true for the removal of the resilient O-ring structure. Furthermore, as will be appreciated by those in receipt of this disclosure, replacement or initial installation of the resilient O-ring structure and the coupling shaft will be straightforward and may be accomplished easily through front-access of the machine opening.

It will be appreciated that the rear seal design discussed above results primarily from radial compression of the resilient O-ring structure (in particular radial compression on the outer diameter of the O-ring structure) and that there is no, to minimal, reliance on axially compressive forces for the establishment of the rear seal. This use of a radially compressive seal helps to minimize component wear.

It will further be appreciated that, to the extent that there is any leakage path from the interior of the freezing cylinder to the exterior, that leak path will be around or through the resilient O-ring structure and that there are no leakage paths through any rotating, non-resilient, bearing structures.

It may be noted from an inspection of FIG. 13C that there is no continuous face seal established between the surface of the gear box 1204 and the mounting plate 1207 and that the floating alignment plate 1216 is configured such that there is an open recess surrounding the opening through which the rotating shaft 1208 extends from the floating alignment plate 1216.

This configuration is significant because it ensures that the region surrounding the opening through which the rotating shaft extends from the gearbox is maintained at atmospheric pressure (and there is no potential for pressure build up). Maintaining that region at atmospheric pressure ensures that no unwanted materials are forced into the gearbox or motor assemblies.

Figures 1, 13E:
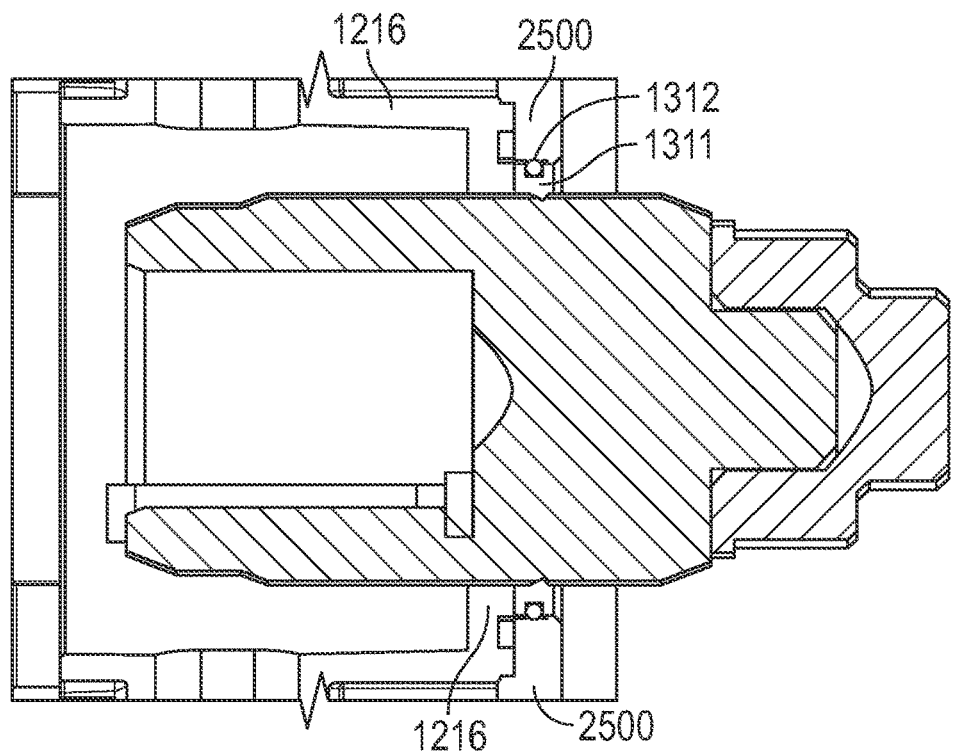
Figures 2, 13E:
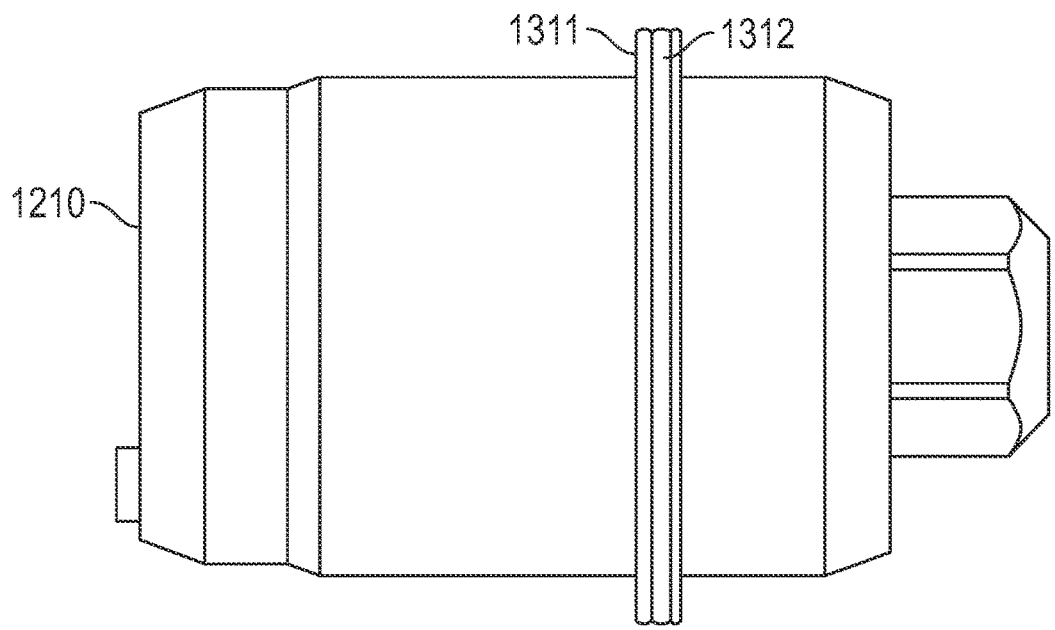

FIGS. 13E-1 and 13E-2 illustrate an alternative rear seal assembly. In the alternative illustrated example, the rear seal is formed from a dual O-ring structure that includes a first O-Ring element 1311 that fits within a region of the freezing cylinder 2500 and a second O-Ring element 1312 that fits within a recess within the first O-Ring element 1311. In the illustrated example of FIGS. 13E-1 and 13E-2 the first O-Ring element 1311 is position such that it includes horizontal regions abutting edges of the freezing cylinder 2500 and vertical rear regions abutting the floating alignment plate 1216. In the same example, the second O-Ring element 1312 is positioned such that it includes regions abutting the first O-Ring element 1311 and portions of the freezing barrel 2500.

As will be appreciated, one benefit of the motor mounting structure described above is that that there is general alignment of the motor (or gearbox) output shaft and the auger assembly within the freezing cylinder. As such, it is possible to position both the cold-pack containing the freezing cylinder and the motor 1202 and the gearbox assembly 1204 above a horizontal plane that passes above the ingredient refrigeration unit. This promotes an efficient usage of space and eliminates the need for pullies or belt systems. Still further, the arrangement described herein is one where a longitudinal axis extending through the motor output shaft is passes through both the interior of the freezing cylinder and the faceplate. Again, this arrangement promotes efficient use of space.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps.

Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims.

What is claimed is:

1. A self-cleaning food dispenser comprising:
   a freezing barrel, the freezing barrel being in the general form of a cylinder with an open end;
   a faceplate coupled to the open end of the freezing barrel, the faceplate comprising:
      a dispense bore passing generally vertically through the faceplate, the dispensing dispense bore having a dispense opening at its lower end;
      a cleaning bypass passage, the cleaning bypass passage having a first open end and a second open end that opens externally to the faceplate;
      a vent relief passage having a first open end opening to the interior of the freezing barrel and a second open end opening to a location external to the faceplate;
      a vent relief activation passage having a first open end opening into the vent relief passage and a second open end opening to a point external to the faceplate;
      a vent flush passage having a first open end and a second open end;
      wherein a portion of the faceplate is adapted for coupling to a blocking member such that, when the blocking member is coupled to the faceplate, dispensing of product from the freezing barrel is blocked and a fluid path exists between the dispense bore and the first open end of the cleaning bypass passage; and
   a vent relief valve assembly positioned within the vent relief passage, wherein the vent relief valve assembly includes a first surface in fluid connection with the vent relief activation passage, and wherein at least portions of the vent relief valve assembly are within the vent flush passage.

2. The self-cleaning food dispenser of claim 1, further comprising a source of pressurized gas and a first control valve having an inlet fluidly coupled to the source of pressurized gas and an outlet fluidly coupled to the second open end of the vent relief activation passage, wherein the first control valve may be actuated to cause pressurized gas to flow into the vent relief activation passage such that the vent relief valve is opened to permit the flow of gas or fluid from within the freezing barrel, through at least a portion of the vent relief passage and into the vent flush passage.

3. The self-cleaning food dispenser of claim 2 further comprising a source of cleaning fluid and a second control valve having an inlet fluidly coupled to the source of cleaning fluid and an outlet fluidly coupled to the first open end of the vent flush passage, wherein the second control valve may be actuated to cause cleaning fluid to flow into the vent flush passage such that the vent flush passage, and the portions of the vent relief valve exposed to the vent flush passage, are cleaned.

4. The self-cleaning food dispenser of claim 3 wherein the cleaning solution is water and the dispenser further comprises a third control valve having an input fluidly coupled to the source of pressurized gas and an output fluidly coupled to the first open end of the vent flush passage such that the third control valve may be actuated to: (a) provide pressurized gas to the vent flush passage to clean the vent flush passage, and the portions of the vent relief valve exposed to the vent flush passage, and (b) facilitate the evacuation of fluid from the vent flush passage.

5. The self-cleaning food dispenser of claim 1 wherein the blocking member comprises a blocking cap and, when the blocking cap is connected to the faceplate, a fluid path is created from the interior of the freezing chamber, through the dispense bore and into an interior region of the blocking cap, and from the interior region of the blocking cap into the first open end of the bypass passage.

6. The self-cleaning food dispenser of claim 1 wherein the vent relief valve further comprises a poppet biased towards a closed position against the first open end of the vent relief passage, wherein the biasing is such that the presence of a sufficient pressure within the freezing barrel will cause the poppet to move to an open position and permit the flow of fluid, which may be in gas form, from the interior of the freezing barrel into the valve flush bore.

7. The self-cleaning food dispenser of claim 1, wherein the faceplate has a front side and a back side, and wherein the dispense bore opens on the front side of the faceplate and both the second open end of the cleaning bypass passage and the second open end of the vent relief activation passage both open to the back side of the faceplate.

8. The self-cleaning food dispenser of claim 1 wherein the first open end of the vent flush passage is located at a position above the second open end of the vent flush passage, such that gravity will assist the flow of fluid from the first open end of the vent flush passage to the second open end of the vent flush passage.

9. A self-cleaning food dispenser comprising:
   a product dispense cylinder, the product dispense cylinder being in the general form of a cylinder with an open end;
   a faceplate coupled to the open end of the product dispense cylinder, the faceplate defining:
      a dispense bore passing generally vertically through the faceplate, the dispense bore having a dispense opening at its lower end;
      a bypass passage, the bypass passage having a first open end that opens at the lower end of the face plate and a second open end that opens externally to the faceplate;
      wherein a portion of the faceplate is adapted for coupling to a blocking member such that, when the blocking member is coupled to the faceplate, the dispense opening is blocked;
   a valve stem received within the dispense bore, the valve stem defining an outer sealing surface that can be positioned to seal against an inner surface of the dispense bore,
      wherein the valve stem is adapted to be placed in a first position such that the flow of material from within the product formation through the dispense opening is prevented by a seal between the valve stem and the dispense bore and a second position wherein the flow of material from within the product dispense cylinder through the dispense opening is not blocked by a seal between the valve stem and the dispense bore; and wherein the first open end of the bypass passage is located at a point below the seal between the valve stem and the inner surface of the dispense bore when the valve stem is in its first position.

10. The self-cleaning food dispenser of claim 9, wherein the product dispense cylinder includes an inlet, and the dispenser further includes: a pump having an outlet fluidly connected to the inlet of the product dispense cylinder, and an inlet fluidly connected to a pump connecting element, that can be connected to either a source of a fluid food product ingredient or a source of cleaning fluid, wherein the pump is adapted to pump fluid from a source into the product dispense cylinder when the pump connecting element is fluidly coupled to a source of fluid.

11. The self-cleaning food dispenser of claim 10 wherein the pump is a positive displacement pump.

12. The self-cleaning food dispenser of claim 10 further including an insulated refrigeration storage compartment for storing a fluid food product ingredient and wherein the pump is positioned within the insulated refrigeration storage compartment.

13. The self-cleaning food dispenser of claim 9 further including a blocking member in the form of a blocking cap.

14. The self-cleaning food dispenser of claim 12 wherein the pump connecting element is coupled to a source of cleaning fluid, a blocking member is coupled to the faceplate, the valve stem is positioned in the second position and a fluid path exists: (i) from them source of cleaning fluid, (ii) into and through the pump, (iii) into and through the product dispense cylinder; and (iv) and into the first open end of the bypass passage in the faceplate.

15. A refrigerated food processing and dispensing apparatus:
a freezing barrel, the freezing barrel having an open end;
a faceplate coupled to the open end of the freezing barrel, the faceplate defining:
a dispense bore passing generally vertically through the faceplate;
a bypass passage having a first end opening external to the faceplate;
a valve stem positioned at least partially within the dispense bore, the valve stem including a sealing surface for creating a seal with the dispense bore; and
a valve stem actuator coupled to the valve stem, the valve stem actuator being configured to move the valve stem from a first position, where dispensing of a food product from within the freezing barrel is permitted, to a second position where the seal between the valve stem and the dispense bore precludes dispensing of the food product;
wherein the bypass passage is positioned such that, when the valve stem is in its first position, no fluid path exists between the interior of the freezing barrel and the first end of the bypass passage.

16. The refrigerated food processing and dispensing apparatus of claim 15 wherein the valve stem actuator comprises a pneumatically controlled actuator.

17. The refrigerated food processing and dispensing apparatus of claim 15 further comprising a pneumatically controlled vent relief valve positioned within the faceplate, the vent relief valve permitting the venting of fluid, which may be in the form of a gas, from within the freezing barrel.

18. The refrigerated food processing and dispensing apparatus of claim 17 further comprising a vent flush passage formed within the faceplate, wherein at least portions of the vent relief valve are in fluid connection with the vent flush passage.

19. The refrigerated food processing and dispensing system of claim 18 further comprising a source of water and a control valve having an input fluidly coupled to the source of water and an outlet coupled to the vent flush passage.

20. The refrigerated food processing and dispensing system of claim 15 wherein the first end of the bypass passage opens in a downward direction.

* * * * *